United States Patent
Sakai et al.

(10) Patent No.: US 7,005,212 B2
(45) Date of Patent: Feb. 28, 2006

(54) HYDROGEN ABSORBING ALLOY AND SECONDARY BATTERY

(75) Inventors: Isao Sakai, Yokohama (JP); Tatsuoki Kohno, Minato-Ku (JP); Shirou Takeno, Yokohama (JP); Takamichi Inaba, Yokohama (JP); Hideki Yoshida, Yokohama (JP); Masaaki Yamamoto, Inzai (JP); Hirotaka Hayashida, Fujisawa (JP); Shusuke Inada, Yokohama (JP); Hiroshi Kitayama, Fujisawa (JP); Motoya Kanda, Yokohama (JP); Fumiyuki Kawashima, Matsudo (JP); Takao Sawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 320 days.

(21) Appl. No.: 10/180,522

(22) Filed: Jun. 27, 2002

(65) Prior Publication Data

US 2003/0096164 A1 May 22, 2003

Related U.S. Application Data

(63) Continuation of application No. PCT/JP99/07318, filed on Dec. 27, 1999.

(51) Int. Cl.
*H01M 4/38* (2006.01)
*C22C 19/00* (2006.01)

(52) U.S. Cl. .................... 429/218.2; 420/900

(58) Field of Classification Search ............ 429/218.2; 420/900
See application file for complete search history.

(56) References Cited

U.S. PATENT DOCUMENTS

| 5,922,491 | A | 7/1999 | Ikawa et al. |
| 6,130,006 | A | 10/2000 | Kohno et al. |
| 6,200,705 | B1 | 3/2001 | Hayashida et al. |
| 6,214,492 | B1 | 4/2001 | Kono et al. |
| 6,248,475 | B1 | 6/2001 | Hayashida et al. |
| 6,268,084 | B1 * | 7/2001 | Hayashida et al. ...... 429/218.2 |

FOREIGN PATENT DOCUMENTS

CN  1219001  6/1999

(Continued)

OTHER PUBLICATIONS

H. Oesterreicher, J. Clinton and H. Bittner, Hydrides of La-Ni Compounds, Mat. Res. Bull. vol. 11, pp. 1241-1248, 1976, Pergamon Press, Inc.

(Continued)

*Primary Examiner*—Jonathan Crepeau
(74) *Attorney, Agent, or Firm*—Oblon, Spivak, McClelland, Maier & Neustadt, P.C.

(57) ABSTRACT

The present invention provides a hydrogen absorbing alloy containing as a principal phase at least one phase selected from the group consisting of a second phase having a rhombohedral crystal structure and a first phase having a crystal structure of a hexagonal system excluding a phase having a $CaCu_5$ type structure, wherein a content of a phase having a crystal structure of $AB_2$ type is not higher than 10% by volume including 0% by volume and the hydrogen absorbing alloy has a composition represented by general formula (1) given below:

$$R_{1-a-b}Mg_aT_bNi_{Z-X-Y-\alpha}M1_XM2_YMn_\alpha. \qquad (1)$$

14 Claims, 6 Drawing Sheets

FOREIGN PATENT DOCUMENTS

| JP | 62-271348 | | 11/1987 |
|---|---|---|---|
| JP | 62-271349 | | 11/1987 |
| JP | 9-25529 | * | 1/1997 |
| JP | WO97-03213 | | 1/1997 |
| JP | 10-1731 | | 1/1998 |
| JP | 11-29832 | | 2/1999 |
| JP | 11-217643 | * | 8/1999 |
| JP | 11-323469 | | 11/1999 |
| JP | 2000-73132 | | 3/2000 |
| WO | WO 99/54517 | | 10/1999 |

OTHER PUBLICATIONS

H. Oesterreicher and H. Bittner, Hydride Formation in $La_{1-x}Mg_xNi_2$*, Journal of the Less-Common Metals, 73 (1980) pp. 339-344.

Abstract of the Japan Institute of Metals, 120th Meeting, (1997) 289; K. Kadir, et al. Mar. 26, 1997.

K. Kadir, et al., Journal of Alloys and Compounds, vol. 257, pp. 115-121, XP-004116169, "Synthesis and Structure Determination of a New Series of Hydrogen Storage Alloys; $RMg_2Ni_g$ (R=La, Ce, Pr, Nd, Sm, and Gd) Built from $MgNi_2$ Laves-Type Layers Alternating with $AB_5$ Layers", Jul. 25, 1997.

Patent Abstracts of Japan, JP 05-043968, Feb. 23, 1993.

H. Fujii, et al., Journal of Alloys and Compounds, vol. 219, No. 1-2, pp. 10-15, XP-004086448, Effect of Interstitial Hydrogen and Nitrogen on Magnetic and Structural Properties of $R_2T_{17}$ (R=Y, Ce and Sm; T=Fe, Co and Ni), Mar. 15, 1995.

K. Dutta, et al., International Journal of Hydrogen Energy, vol. 18, No. 5, pp. 397-403, XP-000362529, "Synthesis and Hydrogen Storage Characteristics of the Composite Alloy $La_2Mg_{17}$-x wt%$MmNi_{4.5}Al_{0.5}$", May 1, 1993.

P. Mandel, et al., Journal of Alloys and Compounds, vol. 184, No. 1, pp. 1-9, AN 4216944, XP-002239000, "Synthesis, Characterization and Hydrogenation Behaviour of Mg-xwt.%FeTi(Mn) and La/SUB 2/Mg/SUB 17/-xwt. %LaNi/SUB 5/-New Hydrogen Storage Composite Alloys", Jun. 5, 1992 (Abstract only).

Patent Abstracts of Japan, JP 10-001731, Jan. 6, 1998.

A. Kolomiets, et al., Journal of Alloys and Compounds, vol. 262-263, XP-004102958, pp. 206-210, "RNiAL Hydrides and their Magnetic Properties", Nov. 14, 1997.

G. Liang, et al., Journal of Alloys and Compounds, vol. 268, No. 1-2, XP-004130722, pp. 302-307, "Hydrogen Absorption Properties of a Mechanically Milled Mg-50 WT. % $LaNi_5$ Composite", Mar. 27, 1998.

K. J. Gross, et al., Journal of Alloys and Compounds, vol. 269, No. 1-2, XP-004138721, pp. 259-270, "Mechanically Milled Mg Composites for Hydrogen Storage: The Relationship Between Morphology and Kinetics", May 1, 1998.

K. Kadir, et al., Journal of Alloys and Compounds vol. 287, No. 1-2, XP-004182555, pp. 264-270, "Structural Investigation and Hydrogen Capacity of $YMg_2Ni_g$ and $(Y_{0.5}Ca_{0.5})(MgCa)Ni_9$: New Phases in the $AB_2C_gSystem$ Isostructural with $LaMg_2Ni_g$", Jun. 1, 1999.

Z. Wenhui, et al., Database Inspec (Online), Institute of Electrical Engineers, AN 6365632, XP-002276041, "Mechanical Alloying Induced Solid State Reaction and Formation of Nano-Phase Composite Hydrogen Storage Alloys in MmNi/SUB 5-X/ (Co, Al, Mn) / SUB X//Mg System", May 18, 1999 (English Abstract of Acta Metallurgica Sinica, vol. 35, No. 5, pp. 541-545).

V. A. Yartys, et al., Database Inspec (Online), Institute of Electrical Engineers, AN 4606377, XP-002276042, "Hydrides of R/SUB 3/Ni/SUB 6/(Al, Ga) / SUB 2/ (R=Y, Sm, Gd, Tb, Dy, Ho, Er) Intermetallic Compounds: Structure and Properties", Jun. 8-12, 1992 (English Abstract of Third International Sympoisum On Metal-Hydrogen Systems, Fundamentals and Applications, vol. 179, No. 1-2, pp. 269-273, 1993).

M. Terzieva, et al., Journal of Alloys and Compounds, vol. 267, No. 1-2, pp. 235-239, XP-004122005, "Hydriding and Dehydriding Characteristics of $Mg-LaNi_5$ Composite Materials Prepared by Mechanical Alloying", Mar. 6, 1998.

* cited by examiner

HYDROGEN ABSORBING ALLOY AND SECONDARY BATTERY

CROSS-REFERENCE TO RELATED APPLICATIONS

This is a Continuation Application of PCT Application No. PCT/JP99/07318, filed Dec. 27, 1999, which was not published under PCT Article 21(2) in English.

BACKGROUND OF THE INVENTION

1. Field of the Invention

The present invention relates to a hydrogen absorbing alloy, a secondary battery comprising a negative electrode containing a hydrogen absorbing alloy, a hybrid car and an electric automobile, each of said hybrid car and electric automobile comprising a secondary battery comprising a negative electrode containing a hydrogen absorbing alloy.

2. Description of the Related Art

A hydrogen absorbing alloy, which is an alloy capable of storing hydrogen as an energy source easily and safely, attracts increasing attention as a new energy conversion material and as a new energy storage material. The use of a hydrogen absorbing alloy as a functional material is proposed in various fields. For example, it is proposed to use a hydrogen absorbing alloy for storage and transportation of hydrogen, for storage and transportation of heat, for heat-mechanical energy conversion, for separation and refining of hydrogen, for separation of hydrogen isotopes, for batteries using hydrogen as an active material, as a catalyst in synthetic chemistry, and as a temperature sensor.

Particularly, a hydrogen absorbing alloy capable of reversibly absorbing-desorbing hydrogen is widely used in the negative electrode included in a secondary battery. As a matter of fact, some kinds of secondary batteries of this type have already been put to practical use. Incidentally, secondary batteries are widely used as a power source for portable electronic appliances, since they are small and lightweight. Vigorous studies are being made nowadays in an attempt to improve the performance and the function of portable electronic appliances and to further miniaturize them. In order to make it possible to operate such a portable electronic appliance over a long time, it is necessary to increase the discharge capacity of the secondary battery per unit volume. Also, together with increasing the discharge capacity per unit volume, it is required in recent years to decrease the weight of secondary batteries, i.e., to increase the discharge capacity per unit weight.

An $AB_5$ type rare earth series hydrogen absorbing alloy reacts with hydrogen under room temperature and atmospheric pressure and is relatively high in chemical stability. Thus, extensive research is being made in an attempt to use the $AB_5$ type rare earth series hydrogen absorbing alloy as a hydrogen absorbing alloy for a battery. As a matter of fact, the $AB_5$ type rare earth series hydrogen absorbing alloy is actually used in the negative electrode included in secondary batteries available on the market. However, the discharge capacity of the secondary batteries available on the market, which comprise a negative electrode containing $AB_5$ type rare earth series hydrogen absorbing alloy, has already reached 80% of the theoretical capacity, making it difficult to further increase the discharge capacity of a secondary battery.

There are many rare earth-Ni series intermetallic compounds other than the $AB_5$ type referred to above. For example, it is disclosed in "Mat. Res. Bull., 11, (1976) 1241" that an intermetallic compound containing a rare earth element in an amount larger than that in the $AB_5$ type rare earth series intermetallic compound is capable of absorbing a larger amount of hydrogen at about room temperature, compared with the $AB_5$ type rare earth series intermetallic compound. Also, a hydrogen absorbing alloy in which a site A is a mixture of a rare earth element and Mg is disclosed in two publications. Specifically, a hydrogen absorbing alloy having a composition represented by $La_{1-x}Mg_xNi_2$ is disclosed in "J. Less-Common Metals, 73, (1980) 339". However, this hydrogen absorbing alloy has an excessively high stability with hydrogen and, thus, hydrogen is unlikely to be desorbed from the alloy, giving rise to the problem that it is difficult to desorb hydrogen when the secondary battery is discharged. A hydrogen absorbing alloy in which a site A is a mixture of a rare earth element and Mg is also disclosed in "Summary of lecture in the $120^{th}$ Spring Meeting of Japan Metallic Society, P. 289 (1997)". Specifically, disclosed in this publication is a hydrogen absorbing alloy having a composition represented by $LaMg_2Ni_9$. However, this hydrogen absorbing alloy also gives rise to the problem that the hydrogen storage capacity is small.

A hydrogen absorption electrode containing a hydrogen absorbing alloy having a composition represented by $Mm_{1-x}A_xNi_aCo_bM_c$ is disclosed in Jpn. Pat. Appln. KOKAI No. 62-271348. On the other hand, a hydrogen absorption electrode containing a hydrogen absorbing alloy having a composition represented by $La_{1-x}A_xNi_aCo_bM_c$ is disclosed in Japanese Patent Disclosure No. 62-271349. However, the secondary battery comprising the hydrogen absorbing alloy disclosed in each of these Japanese Patent documents gives rise to the problem that the discharge capacity is low and the cycle life is short.

Also, a hydrogen absorption electrode containing a hydrogen absorbing alloy having a composition represented by general formula (i) given below and having a specified antiphase boundary is disclosed in Reissue Publication of International Patent Disclosure No. WO 97/03213 and U.S. Pat. No. 5,840,166. This hydrogen absorbing alloy has a crystal structure of $LaNi_5$, i.e., consists of a $CaCu_5$ type single phase:

$$(R_{1-x}L_x)(Ni_{1-y}M_y)_z \qquad (i)$$

where R represents La, Ce, Pr, Nd or a mixture thereof, L represents Gd, Tb, Dy, Ho, Er, Tm, Yb, Lu, Y, Sc, Mg, Ca or a mixture thereof, M represents Co, Al, Mn, Fe, Cu, Zr, Ti, Mo, Si, V, Cr, Nb, Hf, Ta, W, B, C or a mixture thereof, the atomic ratios x, y and z are respectively satisfy conditions of: $0.05 \leq x \leq 0.4$, $0 \leq x \leq 0.5$, and $3.0 \leq z \leq 4.5$.

The particular hydrogen absorbing alloy can be manufactured by uniformly solidificating a melt of the alloy having a composition represented by general formula (i) given above on a roll having a surface irregularity, in which the average maximum height is 30 to 150 $\mu$m, in a thickness of 0.1 to 2.0 mm under the cooling conditions that the supercooling temperature is 50 to 500° C. and the cooling rate is 1,000 to 10,000° C./sec, followed by applying a heat treatment to the solidificated molten alloy. It is taught that, if the manufacturing conditions fail to fall within the ranges noted above, the manufactured alloy is rendered to have a two phase structure consisting of crystal grains of the $LaNi_5$ type structure and crystal grains of the $Ce_2Ni_7$ type structure, resulting in failure to obtain the $LaNi_5$ type single phase structure.

However, a secondary battery comprising the negative electrode containing a hydrogen absorbing alloy having a composition represented by general formula (i) given above, having a specified antiphase boundary, and having a crystal structure of CaCu$_5$ structure gives rise to the problem that the discharge capacity is low and the cycle life is short.

Further, a hydrogen absorption material having a composition represented by general formula (ii) given below, which has a structure of the hexagonal system in which the space group is P6$_3$/mmc, is disclosed in Japanese Patent Disclosure No. 11-29832:

$$(R_{1-X}A_X)_2(Ni_{7-Y-Z-\alpha-\beta}Mn_YNb_ZB_\alpha C_\beta)_n \qquad (ii)$$

where R represents a rare earth element or a mish metal (Mm), A represents at least one element selected from the group consisting of Mg, Ti, Zr, Th, Hf, Si and Ca, B represents at least one element selected from the group consisting of Al and Cu, C represents at least one element selected from the group consisting of Ga, Ge, In, Sn, Sb, Tl, Pb and Bi, the X is higher than 0 and not higher than 0.3, i.e., $0<x\leq 0.3$, the Y falls within a range of from 0.3 to 1.5, i.e., $0.3\leq Y\leq 1.5$, and the Z is higher than 0 and not higher than 0.3, i.e., $0<Z\leq 0.3$, the $\alpha$ falls within a range of from 0 to 1.0, i.e., $0\leq \alpha\leq 1.0$, the $\beta$ falls within a range of from 0 to 1.0, i.e., $0\leq \beta\leq 1.0$, and n falls within a range of from 0.9 to 1.1, i.e., $0.9\leq n\leq 1.1$.

Where the sum of the atomic ratios of R and A is set at 1 in the hydrogen absorbing alloy having a composition represented by general formula (ii), the atomic ratio of Mn falls within a range of from 0.135 to 0.825.

However, the hydrogen absorbing alloy disclosed in this prior art is poor in the reversibility of the hydrogen absorption-desorption reaction and, thus, gives rise to the problem that the hydrogen absorption-desorption amount is small. Also, a secondary battery comprising the negative electrode containing the particular hydrogen absorbing alloy is poor in the reversibility of the hydrogen absorption-desorption reaction, with the result that the operating voltage of the secondary battery is rendered low, which lowers the discharge capacity.

Incidentally, a hydrogen absorbing alloy containing a phase of an intermetallic compound having a composition represented by A$_5$T$_{19}$, where A represents at least one element selected from the group consisting of La, Ce, Pr, Sm, Nd, Mm, Y, Gd, Ca, Mg, Ti, Zr and Hf, and T represents at least one element selected from the group consisting of B, Bi, Al, Si, Cr, V, Mn, Fe, Co, Ni, Cu, Zn, Sn and Sb, is recited in the claim of Japanese Patent Disclosure No. 10-1731.

Concerning the manufacturing method of the hydrogen absorbing alloy containing a phase of the intermetallic compound having a composition represented by A$_5$T$_{19}$, the Japanese Patent document quoted above teaches that an alloy containing a phase of an intermetallic compound having a composition represented by AT$_3$ is mixed for the mechanical alloying with an alloy containing a phase of an intermetallic compound having a composition represented by AT$_4$ so as to form a phase of an intermetallic compound having a composition represented by A$_5$T$_{19}$ in addition to the compositions represented by AT$_3$ and AT$_4$. It is also taught that the resultant alloy is mixed or subjected to a mechanical alloying with an alloy containing a phase of an intermetallic compound having a composition represented by AT$_5$ so as to obtain a hydrogen absorbing alloy containing both A$_5$T$_{19}$ phase and AT$_5$ phase. In the hydrogen absorbing alloy thus obtained, the entire crystal grain is formed of a region having a composition represented by A$_5$T$_{19}$ as shown in FIG. 1 of the Japanese Patent document quoted above.

BRIEF SUMMARY OF THE INVENTION

An object of the present invention is to provide a hydrogen absorbing alloy having a high hydrogen absorption-desorption amount by overcoming the problems inherent in the prior art that the hydrogen absorbing alloy of the composition belonging to the type that the site A is contained in a larger amount, compared with the composition of AB$_5$ type, has an excessively high stability with hydrogen so as to be unlikely to desorb hydrogen, and that the particular hydrogen absorbing alloy tends to be oxidized and corroded by an alkaline electrolyte.

Another object of the present invention is to provide a secondary battery having a high capacity and excellent in the charge-discharge cycle characteristics.

Further, still another object of the present invention is to provide a hybrid car and an electric automobile excellent in running performance, such as fuel cost.

According to a first aspect of the present invention, there is provided a hydrogen absorbing alloy containing as a principal phase at least one phase selected from the group consisting of a second phase having a rhombohedral crystal structure and a first phase having a crystal structure of a hexagonal system excluding a phase having a CaCu$_5$ type structure, wherein a content of a phase having a crystal structure of AB$_2$ type is not higher than 10% by volume including 0% by volume in the hydrogen absorbing alloy and the hydrogen absorbing alloy has a composition represented by general formula (1) given below:

$$R_{1-a-b}Mg_aT_bNi_{Z-X-Y-\alpha}M1_XM2_YMn_\alpha \qquad (1)$$

where R is at least one element selected from rare earth elements, the rare earth elements including Y, T is at least one element selected from the group consisting of Ca, Ti, Zr and Hf, M1 is at least one element selected from the group consisting of Co and Fe, M2 is at least one element selected from the group consisting of Al, Ga, Zn, Sn, Cu, Si, B, Nb, W, Mo, V, Cr, Ta, Li, P and S, the atomic ratios of a, b, X, Y, $\alpha$ and z are respectively satisfy conditions of: $0.15\leq a\leq 0.37$, $0\leq b\leq 0.1$, $0.53\leq (1-a-b)\leq 0.85$, $0\leq X\leq 1.3$, $0\leq Y\leq 0.5$, $0\leq \alpha<0.135$ and $3\leq Z\leq 4.2$.

According to a second aspect of the present invention, there is provided a secondary battery comprising a positive electrode, a negative electrode containing a hydrogen absorbing alloy, and an alkaline electrolyte, wherein the hydrogen absorbing alloy contains as a principal phase at least one phase selected from the group consisting of a second phase having a rhombohedral crystal structure and a first phase having a crystal structure of a hexagonal system excluding a phase having a CaCu$_5$ type structure, a content of a phase having a crystal structure of AB$_2$ type is not higher than 10% by volume including 0% by volume in the hydrogen absorbing alloy and the hydrogen absorbing alloy has a composition represented by general formula (1) given below:

$$R_{1-a-b}Mg_aT_bNi_{Z-X-Y-\alpha}M1_XM2_YMn_\alpha \qquad (1)$$

where R is at least one element selected from rare earth elements, the rare earth elements including Y, T is at least one element selected from the group consisting of Ca, Ti, Zr and Hf, M1 is at least one element selected from the group consisting of Co and Fe, M2 is at least one element selected from the group consisting of Al, Ga, Zn, Sn, Cu, Si, B, Nb, W, Mo, V, Cr, Ta, Li, P and S, the atomic ratios of a, b, X, Y, $\alpha$ and z are respectively satisfy conditions of: $0.15\leq a\leq 0.37$, $0\leq b\leq 0.1$, $0.53\leq (1-a-b)\leq 0.85$, $0\leq X\leq 1.3$, $0\leq Y\leq 0.5$, $0\leq \alpha<0.135$ and $3\leq Z\leq 4.2$.

According to a third aspect of the present invention, there is provided a hybrid car comprising an electric driving mechanism, and a power source for the electric driving mechanism;

wherein the power source comprises a secondary battery comprising a secondary battery comprising a positive electrode, a negative electrode containing a hydrogen absorbing alloy, and an alkaline electrolyte, and wherein the hydrogen absorbing alloy contains as a principal phase at least one phase selected from the group consisting of a second phase having a rhombohedral crystal structure and a first phase having a crystal structure of a hexagonal system excluding a phase having a $CaCu_5$ type structure, a content of a phase that has a crystal structure of $AB_2$ type being not higher than 10% by volume including 0% by volume in the hydrogen absorbing alloy and the hydrogen absorbing alloy having a composition represented by general formula (1) given previously.

According to a fourth aspect of the present invention, there is provided an electric automobile comprising a secondary battery as a driving power source, the secondary battery comprising a positive electrode, a negative electrode containing a hydrogen absorbing alloy, and an alkaline electrolyte, wherein the hydrogen absorbing alloy contains as a principal phase at least one phase selected from the group consisting of a second phase having a rhombohedral crystal structure and a first phase having a crystal structure of a hexagonal system excluding a phase having a $CaCu_5$ type structure, and wherein a content of a phase having a crystal structure of $AB_2$ type is not higher than 10% by volume including 0% by volume in the hydrogen absorbing alloy and the hydrogen absorbing alloy has a composition represented by general formula (1) given previously.

According to a fifth aspect of the present invention, there is provided a hydrogen absorbing alloy containing as a principal phase at least one phase selected from the group consisting of a second phase having a rhombohedral crystal structure and a first phase having a crystal structure of a hexagonal system excluding a phase having a $CaCu_5$ type structure, wherein a parallel growth region precipitates in at least one crystal grain of the principal phase, the parallel growth region having a crystal structure differing from a crystal structure of the principal phase, and the hydrogen absorbing alloy has a composition represented by general formula (1) given below:

$$R_{1-a-b}Mg_aT_bNi_{Z-X-Y-\alpha}M1_XM2_YMn_\alpha \qquad (1)$$

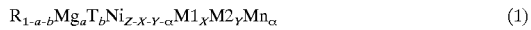

where R is at least one element selected from rare earth elements, the rare earth elements including Y, T is at least one element selected from the group consisting of Ca, Ti, Zr and Hf, M1 is at least one element selected from the group consisting of Co and Fe, M2 is at least one element selected from the group consisting of Al, Ga, Zn, Sn, Cu, Si, B, Nb, W, Mo, V, Cr, Ta, Li, P and S, the atomic ratios of a, b, X, Y, $\alpha$ and z are respectively satisfy conditions of: $0.15 \leq a \leq 0.37$, $0 \leq b \leq 0.1$, $0.53 \leq (1-a-b) \leq 0.85$, $0 \leq X \leq 1.3$, $0 \leq Y \leq 0.5$, $0 \leq \alpha < 0.135$ and $3 \leq Z \leq 4.2$.

According to a sixth aspect of the present invention, there is provided a secondary battery comprising a positive electrode, a negative electrode containing a hydrogen absorbing alloy, and an alkaline electrolyte, wherein the hydrogen absorbing alloy contains as a principal phase at least one phase selected from the group consisting of a second phase having a rhombohedral crystal structure and a first phase having a crystal structure of a hexagonal system excluding a phase having a $CaCu_5$ type structure, and wherein a parallel growth region precipitates in at least one crystal grain of the principal phase, the parallel growth region having a crystal structure differing from a crystal structure of the principal phase, and the hydrogen absorbing alloy has a composition represented by general formula (1) given below:

$$R_{1-a-b}Mg_aT_bNi_{Z-X-Y-\alpha}M1_XM2_YMn_\alpha \qquad (1)$$

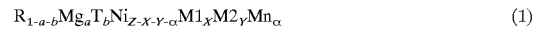

where R is at least one element selected from rare earth elements, the rare earth elements including Y, T is at least one element selected from the group consisting of Ca, Ti, Zr and Hf, M1 is at least one element selected from the group consisting of Co and Fe, M2 is at least one element selected from the group consisting of Al, Ga, Zn, Sn, Cu, Si, B, Nb, W, Mo, V, Cr, Ta, Li, P and S, the atomic ratios of a, b, X, Y, $\alpha$ and z are respectively satisfy conditions of: $0.15 \leq a \leq 0.37$, $0 \leq b \leq 0.1$, $0.53 \leq (1-a-b) \leq 0.85$, $0 \leq X \leq 1.3$, $0 \leq Y \leq 0.5$, $0 \leq \alpha < 0.135$ and $3 \leq Z \leq 4.2$.

According to a seventh aspect of the present invention, there is provided a hybrid car, comprising electric driving mechanism, and a power source for the electric driving mechanism:

wherein the power source comprises a secondary battery comprising a positive electrode, a negative electrode containing a hydrogen absorbing alloy, and an alkaline electrolyte; and wherein the hydrogen absorbing alloy contains as a principal phase at least one phase selected from the group consisting of a second phase having a rhombohedral crystal structure and a first phase having a crystal structure of a hexagonal system excluding a phase having a $CaCu_5$ type structure, a parallel growth region precipitates in at least one crystal grain of the principal phase, the parallel growth region having a crystal structure differing from a crystal structure of the principal phase, and the hydrogen absorbing alloy has a composition represented by general formula (1) given previously.

According to an eighth aspect of the present invention, there is provided an electric automobile comprising a secondary battery as a driving power source;

wherein the secondary battery comprises a positive electrode, a negative electrode containing a hydrogen absorbing alloy, and an alkaline electrolyte; and wherein the hydrogen absorbing alloy contains as a principal phase at least one phase selected from the group consisting of a second phase having a rhombohedral crystal structure and a first phase having a crystal structure of a hexagonal system excluding a phase having a $CaCu_5$ type structure, a parallel growth region precipitates in at least one crystal grain of the principal phase, the parallel growth region having a crystal structure differing from a crystal structure of the principal phase, and the hydrogen absorbing alloy has a composition represented by general formula (1) given previously.

According to a ninth aspect of the present invention, there is provided a hydrogen absorbing alloy which has a composition represented by general formula (3) given below and contains not higher than 10% by volume including 0% by volume of a phase having an $AB_2$ type crystal structure, and an intensity ratio calculated by formula (2) given below being lower than 0.15 including 0:

$$I_1/I_2 \qquad (2)$$

where $I_2$ is an intensity of a highest peak in a X-ray diffraction pattern using a CuK$\alpha$ ray, and $I_1$ is an intensity of a highest peak appearing at a value of 2θ falling within a range of from 8° to 13° in the X-ray diffraction pattern, θ being a Bragg angle;

$$R_{1-a-b}Mg_aT_bNi_{Z-X}M3_X \quad (3)$$

where R is at least one element selected from rare earth elements, the rare earth elements including Y, T is at least one element selected from the group consisting of Ca, Ti, Zr and Hf, M3 is at least one element selected from the group consisting of Co, Mn, Fe, Al, Ga, Zn, Sn, Cu, Si, B, Nb, W, Mo, V, Cr, Ta, Li, P and S, the atomic ratios of a, b, X and z are respectively satisfy conditions of: $0.15 \leq a \leq 0.37$, $0 \leq b \leq 0.1$, $0.53 \leq (1-a-b) \leq 0.85$, $0 \leq X \leq 2$ and $3 \leq Z \leq 4.2$.

According to a tenth aspect of the present invention, there is provided a secondary battery comprising a positive electrode, a negative electrode containing a hydrogen absorbing alloy, and an alkaline electrolyte, wherein the hydrogen absorbing alloy has a composition represented by general formula (3) given below and contains not higher than 10% by volume including 0% by volume of a phase having an $AB_2$ type crystal structure, and an intensity ratio calculated by formula (2) given below is lower than 0.15 including 0:

$$I_1/I_2 \quad (2)$$

where $I_2$ is an intensity of a highest peak in a X-ray diffraction pattern using a CuKα ray, and $I_1$ is an intensity of a highest peak appearing at a value of 2θ falling within a range of from 8° to 13° in the X-ray diffraction pattern, θ being a Bragg angle;

$$R_{1-a-b}Mg_aT_bNi_{Z-X}M3_X \quad (3)$$

where R is at least one element selected from rare earth elements, the rare earth elements including Y, T is at least one element selected from the group consisting of Ca, Ti, Zr and Hf, M3 is at least one element selected from the group consisting of Co, Mn, Fe, Al, Ga, Zn, Sn, Cu, Si, B, Nb, W, Mo, V, Cr, Ta, Li, P and S, the atomic ratios of a, b, X and z are respectively satisfy conditions of: $0.15 \leq a \leq 0.37$, $0 \leq b \leq 0.1$, $0.53 \leq (1-a-b) \leq 0.85$, $0 \leq X \leq 2$ and $3 \leq Z \leq 4.2$.

According to an eleventh aspect of the present invention, there is provided a hybrid car comprising an electrical driving mechanism and a power source for the electrical driving mechanism;

wherein the power source comprises a secondary battery comprising a positive electrode, a negative electrode containing a hydrogen absorbing alloy, and an alkaline electrolyte, the hydrogen absorbing alloy having a composition represented by general formula (3) given previously and containing not higher than 10% by volume including 0% by volume of a phase having an $AB_2$ type crystal structure, and an intensity ratio calculated by formula (2) given previously being lower than 0.15 including 0.

According to a twelfth aspect of the present invention, there is provided an electric automobile comprising a secondary battery as an electrical driving mechanism;

wherein the secondary battery comprises a positive electrode, a negative electrode containing a hydrogen absorbing alloy, and an alkaline electrolyte, the hydrogen absorbing alloy having a composition represented by general formula (3) given previously and containing not higher than 10% by volume including 0% by volume of a phase having an $AB_2$ type crystal structure, and an intensity ratio calculated by formula (2) given previously being lower than 0.15 including 0.

According to a thirteenth aspect of the present invention, there is provided a hydrogen absorbing alloy having a composition represented by general formula (3) given below, wherein a parallel growth region precipitates in at least one crystal grain of a principal phase, the parallel growth region having a crystal structure differing from a crystal structure of the principal phase, and an intensity ratio calculated by formula (2) given below is lower than 0.15 including 0:

$$I_1/I_2 \quad (2)$$

where $I_2$ is an intensity of a highest peak in a X-ray diffraction pattern using a CuKα ray, and $I_1$ is an intensity of a highest peak appearing at a value of 2θ falling within a range of from 8° to 13° in the X-ray diffraction pattern, θ being a Bragg angle;

$$R_{1-a-b}Mg_aT_bNi_{Z-X}M3_X \quad (3)$$

where R is at least one element selected from rare earth elements, the rare earth elements including Y, T is at least one element selected from the group consisting of Ca, Ti, Zr and Hf, M3 is at least one element selected from the group consisting of Co, Mn, Fe, Al, Ga, Zn, Sn, Cu, Si, B, Nb, W, Mo, V, Cr, Ta, Li, P and S, the atomic ratios of a, b, x and z are respectively satisfy conditions of: $0.15 \leq a \leq 0.37$, $0 \leq b \leq 0.1$, $0.53 \leq (1-a-b) \leq 0.85$, $0 \leq X \leq 2$ and $3 \leq Z \leq 4.2$.

According to a fourteenth aspect of the present invention, there is provided a secondary battery, comprising a positive electrode, a negative electrode containing a hydrogen absorbing alloy, and an alkaline electrolyte, wherein the hydrogen absorbing alloy has a composition represented by general formula (3) given below, a parallel growth region precipitates in at least one crystal grain of a principal phase, the parallel growth region having a crystal structure differing from a crystal structure of the principal phase, and an intensity ratio calculated by formula (2) given below is being lower than 0.15 including 0:

$$I_1/I_2 \quad (2)$$

where $I_2$ is an intensity of a highest peak in a X-ray diffraction pattern using a CuKα ray, and $I_1$ is an intensity of a highest peak appearing at a value of 2θ falling within a range of from 8° to 13° in the X-ray diffraction pattern, θ being a Bragg angle;

$$R_{1-a-b}Mg_aT_bNi_{Z-X}M3_X \quad (3)$$

where R is at least one element selected from rare earth elements, the rare earth elements including Y, T is at least one element selected from the group consisting of Ca, Ti, Zr and Hf, M3 is at least one element selected from the group consisting of Co, Mn, Fe, Al, Ga, Zn, Sn, Cu, Si, B, Nb, W, Mo, V, Cr, Ta, Li, P and S, the atomic ratios of a, b, X and z are respectively satisfy conditions of: $0.15 \leq a \leq 0.37$, $0 \leq b \leq 0.1$, $0.53 \leq (1-a-b) \leq 0.85$, $0 \leq X \leq 2$ and $3 \leq Z \leq 4.2$.

According to a fifteenth aspect of the present invention, there is provided a hybrid car, comprising an electrical driving mechanism and a power source for the electrical driving mechanism, wherein the power source comprises a secondary battery comprising a positive electrode, a negative electrode containing a hydrogen absorbing alloy, and an alkaline electrolyte; and wherein the hydrogen absorbing alloy has a composition represented by general formula (3) given previously, a parallel growth region precipitates in at least one crystal grain of a principal phase, the parallel growth region having a crystal structure differing from a crystal structure of the principal phase, and an intensity ratio calculated by formula (2) given previously is lower than 0.15 including 0.

According to a sixteenth aspect of the present invention, there is provided an electric automobile comprising a secondary battery as a driving power source;

wherein the secondary battery comprises a positive electrode, a negative electrode containing a hydrogen absorbing alloy, and an alkaline electrolyte; and wherein the hydrogen absorbing alloy has a composition represented by general formula (3) given previously, a parallel growth region precipitates in at least one crystal grain of a principal phase, the parallel growth region having a crystal structure differing from a crystal structure of the principal phase, and an intensity ratio calculated by formula (2) given previously is lower than 0.15 including 0.

According to a seventeenth aspect of the present invention, there is provided a hydrogen absorbing alloy containing not higher than 10% by volume including 0% by volume of a phase having an $AB_2$ type crystal structure, the hydrogen absorbing alloy having a composition represented by general formula (4) given below:

$$R_{1-a}Mg_aNi_{Z-X-Y}Al_XCo_YM4_\alpha \qquad (4)$$

where R is at least one element selected from rare earth elements, the rare earth elements including Y and a Ce content of the R being lower than 20% by weight including 0% by weight, M4 is at least one element selected from the group consisting of Mn, Fe, Al, Ga, Zn, Sn, Cu, Si, B, Nb, W, Ti, Zr, In, Mo, V, Cr, P and S, the atomic ratios of a, X, Y, Z and α are respectively satisfy conditions of: $0.15 \leq a \leq 0.33$, $0.06 \leq X \leq 0.15$, $0 \leq Y \leq 0.2$, $3.15 \leq Z \leq 3.55$ and $0 \leq \alpha < 0.135$.

According to an eighteenth aspect of the present invention, there is provided a secondary battery comprising a positive electrode, a negative electrode containing a hydrogen absorbing alloy, and an alkaline electrolyte, wherein the hydrogen absorbing alloy has a composition represented by general formula (4) given below and contains a phase having an $AB_2$ type crystal structure in an amount not larger than 10% by volume including 0% by volume:

$$R_{1-a}Mg_aNi_{Z-X-Y}Al_XCo_YM4_\alpha \qquad (4)$$

where R is at least one element selected from rare earth elements, the rare earth elements including Y and a Ce content of the R being lower than 20% by weight including 0% by weight, M4 is at least one element selected from the group consisting of Mn, Fe, Al, Ga, Zn, Sn, Cu, Si, B, Nb, W, Ti, Zr, In, Mo, V, Cr, P and S, the atomic ratios of a, X, Y, Z and α are respectively satisfy conditions of: $0.15 \leq a \leq 0.33$, $0.06 \leq X \leq 0.15$, $0 \leq Y \leq 0.2$, $3.15 \leq Z \leq 3.55$ and $0 \leq \alpha < 0.135$.

According to a nineteenth aspect of the present invention, there is provided a hybrid car, comprising electrical driving mechanism and a power source for the electrical driving mechanism:

wherein the power source comprises a secondary battery comprising a positive electrode, a negative electrode containing a hydrogen absorbing alloy, and an alkaline electrolyte; and wherein the hydrogen absorbing alloy has a composition represented by general formula (4) given above and contains a phase having an $AB_2$ type crystal structure in an amount not larger than 10% by volume including 0% by volume.

According to a twentieth aspect of the present invention, there is provided an electric automobile, comprising a secondary battery as a driving power source;

wherein the secondary battery comprises a positive electrode, a negative electrode containing a hydrogen absorbing alloy, and an alkaline electrolyte; and wherein the hydrogen absorbing alloy has a composition represented by general formula (4) given above and contains a phase having an $AB_2$ type crystal structure in an amount not larger than 10% by volume including 0% by volume.

According to a twenty-first aspect of the present invention, there is provided a hydrogen absorbing alloy having a composition represented by general formula (4) given below, wherein a parallel growth region precipitates in at least one crystal grain of a principal phase, the parallel growth region having a crystal structure differing from a crystal structure of the principal phase:

$$R_{1-a}Mg_aNi_{Z-X-Y}Al_XCo_YM4_\alpha \qquad (4)$$

where R is at least one element selected from rare earth elements, the rare earth elements including Y and a Ce content of the R being lower than 20% by weight including 0% by weight, M4 is at least one element selected from the group consisting of Mn, Fe, Al, Ga, Zn, Sn, Cu, Si, B, Nb, W, Ti, Zr, In, Mo, V, Cr, P and S, the atomic ratios of a, X, Y, Z and α are respectively satisfy conditions of: $0.15 \leq a \leq 0.33$, $0.06 \leq X \leq 0.15$, $0 \leq Y \leq 0.2$, $3.15 < Z \leq 3.55$ and $0 \leq \alpha < 0.135$.

According to a twenty-second aspect of the present invention, there is provided a secondary battery, comprising a positive electrode, a negative electrode containing a hydrogen absorbing alloy, and an alkaline electrolyte, wherein the hydrogen absorbing alloy has a composition represented by general formula (4) given below, and a parallel growth region precipitates in at least one crystal grain of a principal phase, the parallel growth region having a crystal structure differing from a crystal structure of the principal phase:

$$R_{1-a}Mg_aNi_{Z-X-Y}Al_XCo_YM4_\alpha \qquad (4)$$

where R is at least one element selected from rare earth elements, the rare earth elements including Y and a Ce content of the R being lower than 20% by weight including 0% by weight, M4 is at least one element selected from the group consisting of Mn, Fe, Al, Ga, Zn, Sn, Cu, Si, B, Nb, W, Ti, Zr, In, Mo, V, Cr, P and S, the atomic ratios of a, X, Y, Z and α are respectively satisfy conditions of: $0.15 \leq a \leq 0.33$, $0.06 \leq X \leq 0.15$, $0 \leq Y \leq 0.2$, $3.15 < Z \leq 3.55$ and $0 \leq \alpha < 0.135$.

According to a twenty-third aspect of the present invention, there is provided a hybrid car, comprising a electric driving mechanism and a power source for driving the electrical driving mechanism:

wherein the power source comprises a secondary battery comprising a positive electrode, a negative electron containing a hydrogen absorbing alloy, and an alkaline electrolyte; and wherein the hydrogen absorbing alloy has a composition represented by general formula (4) given above, and a parallel growth region precipitates in at least one crystal grain of a principal phase, the parallel growth region having a crystal structure differing from a crystal structure of the principal phase.

Further, according to a twenty-fourth aspect of the present invention, there is provided an electric automobile comprising a secondary battery:

wherein the secondary battery comprises a positive electrode, a negative electron containing a hydrogen absorbing alloy, and an alkaline electrolyte; and wherein the hydrogen absorbing alloy has a composition represented by general formula (4) given above, and a parallel growth region precipitates in at least one crystal grain of a principal phase, the parallel growth region having a crystal structure differing from a crystal structure of the principal phase.

The hydrogen absorbing alloy of the present invention, the secondary battery comprising the negative electrode containing the particular hydrogen absorbing alloy, and the hybrid car and the electric automobile each comprising the particular secondary battery will now be described.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

<First Hydrogen Absorbing Alloy>

Figure 1:
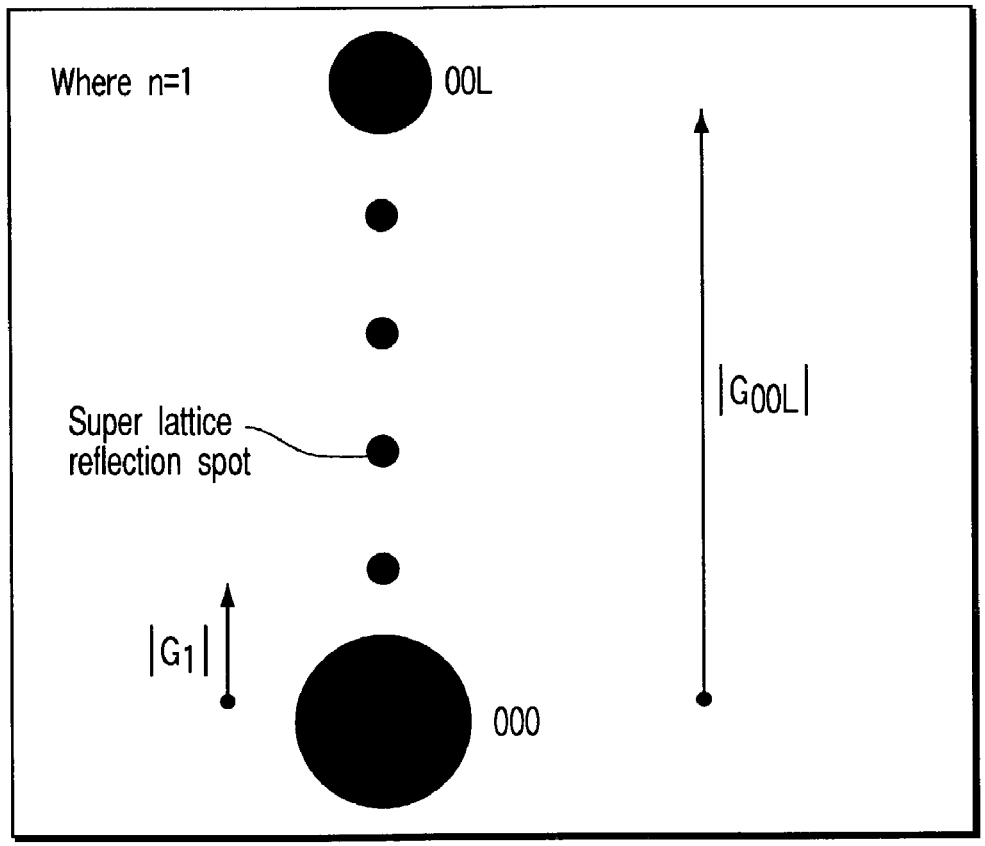
FIG. 1 is a schematic drawing for explaining an example of an electron diffraction analysis pattern.

The first hydrogen absorbing alloy of the present invention comprises as a principal phase at least one phase selected from the group consisting of a first phase having a crystal structure of a hexagonal system excluding a phase having a CaCu$_5$ type structure and a second phase having a rhombohedral crystal structure, wherein a content of a phase having a crystal structure of AB$_2$ type is not higher than 10% by volume including 0% by volume in the hydrogen absorbing alloy and the hydrogen absorbing alloy has a composition represented by general formula (1) given below:

$$R_{1-a-b}Mg_aT_bNi_{Z-X-Y-\alpha}M1_XM2_YMn_\alpha \qquad (1)$$

where R represents at least one element selected from rare earth elements, the rare earth elements including Y, T represents at least one element selected from the group consisting of Ca, Ti, Zr and Hf, M1 represents at least one element selected from the group consisting of Co and Fe, M2 represents at least one element selected from the group consisting of Al, Ga, Zn, Sn, Cu, Si, B, Nb, W, Mo, V, Cr, Ta, Li, P and S, the atomic ratios of a, b, X, Y, α and z are respectively satisfy conditions of: $0.15 \leq a \leq 0.37$, $0 \leq b \leq 0.3$, $0 \leq X \leq 1.3$, $0 \leq Y \leq 0.5$, $0 \leq \alpha < 0.135$ and $2.5 \leq Z \leq 4.2$.

The crystal structure of A$_n$B$_m$ type (where each of n and m represents a natural number) means a crystal structure of a phase having a composition represented by A$_n$B$_m$, wherein R, Mg and T included in general formula (1) given above belong to the elements A, and Ni, M1, M2 and Mn included in general formula (1) belong to the elements B.

It is desirable for the first phase group to include a phase having a Ce$_2$Ni$_7$ structure, a phase having a CeNi$_3$ structure, and a phase having a crystal structure similar to the Ce$_2$Ni$_7$ structure or the CeNi$_3$ structure. On the other hand, it is desirable for the second phase group to include a phase having a Gd$_2$Co$_7$ structure, a phase having a PuNi$_3$ structure, and a phase having a crystal structure similar to the Gd$_2$Co$_7$ structure or the PuNi$_3$ structure. Incidentally, the phase having a crystal structure similar to the Ce$_2$Ni$_7$ structure, the CeNi$_3$ structure, the Gd$_2$Co$_7$ structure or the PuNi$_3$ structure, which is hereinafter referred to as a "similar crystal phase", means a phase satisfying condition (a) or (b) given below:

(a) A phase in which the main peak appearing in the X-ray diffraction pattern resembles the main peak appearing in the X-ray diffraction pattern of a normal structure. Particularly, it is desirable for the similar crystal phase to have a crystal structure that can be defined by the plane index (Miller index) of the Ce$_2$Ni$_7$ structure, the CeNi$_3$ structure, the Gd$_2$Co$_7$ structure or the PuNi$_3$ structure. Particularly, it is desirable for the similar crystal phase to have a crystal structure described in item (1) or (2) given below:

(1) A crystal structure in which the peak having the highest intensity appears at a value of 2θ alling within a range of 42.1°±1° in an X-ray diffraction pattern using a CuKα-ray, θ representing the Bragg angle, and the intensity ratio defined by formula (I) given below is not higher than 80%:

$$I_3/I_4 \qquad (I)$$

where I$_4$ represents an intensity of a peak having a highest intensity in the X-ray diffraction pattern using CuKα-ray, I$_3$ represents an intensity of a peak appearing at a value of 2θ falling within a range from 31° to 34° in the X-ray diffraction pattern noted above.

(2) A crystal structure in which a peak having a highest intensity appears at a value of 2θ falling within a range of 42.1°±1° in an X-ray diffraction pattern using a CuKα-ray, and a peak appearing at a value of 2θ that falls within a range from 31° to 34 in the X-ray diffraction pattern is split into two or more.

(b) A phase in which a supper lattice reflection spot is present in a 5n-equally divided point of the distance |G$_{00L}$| between the primitive lattice reflection spot (00L) and the origin (000) in the electron diffraction analysis pattern photographed by a transmission electron microscope, where each of L and n represents a natural number.

It is desirable for the distance |G$_{00L}$| to fall within a range of from 0.385 nm$^{-1}$ to 0.413 nm$^{-1}$, and most desirably to be 0.4 nm$^{-1}$.

For example, when n is 1, each of 4 points that equally divide the distance |G$_{00L}$| between the primitive lattice reflection spot (00L) and the origin (000) into five sections is the supper lattice reflection spot.

Incidentally, when it comes to a hydrogen absorbing alloy having a Ce$_2$Ni$_7$ type crystal structure or a Gd$_2$Co$_7$ type crystal structure, the supper lattice reflection spot is present in the points that equally divide the distance |G$_{00L}$| between the primitive lattice reflection spot (00L) and the origin (000) into three sections in the electron diffraction analysis pattern. On the other hand, when it comes to a hydrogen absorbing alloy having a $CeNi_3$ type crystal structure or a $PuNi_3$ type crystal structure, the supper lattice reflection spot is present in the point that equally divides the distance $|G_{00L}|$ between the primitive lattice reflection spot (00L) and the origin (000) into two sections in the electron diffraction analysis pattern.

Among the similar crystal phases pointed out above, it is desirable to use the similar crystal phase satisfying both conditions (a) and (b) given above.

It is desirable for the principal phase of the hydrogen absorbing alloy of the present invention to be at least one phase selected from the group consisting of a phase having a $PuNi_3$ structure, a phase having a crystal structure similar to the $PuNi_3$ structure, a phase having a $Ce_2Ni_7$ structure, and a phase having a crystal structure similar to the $Ce_2Ni_7$ structure. Particularly, it is desirable for the principal phase to be at least one phase selected from the group consisting of a phase having a $Ce_2Ni_7$ structure, a phase having a crystal structure similar to the $Ce_2Ni_7$ structure.

The term "principal phase" used herein means at least one phase selected from the group consisting of the first phase referred to previously and the second phase referred to previously, which occupies the largest volume in the hydrogen absorbing alloy, or which occupies the largest area in a cross section of the hydrogen absorbing alloy. Particularly, it is desirable for at least one phase selected from the group consisting of the first phase and the second phase to occupy at least 50% by volume of the hydrogen absorbing alloy. If the volume ratio of the particular phase is lower than 50% by volume, it is possible for the hydrogen storage capacity to be lowered. It follows that the secondary battery comprising the negative electrode containing the particular hydrogen absorbing alloy tends to incur a decrease in the discharge capacity or to incur shortening in the charge-discharge cycle life. It is more desirable for the volume ratio of the principal phase to be at least 60% by volume, more desirably at least 70% by volume.

It is acceptable for the hydrogen absorbing alloy of the present invention to contain a phase having an $AB_5$ type crystal structure such as a $CaCu_5$ type structure, a phase having an $AB_2$ type crystal structure such as a $MgCu_2$ type structure, or a phase having both an $AB_5$ type crystal structure and an $AB_2$ type crystal structure in addition to at least one phase selected from the group consisting of the first phase and the second phase.

Particularly, it is desirable for the volume ratio of the phase having an $AB_2$ crystal structure to be not higher than 10% by volume including 0% by volume. If the volume ratio of the particular phase exceeds 10% by volume, the hydrogen absorption-desorption characteristics of the hydrogen absorbing alloy are lowered. It follows that the secondary battery comprising the negative electrode containing the particular hydrogen absorbing alloy incurs a decrease in the discharge capacity. It is more desirable for the volume ratio of the particular phase to be not higher than 5% by volume.

Further, it is desirable for the volume ratio of the phase having an $AB_5$ crystal structure to be not higher than 10% by volume, more desirably to be not higher than 5% by volume.

The volume ratio of the desired phase in the hydrogen absorbing alloy such as the principal phase, the $AB_2$ type phase or the $AB_5$ type phase is measured as follows. Specifically, scanning electron micrographs of optional five view fields are prepared. Then, an area ratio of the desired phase relative to the alloy area within the view field are calculated for each micrograph with the alloy area being 100%. The average value of the area ratios thus obtained are calculated so as to obtain the volume ratio of the desired phase within the hydrogen absorbing alloy. It should be noted that, if the hydrogen absorbing alloy is manufactured by a rapid solidification process, the crystal grain size is rendered very small, i.e., about 1 μm or less. In this case, it is difficult to observe the desired phase by the scanning electron micrograph. In such a case, a transmission electron microscope is used in place of the scanning electron microscope.

In order to lower the manufacturing cost of the electrode containing the hydrogen absorbing alloy, it is desirable for R included in general formula (1) of the hydrogen absorbing alloy to be at least one element selected from the group consisting of La, Ce, Pr, Nd and Y. Particularly, it is desirable to use a mish metal, which is a mixture of rare earth elements, as R. The mish metal that can be used in the present invention includes a Ce-rich mish metal (Mm) and a La-rich mish metal (Lm).

It is desirable for R to include La. The La content should desirably fall within a range of from 45% by weight to 95% by weight. If the La content is lower than 45% by weight, the hydrogen absorbing alloy tends to be pulverized by the repetition of the hydrogen absorption-desorption. Therefore, the secondary battery comprising the negative electrode containing the particular hydrogen absorbing alloy tends to incur the shortening of the cycle life. On the other hand, if the La content exceeds 95% by weight, the equilibrium pressure of the hydrogen absorbing alloy tends to be lowered, with the result that the secondary battery comprising the negative electrode containing the particular hydrogen absorbing alloy tends to incur a decrease of the discharge voltage. It is more desirable for the La content to exceed 60% by weight and to be not higher than 90% by weight.

Where Ce is contained in R, it is desirable for the Ce content of R to be lower than 20% by weight. If the Ce content is not lower than 20% by weight, phases other than the desired phase, e.g., the $CaCu_5$ type phase, tend to be precipitated in a large amount so as to decrease the hydrogen storage capacity. It is more desirable for the Ce content to be lower than 18% by weight, furthermore desirably, to be lower than 16% by weight.

In the present invention, the atomic ratio "a" in general formula (1) of the hydrogen absorbing alloy is defined to fall within a range of from 0.15 to 0.37. If the atomic ratio "a" falls within the range specified in the present invention, the hydrogen storage capacity is increased and desorption of hydrogen is facilitated, thereby improving the discharge capacity of the secondary battery. If the atomic ratio "a" is lower than 0.15, the hydrogen desorbing characteristics of the hydrogen absorbing alloy are deteriorated. On the other hand, if the atomic ratio "a" exceeds 0.37, the hydrogen storage capacity is markedly decreased, resulting in failure to obtain a secondary battery having a large discharge capacity. It is more desirable for the atomic ratio "a" to fall within a range of not less than 0.15 and not more than 0.35, more desirably, a range of not less than 0.15 and not more than 0.32, and most desirably, a range of not less than 0.17 and not more than 0.3.

The hydrogen absorbing alloy of the present invention contains an element T. Where T is contained in the hydrogen absorbing alloy, the characteristics such as the hydrogen desorption rate can be improved or the pulverization of the hydrogen absorbing alloy accompanying the hydrogen absorption-desorption can be suppressed without markedly decreasing the hydrogen storage capacity of the hydrogen absorbing alloy.

The atomic ratio "b" in general formula (1) of the hydrogen absorbing alloy is defined to fall within a range of from 0 to 0.3. If the atomic ratio "b" exceeds 0.3, it is impossible to obtain the effects described above, i.e., the effects of improving the hydrogen desorption characteristics and of suppressing the pulverization of the hydrogen absorbing alloy, with the result that the secondary battery comprising the negative electrode containing the particular hydrogen absorbing alloy incurs a decrease in the discharge capacity. It is more desirable for the atomic ratio "b" to fall within a range of not smaller than 0 and not larger than 0.2, more desirably a range of not smaller than 0 and not larger than 0.1.

The hydrogen absorbing alloy of the present invention contains an element M1. Where M1 is contained in the hydrogen absorbing alloy, the hydrogen absorption-desorption characteristics such as the hydrogen absorption-desorption rate of the hydrogen absorbing alloy can be improved. It is considered reasonable to understand that the M1 addition facilitates the diffusion of hydrogen in the hydrogen absorbing alloy or facilitates the hydrogen absorption-desorption of the hydrogen absorbing alloy. It should also be noted that a secondary battery comprising the negative electrode containing the particular hydrogen absorbing alloy permits improving the initial activity characteristics.

The atomic ratio "X" of general formula (1) of the hydrogen absorbing alloy should not exceed 1.3. If the atomic ratio "X" exceeds 1.3, the cycle life of the secondary battery is lowered. It is more desirable for the atomic ratio "X" to fall within a range of not smaller than 0 and not larger than 0.3.

The hydrogen absorbing alloy of the present invention contains an element M2. Where M2 is contained in the hydrogen absorbing alloy, the hydrogen absorption-desorption characteristics such as the hydrogen absorption-desorption rate of the hydrogen absorbing alloy can be improved. It is considered reasonable to understand that the M2 addition facilitates the diffusion of hydrogen in the hydrogen absorbing alloy or facilitates the hydrogen absorption-desorption of the hydrogen absorbing alloy. It should also be noted that a secondary battery comprising the negative electrode containing the particular hydrogen absorbing alloy permits drastically improving the cycle characteristics.

The atomic ratio "Y" of general formula (1) of the hydrogen absorbing alloy should not exceed 0.5. If the atomic ratio "Y" exceeds 0.5, the discharge capacity of the secondary battery is lowered. It is more desirable for the atomic ratio "Y" to fall within a range of not smaller than 0 and not larger than 0.3, furthermore desirably a range of not smaller than 0.01 and not larger than 0.2.

The atomic ratio "a" of general formula (1) of the hydrogen absorbing alloy should fall within a range of not smaller than 0 and less than 0.135. If the atomic ratio "α" is not smaller than 0.135, the hydrogen equilibrium pressure is lowered and, at the same time, the reversibility is deteriorated in the hydrogen absorption-desorption reaction. Also, the secondary battery comprising the negative electrode containing the particular hydrogen absorbing alloy is rendered low in its discharge voltage, leading to a small discharge capacity. It is more desirable for the atomic ratio "α" to fall within a range of not smaller than 0 and not larger than 0.13, furthermore desirably a range of not smaller than 0 and not larger than 0.1.

The atomic ratio "Z" of general formula (1) of the hydrogen absorbing alloy should fall within a range of from 2.5 to 4.2. If the atomic ratio "Z" is lower than 2.5, the phase having an $AB_2$ type crystal structure such as the $MgCu_2$ structure constitutes the principal phase. On the other hand, if the atomic ratio "Z" exceeds 4.2, the phase having an $AB_5$ type crystal structure such as the $CaCu_5$ structure constitutes the principal phase. It follows that the secondary battery comprising the negative electrode containing the hydrogen absorbing alloy having the atomic ratio "Z" lower than 2.5 or exceeding 4.2 is lowered in its discharge capacity and shortened in its cycle life. It is more desirable for the atomic ratio "Z" to fall within a range of not less than 2.5 and not larger than 4, more desirably a range of not less than 3 and not larger than 3.8, and most desirably a range of not less than 3 and not larger than 3.7.

Particularly, it is desirable for the hydrogen absorbing alloy to have atomic ratios of "a", "X", "Y" and "Z" are respectively satisfy conditions: $0.15 \leq a \leq 0.35$, $0 \leq X \leq 0.3$, $0 \leq Y \leq 0.3$, $2.5 \leq Z \leq 4$. A secondary battery comprising the negative electrode containing the particular hydrogen absorbing alloy makes it possible to markedly improve the discharge capacity and the cycle life.

It is possible for the hydrogen absorbing alloy of the present invention to contain additional elements such as C, N, O and F as impurities as far as the amounts of these impurity elements are not so large as to impair the characteristics of the hydrogen absorbing alloy of the present invention. Incidentally, it is desirable for the amount of each of these impurity elements to be not larger than 1% by weight.

The first hydrogen absorbing alloy of the present invention can be manufactured by, for example, a sintering method, a high frequency induction melting method, or a rapid solidification process. It is desirable to apply a heat treatment to the resultant hydrogen absorbing alloy.

<Second Hydrogen Absorbing Alloy>

The second hydrogen absorbing alloy of the present invention contains as a principal phase at least one phase selected from the group consisting of a first phase having a crystal structure of a hexagonal system excluding a phase having a $CaCu_5$ type structure and a second phase having a rhombohedral crystal structure, wherein a parallel growth region precipitates in at least one crystal grain of the principal phase, the parallel growth region having a crystal structure that differs from a crystal structure of the principal phase, and the hydrogen absorbing alloy has a composition represented by general formula (1) given previously.

The first phase and the second phase referred to above are similar to those described previously in conjunction with the first hydrogen absorbing alloy of the present invention. Also, the term "principal phase" referred to above is equal to that defined previously in conjunction with the first hydrogen absorbing alloy of the present invention.

It is desirable for the principal phase of the second hydrogen absorbing alloy of the present invention to be at least one phase selected from the group consisting of a phase having a $PuNi_3$ structure, a phase having a crystal structure similar to the $PuNi_3$ structure, a phase having a $Ce_2Ni_7$ structure, and a phase having a crystal structure similar to the $Ce_2Ni_7$ structure. Particularly, it is desirable for the principal phase noted above to be at least one phase selected from the group consisting of a phase having a $Ce_2Ni_7$ structure, and a phase having a crystal structure similar to the $Ce_2Ni_7$ structure.

It is desirable for the volume ratio of at least one phase selected from the group consisting of the first phase and the second phase based on the hydrogen absorbing alloy to be at least 50% by volume for the reason described previously in conjunction with the first hydrogen absorbing alloy of the present invention. It is more desirable for the volume ratio noted above to be at least 60% by volume, more desirably at least 70% by volume.

The term "parallel growth" noted above means that a plurality of crystals grow substantially in parallel with at least one axis, as described in "McGraw-Hill DICTIONARY OF SCIENTIFIC AND TECHNICAL TERMS, Published by K.K. Nikkan Kogyyo Shinbun-sha on Jan. 30, 1980, page 1280".

The parallel growth can be observed by photographing with a magnification of 10,000 to 500,000 a transmission electron microscopic image at (1,0,0) plane of a crystal grain of the alloy.

It is desirable for the parallel growth region excluding the principal phase to be formed of at least one kind of a region selected from the group consisting of a region having an $AB_3$ type crystal structure, a region having an $A_2B_7$ crystal structure, and a region having an $A_5B_{19}$ type crystal structure. The $AB_3$ type crystal structure includes, for example, a $PuNi_3$ type and a $CeNi_3$ type. On the other hand, the $A_2B_7$ type crystal structure includes, for example, a $Ce_2Ni_7$ type.

The volume ratio of the parallel growth region of the at least one crystal grain can be measured as follows. Specifically, transmission electron micrographs of optional 30 view fields having a magnification of 20,000 to 70,000 are prepared. An area of the parallel growth region excluding the principal phase is measured for each micrograph. Then, an area ratio of the parallel growth region excluding the principal phase relative to the alloy area within the view field, with the alloy area being set at 100%, was calculated in respect of each micrograph. The average value of the area ratios thus obtained is calculated so as to obtain the volume ratio of the parallel growth region of the at least one crystal grain.

It is desirable to set the volume ratio of the parallel growth region of the at least one crystal grain at 40% by volume or less. If the volume ratio of the parallel growth region exceeds 40% by volume, it is rendered difficult to improve the hydrogen desorption characteristics and the cycle characteristics of the hydrogen absorbing alloy, with the result that there is a possibility that it is rendered difficult to provide a secondary battery having a large discharge capacity and excellent in the charge-discharge cycle life. It is more desirable for the volume ratio of the parallel growth region of the crystal grain to be not higher than 35% by volume, furthermore desirably not higher than 30% by volume.

A ratio of the number of crystal grains whose volume ratio of the parallel growth region is not higher than 40% by volume to the total number of crystal grains can be measured as follows. Specifically, the transmission electron microscopic images of the (1,0,0) plane of the crystal grain in optional 30 view fields are photographed with a magnification of 20,000 to 70,000. An area of the parallel growth region excluding the principal phase is measured for each micrograph. Then, an area ratio of the parallel growth region excluding the principal phase relative to the alloy area within the view field, with the alloy area being set at 100%, is calculated in respect of each micrograph. A ratio of the number of view fields whose volume ratio of the parallel growth region is not higher than 40% by volume to the number of 30 view fields is calculated so as to determine the ratio of the number of crystal grains whose volume ratio of the parallel growth region is not higher than 40% by volume to the total number of crystal grains of the alloy.

It is desirable for the number of crystal grains whose volume ratio of the parallel growth region is not higher than 40% by volume to be not smaller than 60% of the total number of crystal grains of the alloy. If the number of crystal grains whose volume ratio of the parallel growth region is not higher than 40% by volume is smaller than 60% of the total number of crystal grains of the alloy, it is rendered difficult to improve the hydrogen desorption characteristics and the cycle characteristics of the hydrogen absorbing alloy, with the result that there is a possibility that it is rendered difficult to provide a secondary battery having a large discharge capacity and excellent in the charge-discharge cycle life. It is more desirable for the number of crystal grains whose volume ratio of the parallel growth region is not higher than 40% by volume to be not smaller than 65%, furthermore desirably not smaller than 70%, of the total number of crystal grains of the alloy.

It is acceptable for the second hydrogen absorbing alloy of the present invention to contain a phase having an $AB_5$ type crystal structure such as $CaCu_5$ structure, a phase having an $AB_2$ type crystal structure such as $MgCu_2$ structure, or both a phase having an $AB_5$ type crystal structure and a phase having an $AB_2$ type crystal structure in addition to at least one phase selected from the group consisting of the first phase and the second phase.

Particularly, it is desirable for a phase having an $AB_2$ type crystal structure to be present in an amount not larger than 10% by volume, including 0% by volume. If the amount of the phase having an $AB_2$ crystal structure exceeds 10% by volume, the hydrogen absorption-desorption characteristics of the hydrogen absorbing alloy tend to be lowered, with the result that it is possible for the secondary battery comprising the negative electrode containing the particular hydrogen absorbing alloy to be rendered poor in its discharge capacity. It is more desirable for the amount of the phase having the particular crystal structure to be not larger than 5% by volume.

Further, it is desirable for the amount of a phase having an $AB_5$ type crystal structure to be not larger than 10% by volume, more desirably to be not larger than 5% by volume.

It is acceptable for the second hydrogen absorbing alloy of the present invention to contain additional elements such as C, N, O and F as impurities as far as the amounts of these additional elements are not so large as to impair the characteristics of the hydrogen absorbing alloy of the present invention.

Incidentally, it is desirable for the amount of each of these impurity elements to be not larger than 1% by weight.

The second hydrogen absorbing alloy of the present invention can be manufactured by, for example, a sintering method, a high frequency induction melting method, or a rapid solidification process. It is desirable to apply a heat treatment to the resultant hydrogen absorbing alloy.

<Third Hydrogen Absorbing Alloy>

The third hydrogen absorbing alloy of the present invention has less than 0.15, including 0, of an intensity ratio calculated by formula (2) given below:

$$I_1/I_2 \qquad (2)$$

where $I_2$ is an intensity of a storngest peak in a X-ray diffraction pattern using a CuKα ray, and $I_1$ is an intensity of a strongest peak appearing at a value of 2θ that falls within a range of from 8° to 13° in the X-ray diffraction pattern, θ being a Bragg angle.

Incidentally, the intensity ratio ($I_1/I_2$) of zero (0) means that a peak was not detected at the value of 2θ falling within a range of from 8° to 13°. Also, where one peak appears at the value of 2θ falling within a range of from 8° to 13°, the intensity of this peak is set at $I_1$. On the other hand, where a plurality of peaks appear respectively at the value of 2θ falling within a range of from 8° to 13θ and each of the plurality of peaks have a same intensity, the intensity of an optional peak of the plural peaks is set at $I_1$.

In the third hydrogen absorbing alloy of the present invention, an amount of a phase having an $AB_2$ type crystal structure is not larger than 10% by volume, including 0% by volume.

Further, the third hydrogen absorbing alloy of the present invention has a composition represented by general formula (3) given below:

$$R_{1-a-b}Mg_aT_bNi_{z-x}M3_x \qquad (3)$$

where R represents at least one element selected from rare earth elements, the rare earth elements including Y, T represents at least one element selected from the group consisting of Ca, Ti, Zr and Hf, M3 represents at least one element selected from the group consisting of Co, Mn, Fe, Al, Ga, Zn, Sn, Cu, Si, B, Nb, W, Mo, V, Cr, Ta, Li, P and S, the atomic ratios of a, b, X and z are respectively satisfy conditions: $0.15 \leq a \leq 0.37$, $0 \leq b \leq 0.3$, $0 \leq X \leq 2$ and $2.5 \leq Z \leq 4.2$.

The crystal structure of $A_nB_m$ type (where each of n and m represents a natural number) means a crystal structure of a phase having a composition represented by $A_nB_m$, wherein R, Mg and T included in general formula (3) given above belong to the elements A, and Ni and M3 included in general formula (3) belong to the elements B.

If the intensity ratio $(I_1/I_2)$ noted above exceeds 0.15, the hydrogen absorbing characteristics of the hydrogen absorbing alloy are lowered, with the result that the secondary battery comprising the negative electrode containing the particular hydrogen absorbing alloy is rendered poor in the discharge capacity and the cycle life. It is more desirable for the intensity ratio $(I_1/I_2)$ to be not higher than 0.1, furthermore desirably not higher than 0.05.

If the amount of the phase having the $AB_2$ type crystal structure exceeds 10% by volume in the third hydrogen absorbing alloy of the present invention, the hydrogen absorbing/desorbing characteristics of the hydrogen absorbing alloy are lowered, with the result that the secondary battery comprising the negative electrode containing the particular hydrogen absorbing alloy is rendered poor in the discharge capacity. It is more desirable for the amount of the phase having the $AB_2$ type crystal structure to be not larger than 5% by volume.

It is desirable for the third hydrogen absorbing alloy of the present invention to contain a phase having an $AB_5$ type crystal structure in an amount not larger than 10% by volume, more desirably not larger than 5% by volume.

It is desirable for the third hydrogen absorbing alloy of the present invention to contain as a principal phase at least one kind of a phase selected from the group consisting of a first phase having a crystal structure of a hexagonal system, excluding a phase having a $CaCu_5$ type structure, and a second phase having a rhombohedral crystal system. The term "principal phase" noted above is equal to that defined previously in conjunction with the first hydrogen absorbing alloy of the present invention.

The first phase and the second phase referred to above are equal to those described previously in conjunction with the first hydrogen absorbing alloy of the present invention.

It is desirable for the principal phase of the third hydrogen absorbing alloy of the present invention to be at least one phase selected from the group consisting of a phase having a $PuNi_3$ structure, a phase having a crystal structure similar to the $PuNi_3$ structure, a phase having a $Ce_2Ni_7$ structure, and a phase having a crystal structure similar to the $Ce_2Ni_7$ structure. Particularly, it is desirable for the principal phase noted above to be at least one phase selected from the group consisting of a phase having a $Ce_2Ni_7$ structure, and a phase having a crystal structure similar to the $Ce_2Ni_7$ structure.

It is desirable for the volume ratio of at least one phase selected from the group consisting of the first phase and the second phase based on the hydrogen absorbing alloy to be at least 50% by volume. If the volume ratio of the particular phase noted above is lower than 50% by volume, the hydrogen storage capacity of the hydrogen absorbing alloy tends to be lowered, with the result that the secondary battery comprising the negative electrode containing the particular hydrogen absorbing alloy tends to be rendered poor in its discharge capacity or tends to be rendered shorter in the charge-discharge cycle life. It is more desirable for the volume ratio of the particular phase noted above to be not lower than 60% by volume, furthermore desirably not lower than 70% by volume.

In order to lower the manufacturing cost of the electrode containing the hydrogen absorbing alloy, it is desirable for R included in general formula (3) of the hydrogen absorbing alloy to be at least one element selected from the group consisting of La, Ce, Pr, Nd and Y. Particularly, it is desirable to use a mish metal, which is a mixture of rare earth elements, as R. The mish metal that can be used in the present invention includes a Ce-rich mish metal (Mm) and a La-rich mish metal (Lm).

It is desirable for R to include La. The La content should desirably fall within a range of from 45% by weight to 95% by weight. If the La content is lower than 45% by weight, the hydrogen absorbing alloy tends to be pulverized by the repetition of the hydrogen absorption-desorption. Therefore, the secondary battery comprising the negative electrode containing the particular hydrogen absorbing alloy tends to incur the shortening of the cycle life. On the other hand, if the La content exceeds 95% by weight, the equilibrium pressure of the hydrogen absorbing alloy tends to be lowered, with the result that the secondary battery comprising the negative electrode containing the particular hydrogen absorbing alloy tends to incur a decrease of the discharge voltage. It is more desirable for the La content to exceed 60% by weight and to be not higher than 90% by weight.

Where Ce is contained in R, it is desirable for the Ce content of R to be lower than 20% by weight. If the Ce content is not lower than 20% by weight, phases other than the desired phase, e.g., the $CaCu_5$ type phase, tend to be precipitated in a large amount so as to decrease the hydrogen storage capacity. It is more desirable for the Ce content to be lower than 18% by weight, furthermore desirably, to be lower than 16% by weight.

In the present invention, the atomic ratio "a" in general formula (3) of the hydrogen absorbing alloy is defined to fall within a range of from 0.15 to 0.37. If the atomic ratio "a" falls within the range specified in the present invention, the hydrogen storage capacity is increased and desorption of hydrogen is facilitated, thereby improving the discharge capacity of the secondary battery. If the atomic ratio "a" is lower than 0.15, the hydrogen desorbing characteristics of the hydrogen absorbing alloy are deteriorated. On the other hand, if the atomic ratio "a" exceeds 0.37, the hydrogen storage capacity is markedly decreased, resulting in failure to obtain a secondary battery having a large discharge capacity. It should be noted that the intensity of the peak appearing at the value of 2θ falling within a range of from 8° to 13° in the X-ray diffraction pattern is increased with increase in the atomic ratio "a", leading to an increase in the intensity ratio $(I_1/I_2)$. It follows that it is more desirable for the atomic ratio "a" to fall within a range of not less than 0.15 and not larger than 0.35, more desirably, a range of not less than 0.15 and not larger than 0.32, and most desirably, a range of not less than 0.17 and not larger than 0.3.

The hydrogen absorbing alloy of the present invention contains an element T. Where T is contained in the hydrogen absorbing alloy, the characteristics such as the hydrogen desorption rate can be improved or the pulverization of the hydrogen absorbing alloy accompanying the hydrogen absorption-desorption can be suppressed without markedly decreasing the hydrogen storage capacity of the hydrogen absorbing alloy.

The atomic ratio "b" in general formula (3) of the hydrogen absorbing alloy is defined to fall within a range of from 0 to 0.3. If the atomic ratio "b" exceeds 0.3, it is impossible to obtain the effects described above, i.e., the effects of improving the hydrogen desorption characteristics and of suppressing the pulverization of the hydrogen absorbing alloy, with the result that the secondary battery comprising the negative electrode containing the particular hydrogen absorbing alloy incurs a decrease in the discharge capacity. It is more desirable for the atomic ratio "b" to fall within a range of not less than 0 and not larger than 0.2, more desirably a range of not less than 0 and not larger than 0.1.

The third hydrogen absorbing alloy of the present invention contains an element M3. Where M3 is contained in the hydrogen absorbing alloy, the hydrogen absorption-desorption characteristics such as the hydrogen absorption-desorption rate of the hydrogen absorbing alloy can be improved. It is considered reasonable to understand that the M3 addition facilitates the diffusion of hydrogen in the hydrogen absorbing alloy or facilitates the hydrogen absorption-desorption of the hydrogen absorbing alloy. It should also be noted that a secondary battery comprising the negative electrode containing the particular hydrogen absorbing alloy permits improving the charge-discharge cycle characteristics.

The atomic ratio "X" of general formula (3) of the hydrogen absorbing alloy should not exceed 2.0. If the atomic ratio "X" exceeds 2.0, the discharge capacity of the secondary battery is lowered. It is more desirable for the atomic ratio "X" to fall within a range of from 0 to 0.5.

The atomic ratio "Z" of general formula (3) of the hydrogen absorbing alloy should fall within a range of from 2.5 to 4.2. If the atomic ratio "Z" is lower than 2.5, a large amount of hydrogen is irreversible in the hydrogen absorbing alloy, with the result that the hydrogen desorbing rate is lowered. On the other hand, if the atomic ratio "Z" exceeds 4.2, the phase having an $AB_5$ type crystal structure is generated in a large amount. It follows that the secondary battery comprising the negative electrode containing the particular hydrogen absorbing alloy is lowered in its discharge capacity. It is more desirable for the atomic ratio "Z" to fall within a range of from 3.0 to 4.0.

Particularly, it is desirable for the hydrogen absorbing alloy to have atomic ratios of "a" and "X" are respectively satisfy conditions of: $0.15 \leq a \leq 0.35$ and $0 \leq X \leq 05$. A secondary battery comprising the negative electrode containing the particular hydrogen absorbing alloy makes it possible to markedly improve the discharge capacity and the cycle life.

It is possible for the hydrogen absorbing alloy of the present invention to contain additional elements such as C, N, O and F as impurities as far as the amounts of these impurity elements are not so large as to impair the characteristics of the hydrogen absorbing alloy of the present invention. Incidentally, it is desirable for the amount of each of these impurity elements to be not larger than 1% by weight.

The third hydrogen absorbing alloy of the present invention can be manufactured by, for example, a sintering method, a high frequency induction melting method, or a rapid solidification process. It is desirable to apply a heat treatment to the resultant hydrogen absorbing alloy.

<Fourth Hydrogen Absorbing Alloy>

In the fourth hydrogen absorbing alloy of the present invention, the intensity ratio calculated by formula (2) referred to previously is smaller than 0.15, including 0. Also, the fourth hydrogen absorbing alloy of the present invention has a composition represented by general formula (3) referred to previously. Further, a parallel growth region precipitates in at least one crystal grain of a principal phase of the hydrogen absorbing alloy. The parallel growth region has a crystal structure differing from a crystal structure of the principal phase.

The term "principal phase" used herein means the phase that occupies the largest volume in the hydrogen absorbing alloy, or occupies the largest area in a cross section of the hydrogen absorbing alloy. Particularly, it is desirable for the principal phase to occupy at least 50% by volume of the hydrogen absorbing alloy. It is more desirable for the volume ratio of the principal phase to be at least 60% by volume, more desirably at least 70% by volume.

The term "parallel growth" noted above means that a plurality of crystals grow substantially in parallel with at least one axis, as described in the "McGraw-Hill DICTIONARY OF SCIENTIFIC AND TECHNICAL TERMS, Published by K.K. Nikkan Kogyyo Shinbun-sha on Jan. 30, 1980, page 1280".

The parallel growth can be observed by photographing with a magnification of 10,000 to 500,000 a transmission electron microscopic image at (1,0,0) plane of a crystal grain of the alloy.

The parallel growth region excluding the principal phase includes those described previously in conjunction with the second hydrogen absorbing alloy of the present invention.

It is desirable to set the volume ratio of the parallel growth region that differs from the principal phase at 40% by volume or less of the at least one crystal grain. If the volume ratio of the parallel growth region exceeds 40% by volume, it is rendered difficult to improve the hydrogen desorption characteristics and the cycle characteristics of the hydrogen absorbing alloy, with the result that there is a possibility that it is rendered difficult to provide a secondary battery having a large discharge capacity and excellent in the charge-discharge cycle life. It is more desirable for the volume ratio of the parallel growth region of the crystal grain to be not higher than 35% by volume, furthermore desirably not higher than 30% by volume.

It is desirable for the number of crystal grains whose volume ratio of the parallel growth region that differs from the principal phase is not higher than 40% to be not smaller than 60% of the total number of crystal grains of the alloy. If the number of crystal grains is smaller than 60% of the total number of crystal grains of the alloy, it is rendered difficult to improve the hydrogen desorption characteristics and the cycle characteristics of the hydrogen absorbing alloy, with the result that there is a possibility that it is rendered difficult to provide a secondary battery having a large discharge capacity and excellent in the charge-discharge cycle life. It is more desirable for the number of crystal grains to be not smaller than 65%, furthermore desirably not smaller than 70%, of the total number of crystal grains of the alloy.

It is desirable for the principal phase of the fourth hydrogen absorbing alloy of the present invention to be at least one kind of a phase selected from the group consisting of a first phase in which the crystal structure is of a hexagonal system, excluding the phase having a CaCu$_5$ type structure, and a second phase having a rhombohedral crystal structure.

The first phase and the second phase referred to above are equal to those described previously in conjunction with the first hydrogen absorbing alloy of the present invention.

It is desirable for the principal phase of the fourth hydrogen absorbing alloy of the present invention to be at least one kind of a phase selected from the group consisting of a phase having a PuNi$_3$ structure, a phase having a crystal structure similar to the PuNi$_3$ structure, a phase having a Ce$_2$Ni$_7$ structure, and a phase having a crystal structure similar to the Ce$_2$Ni$_7$ structure. Particularly, it is desirable for the principal phase of the fourth hydrogen absorbing alloy of the present invention to be at least one kind of a phase selected from the group consisting of a phase having a Ce$_2$Ni$_7$ structure, and a phase having a crystal structure similar to the Ce$_2$Ni$_7$ structure.

It is desirable for the volume ratio of at least one phase selected from the group consisting of the first phase and the second phase to be not lower than 50% by volume based on the hydrogen absorbing alloy. If the volume ratio noted above is lower than 50% by volume, the hydrogen storage capacity of the hydrogen absorbing alloy tends to be lowered, with the result that the secondary battery comprising the negative electrode containing the particular hydrogen absorbing alloy tends to be lowered in the discharge capacity or to be shortened in the charge-discharge cycle life. It is more desirable for the volume ratio of the particular phase to be not lower than 60% by volume, more desirably not lower than 70% by volume.

In the fourth hydrogen absorbing alloy of the present invention, it is desirable for the amount of the phase having a crystal structure of AB$_2$ type to be not larger than 10% by volume, including 0% by volume. If the amount of the particular phase exceeds 10% by volume, the hydrogen absorption-desorption characteristics of the hydrogen absorbing alloy tend to be lowered, with the result that the secondary battery comprising the negative electrode containing the particular hydrogen absorbing alloy tends to be lowered in its discharge capacity. It is more desirable for the amount of the particular phase to be not larger than 5% by volume.

In the fourth hydrogen absorbing alloy of the present invention, it is desirable for the amount of the phase having a crystal structure of AB$_5$ type to be not larger than 10% by volume, more desirably to be not larger than 5% by volume.

It is acceptable for the fourth hydrogen absorbing alloy of the present invention to contain additional elements such as C, N, O and F as impurities as far as the amounts of these additional elements are not so large as to impair the characteristics of the hydrogen absorbing alloy of the present invention.

Incidentally, it is desirable for the amount of each of these impurity elements to be not larger than 1% by weight.

The fourth hydrogen absorbing alloy of the present invention can be manufactured by, for example, a sintering method, a high frequency induction melting method, or a rapid solidification process. It is desirable to apply a heat treatment to the resultant hydrogen absorbing alloy.

<Fifth Hydrogen Absorbing Alloy>

The fifth hydrogen absorbing alloy of the present invention has a composition represented by general formula (4) given below and, in the fifth hydrogen absorbing alloy of the present invention, it is desirable for a phase having an AB$_2$ type crystal structure to be contained in the fifth hydrogen absorbing alloy of the present invention in an amount not larger than 10% by volume, including 0% by volume:

$$R_{1-a}Mg_{a}Ni_{Z-X-Y}Al_{X}Co_{Y}M4_{\alpha} \qquad (4)$$

where R represents at least one element selected from rare earth elements, the rare earth elements including Y and a Ce content of the R being lower than 20% by weight including 0% by weight, M4 represents at least one element selected from the group consisting of Mn, Fe, Al, Ga, Zn, Sn, Cu, Si, B, Nb, W, Ti, Zr, In, Mo, V, Cr, P and S, the atomic ratio s of a, X, Y, Z and α are respectively satisfy conditions: $0.15 \leq a \leq 0.33$, $0.06 \leq X \leq 0.15$, $0 > Y \leq 0.2$, $3.15 < Z \leq 3.55$ and $0 \leq \alpha < 0.135$.

The crystal structure of A$_n$B$_m$ type (where each of n and m represents a natural number) means a crystal structure of a phase having a composition represented by A$_n$B$_m$, wherein R and Mg included in general formula (4) given above belong to the elements A, and Ni, Al, Co and M4 included in general formula (4) belong to the elements B.

In the present invention, the atomic ratio "a" in general formula (4) of the hydrogen absorbing alloy is defined to fall within a range of from 0.15 to 0.33. If the atomic ratio "a" is lower than 0.15, the hydrogen absorbed in the hydrogen absorbing alloy is rendered stable, with the result that the hydrogen is rendered unlikely to be desorbed from the hydrogen absorbing alloy. On the other hand, if the atomic ratio "a" exceeds 0.33, the phases other than the desired phase, e.g., the phase of CaCu$_5$ type, tend to be precipitated easily, with the result that the hydrogen storage capacity is decreased. It is more desirable for the atomic ratio "a" to satisfy condition of: $0.17 \leq a \leq 0.31$, more desirably, $0.18 \leq a \leq 0.3$.

In order to lower the manufacturing cost of the electrode containing the hydrogen absorbing alloy, it is desirable for R included in general formula (4) of the hydrogen absorbing alloy to be at least one element selected from the group consisting of La, Ce, Pr, Nd and Y. Particularly, it is desirable to use a mish metal, which is a mixture of rare earth elements, as R.

In the present invention, the Ce amount contained in R is defined to be less than 20% by weight. If the Ce amount is 20% by weight or more, phases other than the desired phase, e.g., the phase of CaCu$_5$ type, is precipitated in a large amount so as to decrease the hydrogen storage capacity of the hydrogen absorbing alloy. It is more desirable for the Ce amount to be smaller than 18% by weight, furthermore desirably smaller than 16% by weight.

It is desirable for R to include La. The La content should desirably fall within a range of from 45% by weight to 95% by weight. If the La content is lower than 45% by weight, the hydrogen absorbing alloy tends to be pulverized by the repetition of the hydrogen absorption-desorption. Therefore, the secondary battery comprising the negative electrode containing the particular hydrogen absorbing alloy tends to incur the shortening of the cycle life. On the other hand, if the La content exceeds 95% by weight, the equilibrium pressure of the hydrogen absorbing alloy tends to be lowered, with the result that the secondary battery comprising the negative electrode containing the particular hydrogen absorbing alloy tends to incur a decrease of the discharge voltage. It is more desirable for the La content to exceed 60% by weight and to be not higher than 90% by weight.

The atomic ratio "X" of general formula (4) of the hydrogen absorbing alloy should fall within a range of from 0.06 to 0.15. If the atomic ratio "X" is lower than 0.06, the deterioration of the characteristics caused by the oxidation of the hydrogen absorbing alloy under a high temperature environment is prominently accelerated. On the other hand, if the atomic ratio "X" exceeds 1.5, it is possible for the phase other than the desired phase, e.g., the phase of $CaCu_5$ type, to be precipitated in a large amount. It is more desirable for the atomic ratio "X" to satisfy condition of: $0.07 \leq X \leq 0.13$, furthermore desirably $0.08 \leq X \leq 0.12$.

The atomic ratio "Y" of general formula (4) of the hydrogen absorbing alloy should not exceed 0.2. Even if the atomic ratio "Y" of Co is set higher than 0.2 in the hydrogen absorbing alloy in which the atomic ratio "X" of Al falls within the range referred to above, it is impossible to improve the corrosion resistance of the hydrogen absorbing alloy. In addition, it is disadvantageous in terms of the manufacturing cost of the hydrogen absorbing alloy to increase the atomic ratio "Y" to exceed 0.2. It is more desirable for the atomic ratio "Y" to satisfy condition of: $0 \leq Y \leq 0.18$, furthermore desirably $0 \leq Y \leq 0.15$.

The atomic ratio "a" of general formula (4) of the hydrogen absorbing alloy should fall within a range of not less than 0 and less than 0.135. If the atomic ratio "α" is 0.135 or more, the phase other than the desired phase, e.g., the phase of $CaCu_5$ type, tends to be precipitated, with the result that it is possible for the hydrogen storage capacity of the hydrogen absorbing alloy to be lowered. It is more desirable for the atomic ratio "a" to satisfy condition of: $0 \leq \alpha \leq 0.13$, furthermore desirably between $0 \leq \alpha \leq 0.12$, and most desirably between $0 \leq \alpha \leq 0.1$.

The atomic ratio "Z" of general formula (4) of the hydrogen absorbing alloy should fall within a range of higher than 3.15 and not higher than 3.55. If the atomic ratio "Z" is not larger than 3.15, the Laves phase having an $AB_2$ type crystal structure tends to be precipitated, with the result that the irreversible hydrogen is increased with progress in the repetition of the hydrogen absorption-desorption so as to markedly decrease the hydrogen storage capacity. On the other hand, if the atomic ratio "Z" exceeds 3.55, the phase other than the desired phase, e.g., the phase of the $CaCu_5$ type, tends to be precipitated easily so as to decrease the hydrogen storage capacity of the hydrogen absorbing alloy. It is more desirable for the atomic ratio "Z" to satisfy condition of: $3.17 \leq Z \leq 3.53$, more desirably $3.18 \leq Z \leq 3.52$.

If the amount of the phase having the $AB_2$ type crystal structure, which is contained in the fifth hydrogen absorbing alloy of the present invention, exceeds 10% by volume, the hydrogen absorption-desorption characteristics of the hydrogen absorbing alloy are lowered, with the result that the secondary battery comprising the negative electrode containing the particular hydrogen absorbing alloy is lowered in its discharge capacity. It is more desirable for the amount of the phase having the $AB_2$ type crystal structure to be not larger than 5% by volume.

It is desirable for the amount of the phase having the $AB_5$ type crystal structure, which is contained in the fifth hydrogen absorbing alloy of the present invention, not to exceed 10% by volume, more desirably not to exceed 5% by volume.

It is desirable for the fifth hydrogen absorbing alloy of the present invention to contain as a principal phase at least one kind of a phase selected from the group consisting of a first phase having a crystal structure of the hexagonal system, excluding the phase having the $CaCu_5$ type structure, and a second phase having a rhombohedral crystal system. The term "principal phase" noted above is equal to that defined previously in conjunction with the first hydrogen absorbing alloy of the present invention.

The first phase and the second phase referred to above are equal to those described previously in conjunction with the first hydrogen absorbing alloy of the present invention.

It is desirable for the principal phase of the fifth hydrogen absorbing alloy of the present invention to be at least one phase selected from the group consisting of a phase having a $PuNi_3$ structure, a phase having a crystal structure similar to the $PuNi_3$ structure, a phase having a $Ce_2Ni_7$ structure, and a phase having a crystal structure similar to the $Ce_2Ni_7$ structure. Particularly, it is desirable for the principal phase noted above to be at least one phase selected from the group consisting of a phase having a $Ce_2Ni_7$ structure, and a phase having a crystal structure similar to the $Ce_2Ni_7$ structure.

It is desirable for the volume ratio of at least one phase selected from the group consisting of the first phase and the second phase based on the hydrogen absorbing alloy to be at least 50% by volume. If the volume ratio of the particular phase noted above is lower than 50% by volume, the hydrogen storage capacity of the hydrogen absorbing alloy tends to be lowered, with the result that the secondary battery comprising the negative electrode containing the particular hydrogen absorbing alloy tends to be rendered poor in its discharge capacity or tends to be rendered shorter in the charge-discharge cycle life. It is more desirable for the volume ratio of the particular phase noted above to be not lower than 60% by volume, furthermore desirably not lower than 70% by volume.

It is possible for the hydrogen absorbing alloy of the present invention to contain additional elements such as C, N, O and F as impurities as far as the amounts of these impurity elements are not so large as to impair the characteristics of the hydrogen absorbing alloy of the present invention. Incidentally, it is desirable for the amount of each of these impurity elements to be not larger than 1% by weight.

The fifth hydrogen absorbing alloy of the present invention can be manufactured by, for example, a sintering method, a high frequency induction melting method, or a rapid solidification process. It is desirable to apply a heat treatment to the resultant hydrogen absorbing alloy.

<Sixth Hydrogen Absorbing Alloy>

The sixth hydrogen absorbing alloy of the present invention has a composition represented by general formula (4) referred to previously. Also, a parallel growth region precipitates in at least one crystal grain of a principal phase of the hydrogen absorbing alloy. The parallel growth region has a crystal structure differing from a crystal structure of the principal phase.

The term "principal phase" denotes the phase occupying the largest volume in the hydrogen absorbing alloy or the phase occupying the largest area in a cross section of the hydrogen absorbing alloy. Particularly, it is desirable for the volume ratio of the principal phase in the hydrogen absorbing alloy to be not lower than 50% by volume, more desirably not lower than 60% by volume, and furthermore desirably not lower than 70% by volume.

The term "parallel growth" noted above means that a plurality of crystals grow substantially in parallel with at least one axis, as described in the "McGraw-Hill DICTIONARY OF SCIENTIFIC AND TECHNICAL TERMS, Published by K.K. Nikkan Kogyyo Shinbun-sha on Jan. 30, 1980, page 1280".

The parallel growth can be observed by photographing with a magnification of 10,000 to 500,000 a transmission electron microscopic image at (1,0,0) plane of a crystal grain of the alloy.

The parallel growth region excluding the principal phase includes those described previously in conjunction with the second hydrogen absorbing alloy of the present invention.

It is desirable for the volume ratio of the parallel growth region, which differs from the principal phase, to be not higher than 40% by volume of the at least one crystal grain. If the volume ratio noted above exceeds 40% by volume, it is difficult to improve the hydrogen desorption characteristics and the cycle characteristics of the hydrogen absorbing alloy, with the result that it is difficult to provide a secondary battery having a large discharge capacity and excellent in the charge-discharge cycle life. It is more desirable for the volume ratio noted above to be not higher than 35% by volume, furthermore desirably not higher than 30% by volume.

It is desirable for the number of crystal grains, in which the volume ratio of the parallel growth region that differs from the principal phase, is not higher than 40% by volume, to be not smaller than 60% of the number of all the crystal grains of the alloy. If the number of crystal grains noted above is smaller than 60% of the number of all the crystal grains of the alloy, it is difficult to improve the hydrogen desorption characteristics and the cycle characteristics of the hydrogen absorbing alloy, with the result that it is difficult to provide a secondary battery having a large discharge capacity and excellent in the charge-discharge cycle life. It is more desirable for the number of crystal grains noted above to be not smaller than 65%, furthermore desirably not smaller than 70%, of the number of all the crystal grains of the hydrogen absorbing alloy.

It is desirable for the principal phase to be formed of at least one phase selected from the group consisting of a first phase having a crystal structure of the hexagonal system, excluding the phase having the $CaCu_5$ structure, and a second phase having a rhombohedral crystal structure. The first phase and the second phase include those described previously in conjunction with the first hydrogen absorbing alloy.

It is desirable for the principal phase of the sixth hydrogen absorbing alloy of the present invention to be at least one phase selected from the group consisting of a phase having a $PuNi_3$ structure, a phase having a crystal structure similar to the $PuNi_3$ structure, a phase having a $Ce_2Ni_7$ structure, and a phase having a crystal structure similar to the $Ce_2Ni_7$ structure. Particularly, it is desirable for the principal phase noted above to be at least one phase selected from the group consisting of a phase having a $Ce_2Ni_7$ structure, and a phase having a crystal structure similar to the $Ce_2Ni_7$ structure.

It is desirable for the volume ratio of at least one phase selected from the group consisting of the first phase and the second phase to be not lower than 50% by volume based on the hydrogen absorbing alloy. If the volume ratio noted above is lower than 50% by volume, the hydrogen storage capacity of the hydrogen absorbing alloy tends to be decreased. It follows that the secondary battery comprising the negative electrode containing the particular hydrogen absorbing alloy tends to be low in the discharge capacity or tends to be short in the charge-discharge cycle life. It is more desirable for the volume ratio in question to be not lower than 60% by volume, furthermore desirably not lower than 70% by volume.

In the sixth hydrogen absorbing alloy of the present invention, it is desirable for a phase having an $AB_2$ type crystal structure to be present in an amount not larger than 10% by volume, including 0% by volume. If the amount of the phase having an $AB_2$ crystal structure exceeds 10% by volume, the hydrogen absorption-desorption characteristics of the hydrogen absorbing alloy tend to be lowered, with the result that it is possible for the secondary battery comprising the negative electrode containing the particular hydrogen absorbing alloy to be rendered poor in its discharge capacity. It is more desirable for the amount of the phase having the particular crystal structure to be not larger than 5% by volume.

Further, in the sixth hydrogen absorbing alloy of the present invention, it is desirable for the amount of a phase having an $AB_5$ type crystal structure to be not larger than 10% by volume, more desirably to be not larger than 5% by volume.

It is acceptable for the sixth hydrogen absorbing alloy of the present invention to contain additional elements such as C, N, O and F as impurities as far as the amounts of these additional elements are not so large as to impair the characteristics of the hydrogen absorbing alloy of the present invention.

Incidentally, it is desirable for the amount of each of these impurity elements to be not larger than 1% by weight.

The sixth hydrogen absorbing alloy of the present invention can be manufactured by, for example, a sintering method, a high frequency induction melting method, or a rapid solidification process. It is desirable to apply a heat treatment to the resultant hydrogen absorbing alloy.

The secondary battery of the present invention will now be described.

The secondary battery of the present invention comprises an electrode group including a positive electrode, a negative electrode containing the hydrogen absorbing alloy, and a separator interposed between the positive electrode and the negative electrode, and an alkaline electrolyte impregnated in the electrode group. The hydrogen absorbing alloy selected from the group consisting of the first to sixth hydrogen absorbing alloys of the present invention described above can be used for forming the negative electrode of the secondary battery.

The positive electrode, the negative electrode, the separator and the electrolyte included in the secondary battery of the present invention will now be described in detail.

1) Positive Electrode

For preparing the positive electrode, a conductive material is added to, for example, a nickel hydroxide powder used as an active material, and the resultant mixture is kneaded together with a binder polymer and water so as to obtain a paste. Then, a conductive substrate is filled with the resultant paste, followed by drying the paste and pressing the conductive substrate so as to obtain the desired positive electrode.

It is possible for the nickel hydroxide powder to contain at least one compound selected from the group consisting of zinc oxide, cobalt oxide, zinc hydroxide and cobalt hydroxide.

The conductive material used in the present invention includes, for example, cobalt oxide, cobalt hydroxide, metalic cobalt, metalic nickel and carbon.

The binder polymer used in the present invention includes, for example, carboxymethyl cellulose, methyl cellulose, sodium polyacrylate, and polytetrafluoro ethylene.

Further, the conductive substrate used in the present invention includes, for example, a mesh-shaped, a sponge-shaped, a fibrous or a felt-shaped porous metal body formed of nickel, a stainless steel or a metal plated with nickel.

2) Negative Electrode

For preparing the negative electrode, a conductive material is added to a powder of the hydrogen absorbing alloy described previously, and the resultant mixture is kneaded together with a binder polymer and water so as to obtain a paste. Then, the paste thus prepared is loaded in a conductive substrate, followed by drying the paste and pressing the conductive substrate so as to obtain a desired negative electrode.

The binder polymer similar to that described previously in conjunction with the positive electrode can also be used for preparing the negative electrode.

The conductive material used for preparing the negative electrode includes, for example, carbon black.

It is possible to add oxides such as $Y_2O_3$, $Er_2O_3$, $Yb_2O_3$, $Sm_2O_3$, $Mn_3O_4$, $LiMn_2O_4$, $Nb_2O_5$, and $SnO_2$ to the paste noted above. Where the negative electrode contains the oxides noted above, it is possible to improve the cycle life of the secondary battery under high temperatures. It is possible to add the oxides singly or in the form of a mixture of a plurality of oxides. It is desirable for the addition amount of the oxide to fall within a range of from 0.2 to 5% by weight, more desirably from 0.4 to 2% by weight, based on the weight of the hydrogen absorbing alloy.

The conductive substrate used for preparing the negative electrode includes, for example, a two dimensional substrate such as a punched metal, an expanded metal or a nickel net, and a three dimensional substrate such as a felt-shaped metal porous body or a sponge-shaped metal substrate.

3) Separator

The separator includes, for example, a polymer unwoven fabric such as a polypropylene unwoven fabric, a Nylon unwoven fabric and an unwoven fabric containing a polypropylene fiber and a Nylon fiber. Particularly, a polypropylene unwoven fabric having the surface subjected to a hydrophilic treatment is adapted for use as the separator.

4) Alkaline Electrolyte

The alkaline electrolyte used in the present invention includes, for example, an aqueous solution of sodium hydroxide (NaOH), an aqueous solution of lithium hydroxide (LiOH), an aqueous solution of potassium hydroxide (KOH), a mixed solution of NaOH and LiOH, a mixed solution of KOH and LiOH, and a mixed solution of KOH, LiOH and NaOH.

Figure 2:
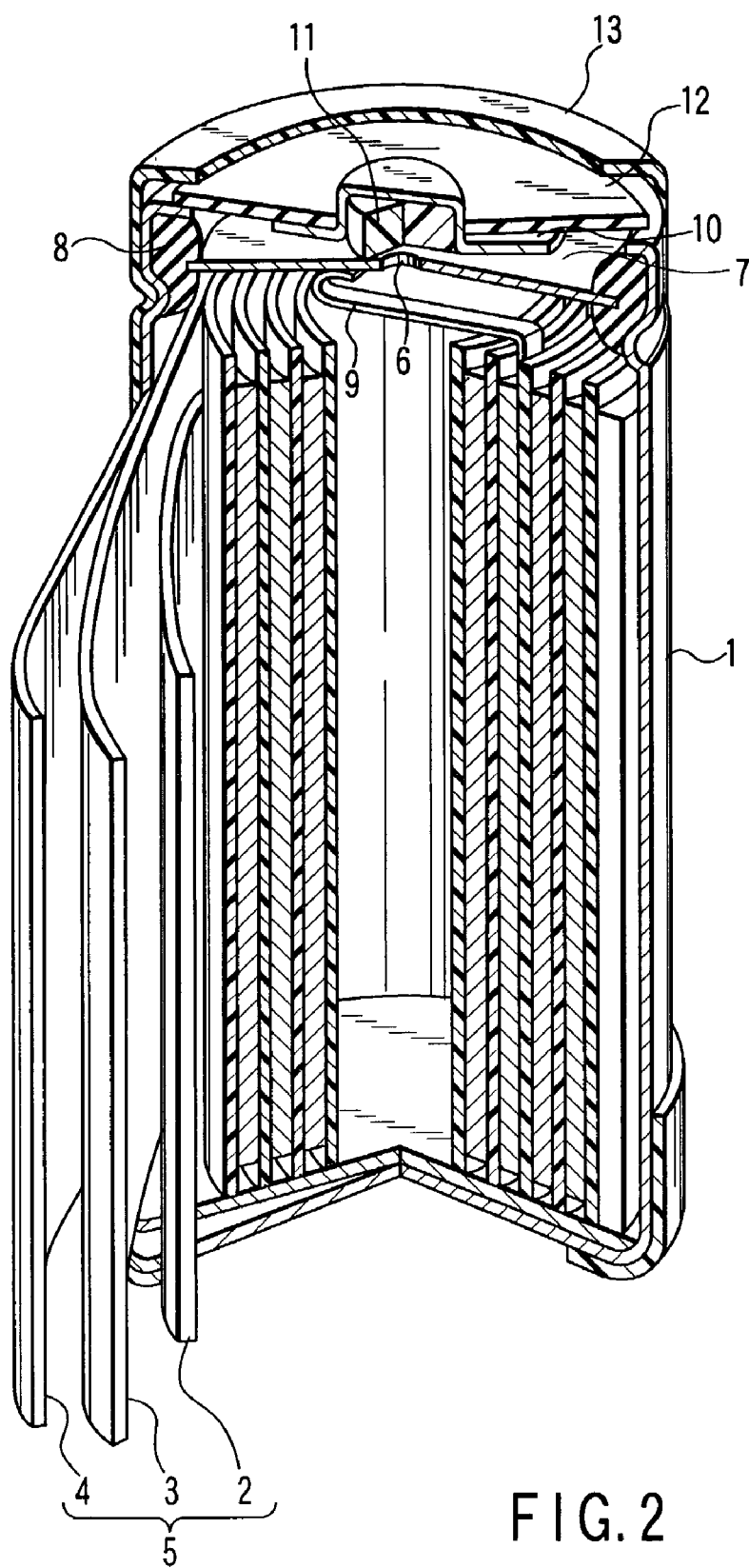
FIG. 2 is an oblique view, partly broken away, showing as an example the construction of a secondary battery of the present invention.

FIG. 2 shows a cylindrical alkali secondary battery as an example of the secondary battery of the present invention.

As shown in FIG. 2, an electrode group 5 prepared by spirally winding a laminate structure consisting of a positive electrode 2, a separator 3 and a negative electrode 4 is housed in a cylindrical case 1. The negative electrode 4 is arranged to constitute the outermost circumferential layer of the electrode group 5 so as to be electrically connected to the case 1. An alkaline electrolyte is housed in the case 1. A circular sealing plate 7 having a hole 6 formed in the center is arranged in the upper open portion of the case 1. An annular insulating gasket 8 is arranged between the circumferential edge of the sealing plate 7 and the inner surface of the upper open portion of the case 1. The sealing plate 7 is hermetically fixed to the case 1 via the gasket 8 by the caulking treatment to deform inward the upper open portion of the case 1 in a manner to decrease the diameter of the upper portion of the case 1. A positive lead 9 is connected at one end to the positive electrode 2 and at the other end to the lower surface of the sealing plate 7. A hat-shaped positive electrode terminal 10 is mounted to the sealing plate 7 in a manner to cover the hole 6. A safety vent 11 made of rubber is arranged in a free space surrounded by the sealing plate 7 and the positive electrode terminal 10 in a manner to close the hole 6. A circular holding plate 12 having a hole formed in the center and made of an insulating material is arranged such that the projecting portion of the positive electrode terminal 10 projects onto the positive electrode terminal 10 through the hole of the holding plate 10. Further, an outer tube 13 is arranged to cover the outer periphery of the holding plate 12, the side surface of the case 1 and the outer periphery in the bottom portion of the case 1.

It is possible for the secondary battery of the present invention to be a rectangular alkali secondary battery constructed such that an electrode group prepared by alternately laminating a positive electrode and a negative electrode with a separator being interposed therebetween is housed in a rectangular case together with an alkaline electrolyte as well as a cylindrical alkali secondary battery shown in FIG. 2.

A hybrid car and an electric automobile of the present invention will now be described.

The hybrid car of the present invention comprises an external combustion engine or an internal combustion engine, an electric driving mechanism provided by, for example, a motor, and a power source for the electrical driving mechanism. The power source comprises a secondary battery comprising a positive electrode, a negative electrode containing a hydrogen absorbing alloy, and an alkaline electrolyte. It is possible to use at least one kind of the hydrogen absorbing alloy selected from the group consisting of the first to sixth hydrogen absorbing alloys of the present invention described previously for forming the negative electrode included in the secondary battery.

The hybrid car of the present invention includes a type that a dynamo is driven by an external combustion engine or an internal combustion engine and the power generated from the dynamo and the power generated from the secondary battery are supplied to the electric driving mechanism so as to drive the wheels of the car, and another type that the driving forces generated from both the external combustion engine or the internal combustion engine and the secondary battery are supplied appropriately to the electric driving mechanism so as to drive the wheels of the hybrid car.

The electric automobile of the present invention comprises a secondary battery as a driving power source. The secondary battery comprises a positive electrode, a negative electrode containing a hydrogen absorbing alloy, and an alkaline electrolyte. It is possible to use at least one kind of the hydrogen absorbing alloy selected from the group consisting of the first to sixth hydrogen absorbing alloys of the present invention described previously for forming the negative electrode included in the secondary battery.

The first hydrogen absorbing alloy of the present invention described above contains as a principal phase at least one kind of a phase selected from the group consisting of a first phase having a crystal structure of a hexagonal system, excluding a phase of a $CaCu_5$ type structure, and a second phase having a rhombohedral crystal structure. An amount of a phase having an $AB_2$ type crystal structure, which is contained in the first hydrogen absorbing alloy of the present invention, is not larger than 10% by volume, including 0% by volume. Also, the first hydrogen absorbing alloy of the present invention has a composition represented by general formula (1) given previously. The first hydrogen absorbing alloy of the particular construction permits improving the hydrogen desorption characteristics of the hydrogen absorbing alloy, with the result that it is possible to improve the reversibility of the hydrogen absorption-desorption reaction so as to increase the hydrogen absorption-desorption amount of the hydrogen absorbing alloy. Also, the secondary battery comprising the negative electrode containing the first hydrogen absorbing alloy of the present invention exhibits an improved discharge capacity and an improved charge-discharge cycle life. It follows that the hybrid car and the electric automobile having the particular secondary battery mounted thereon exhibit an improved running performance such as a fuel cost.

The second hydrogen absorbing alloy of the present invention comprises as a principal phase at least one phase selected from the group consisting of the first phase noted above and the second phase noted above. Also, a parallel growth region precipitates in at least one crystal grain of the principal phase. The parallel growth region has a crystal structure differing from a crystal structure of the principal phase. Further, the second hydrogen absorbing alloy of the present invention has a composition represented by general formula (1) referred to above. The second hydrogen absorbing alloy of the particular construction makes it possible to lessen the fluctuation in the Mg content so as to suppress an extreme uneven distribution of Mg, with the result that it is possible to improve the reversibility of the hydrogen absorption-desorption reaction. It follows that the secondary battery comprising the negative electrode containing the particular hydrogen absorbing alloy is allowed to exhibit an improved discharge capacity and a prolonged charge-discharge cycle life. Also, the electric automobile or the hybrid car having the particular secondary battery is allowed to exhibit an improved running performance such as a fuel cost.

It should be noted that the Mg content of the parallel growth region excluding the principal phase is higher or lower than the Mg content of the principal phase depending on the situation. However, if the number of crystal grains, in which the volume ratio of the parallel growth region is not higher than 40% by volume, is set at a level not smaller than 60% of the number of all the crystal grains of the alloy, it is possible to control appropriately the fluctuation of the Mg content so as to suppress the uneven distribution of Mg, thereby further improving the reversibility of the hydrogen absorption-desorption reaction. It follows that it is possible to further improve the discharge capacity and the charge-discharge cycle life of the secondary battery comprising the negative electrode containing the particular hydrogen absorbing alloy. Also, it is possible to further improve the running performance such as the fuel cost of the hybrid car or the electric automobile having the particular secondary battery mounted thereto.

In the third hydrogen absorbing alloy of the present invention, the intensity ratio calculated by formula (2) referred to previously is less than 0.15 including 0. Also, the third hydrogen absorbing alloy of the present invention has a composition represented by general formula (3) given previously. Further, an amount of a phase having a $AB_2$ type crystal structure, which is contained in the third hydrogen absorbing alloy of the present invention, is not larger than 10% by volume including 0% by volume. The third hydrogen absorbing alloy of the particular construction makes it possible to improve the hydrogen desorption characteristics of the hydrogen absorbing alloy, with the result that it is possible to improve the reversibility of the hydrogen absorption-desorption reaction so as to increase the amounts of the hydrogen absorption and the hydrogen desorption. Also, the secondary battery comprising the negative electrode containing the particular third hydrogen absorbing alloy of the present invention is allowed to exhibit an improved discharge capacity and an improved charge-discharge cycle life. It follows that the hybrid car or the electric automobile having the particular secondary battery mounted thereto is allowed to exhibit an improved running performance such as a fuel cost.

In the fourth hydrogen absorbing alloy of the present invention, the intensity ratio calculated by formula (2) referred to previously is less than 0.15 including 0. Also, the fourth hydrogen absorbing alloy of the present invention has a composition represented by general formula (3) given previously. Further, a parallel growth region precipitates in at least one crystal grain of a principal phase of the fourth hydrogen absorbing alloy of the present invention. The parallel growth region has a crystal structure differing from a crystal structure of the principal phase. The fourth hydrogen absorbing alloy of the particular construction makes it possible to lessen the fluctuation in the Mg content so as to suppress an extremely uneven distribution of Mg and, thus, to improve the reversibility of the hydrogen absorption-desorption reaction. It follows that the secondary battery comprising the negative electrode containing the particular hydrogen absorbing alloy is allowed to exhibit an improved discharge capacity and an improved charge-discharge cycle life. Also, the hybrid car or the electric automobile having the particular secondary battery mounted thereto is allowed to exhibit an improved running performance such as a fuel cost.

It should be noted in particular that, if the number of crystal grains, in which the volume ratio of the parallel growth region is not higher than 40% by volume, is set at a level not smaller than 60% of the number of all the crystal grains of the alloy, it is possible to control appropriately the fluctuation of the Mg content so as to suppress the uneven distribution of Mg, thereby further improving the reversibility of the hydrogen absorption-desorption reaction. It follows that it is possible to further improve the discharge capacity and the charge-discharge cycle life of the secondary battery comprising the negative electrode containing the particular hydrogen absorbing alloy. Also, it is possible to further improve the running performance such as the fuel cost of the hybrid car or the electric automobile having the particular secondary battery mounted thereto.

The fifth hydrogen absorbing alloy of the present invention has a composition represented by general formula (4) given previously. An amount of a phase having a $AB_2$ type crystal structure, which is contained in the fifth hydrogen absorbing alloy of the present invention, is not larger than 10% by volume, including 0% by volume. The fifth hydrogen absorbing alloy of the particular construction makes it possible to improve the hydrogen desorption characteristics so as to further improve the reversibility of the hydrogen absorption-desorption reaction and, thus, to increase the hydrogen storage capacity. It follows that it is possible to improve the discharge capacity and the charge-discharge cycle life of the secondary battery comprising the negative electrode containing the particular hydrogen absorbing alloy. Also, it is possible to further improve the running performance such as the fuel cost of the hybrid car or the electric automobile having the particular secondary battery mounted thereto.

The sixth hydrogen absorbing alloy of the present invention has a composition represented by general formula (4) referred to above. Also, a parallel growth region precipitates in at least one crystal grain of a principal phase of the hydrogen absorbing alloy. The parallel growth region has a crystal structure differing from a crystal structure of the principal phase. The sixth hydrogen absorbing alloy of the present invention having the particular construction makes it possible to lessen the fluctuation in the Mg content so as to suppress an extremely uneven distribution of Mg and, thus, to improve the reversibility of the hydrogen absorption-desorption reaction. It follows that it is possible to improve the discharge capacity and the charge-discharge cycle life of the secondary battery comprising the negative electrode containing the particular hydrogen absorbing alloy. Also, it is possible to improve the running performance such as the fuel cost of the hybrid car or the electric automobile having the particular secondary battery mounted thereto.

It should be noted in particular that, if the number of crystal grains, in which the volume ratio of the parallel growth region is not higher than 40% by volume, is set at a level not smaller than 60% of the number of all the crystal grains of the alloy, it is possible to control appropriately the fluctuation of the Mg content so as to suppress the uneven distribution of Mg, thereby further improving the reversibility of the hydrogen absorption-desorption reaction. It follows that it is possible to further improve the discharge capacity and the charge-discharge cycle life of the secondary battery comprising the negative electrode containing the particular hydrogen absorbing alloy. Also, it is possible to further improve the running performance such as the fuel cost of the hybrid car or the electric automobile having the particular secondary battery mounted thereto.

Some Examples of the present invention will now be described in detail with reference to the accompanying drawings.

Table 1 shows the compositions of the mish metals Lm and Mm given in Tables 2, 4 and 6 referred to herein later.

TABLE 1

(Lm, Mm shown in Tables 2, 4, 6 ... unit: wt %)

|  | La | Ce | Pr | Nd | Sm |
|---|---|---|---|---|---|
| Lm(1) | 93 | 0.8 | 0.7 | 5.5 | — |
| Lm(2) | 85 | 2.5 | 2.5 | 10 | — |
| Lm(3) | 72 | 3.1 | 4.9 | 20 | — |
| Lm(4) | 48 | 3.5 | 14.5 | 34 | — |
| Mm(1) | 38 | 50.2 | 3.5 | 8.1 | 0.2 |
| Mm(2) | 25 | 50 | 5.5 | 19.5 | — |

EXAMPLES 1 TO 16 AND COMPARATIVE EXAMPLES 1 TO 5

Hydrogen absorbing alloys were prepared by the high frequency induction melting method, the rapid solidification process or the mechanical alloying method as described in the following.

(High Frequency Induction Melting Method)

Each of the elements constituting the composition shown in Table 2 was weighed, followed by melting the composition in a high frequency induction furnace under an argon gas atmosphere so as to obtain an alloy ingot. thus obtained under an argon gas atmosphere and under the conditions shown in Table 2 so as to obtain hydrogen absorbing alloys for Examples 1 to 8, 13 to 16 and Comparative Examples 2, 4, 5.

(Rapid Solidification Process)

Each of the elements constituting the composition shown in Table 2 was weighed, followed by melting the composition in a high frequency induction furnace under an argon gas atmosphere so as to obtain an alloy ingot. The alloy ingot thus obtained was melted, followed by dripping the resultant melt onto the surface of a single roll made of copper and rotating at a peripheral velocity of 7 m/sec under an argon gas atmosphere so as to rapidly cool the melt and, thus, to obtain a flake-like hydrogen absorbing alloy. Further, a heat treatment was applied to the resultant hydrogen absorbing alloy flakes under an argon gas atmosphere and under the conditions shown in Table 2 so as to obtain hydrogen absorbing alloys for Examples 9 to 12 and Comparative Example 1.

(Mechanical Alloying Method)

A raw material metal mixture prepared by mixing La and Ni at an atomic ratio La:Ni of 1:3 was melted in an arc furnace, followed by cooling the melt so as to obtain an alloy (a) consisting of a $LaNi_3$ phase. Also, another raw material metal mixture prepared by mixing La and Ni at an atomic ratio La:Ni of 1:4 was melted in an arc furnace, followed by cooling the melt so as to obtain an alloy (b) consisting of a $LaNi_4$ phase. The alloy (a) in an amount of 100 g and the alloy (b) in an amount of 100 g were put in a planetary ball mill having steel balls put therein so as to be subjected to a mechanical alloying for 10 hours at room temperature under an argon gas atmosphere, thereby obtaining an alloy (c) consisting of a $LaNi_3$ phase, a $LaNi_4$ phase and a $La_5Ni_{19}$ phase.

On the other hand, a raw material metal mixture prepared by mixing La, Mg and Ni at an atomic ratio La:Mg:Ni of 0.9:0.1:5 was melted in an arc furnace, followed by cooling the melt so as to obtain an alloy (d) consisting of a $La_{0.9}Mg_{0.1}Ni_5$ phase. The alloy (d) in an amount of 30 g and the alloy (c) in an amount of 300 g were put in a planetary ball mill having steel balls put therein so as to be subjected to a mechanical alloying for 10 hours at room temperature under an argon gas atmosphere, thereby obtaining an alloy for Comparative Example 3 consisting of a $LaNi_3$ phase, a $LaNi_4$ phase, a $La_5Ni_{19}$ phase and a $La_{0.9}Mg_{0.1}Ni_5$ phase.

Each of the hydrogen absorbing alloys thus prepared was pulverized under an inert gas atmosphere so as to permit the pulverized powder to have an average particle diameter of 55 μm. Then, 0.5 parts by weight of a nickel powder available on the market, which had been prepared by the carbonyl method, and 0.5 parts by weight of a Ketchen black powder were added to and mixed with 100 parts by weight of the alloy powder thus prepared. Further, a paste was prepared by adding 1 parts by weight of polytetrafluoro ethylene (PTFE), 0.2 parts by weight of sodium polyacrylate, 0.2 parts by weight of carboxymethyl cellulose, and 50 parts by weight of water to 100 parts by weight of the mixed powder, followed by stirring the mixture. Still further, a punched thin iron plate having a nickel plating applied to the surface was coated with the paste thus obtained, followed by drying the paste so as to obtain a coated plate. The thickness of the coated plate thus obtained was adjusted by applying a roll press to the coated plate, followed by cutting the coated plate into pieces each having a desired size so as to prepare a negative electrode containing 7.5 g of the hydrogen absorbing alloy.

On the other hand, prepared as a separator was a polyolefin based unwoven fabric having acrylic acid introduced therein by a graft copolymerization.

An electrode group was prepared by spirally winding a laminate structure comprising the negative electrode prepared as described above, a paste type nickel positive electrode having a nominal capacity of 1,500 mAh, which had been prepared by the known method, and the separator described above, which was interposed between the positive electrode and the negative electrode.

The electrode group thus prepared was put in a cylindrical case together with 2.5 ml of an alkaline electrolyte containing 7 mol of KOH, 0.5 mol of NaOH and 0.5 mol of LiOH, followed by sealing the case so as to assemble a cylindrical nickel hydrogen secondary battery of size AA having a nominal capacity of 1,500 mAh.

Each of the secondary batteries prepared in Examples 1 to 16 and Comparative Examples 1 to 5 was left to stand at room temperature for 36 hours. Then, a charge-discharge cycle, in which the secondary battery was charged under a current of 150 mA for 15 hours, followed by discharging the secondary battery under a current of 150 mA until the battery voltage was lowered to 0.8V, was carried out twice. Further, the charge-discharge cycle was repeated under an environment of 45° C. so as to measure the number of cycles reached at the time when the discharge capacity of the secondary battery was lowered to 80% of the discharge capacity of the first cycle. Table 3 shows the number of cycles and the discharge capacity of the first cycle. Incidentally, the charging process of the charge-discharge cycle was performed by employing a $-\Delta V$ method in which the charging current was set at 1,500 mA and the charging was finished at the time when the voltage was lowered by 10 mV from the maximum voltage in the charging process. On the other hand, the discharge process was performed under a current of 3,000 mA until the battery voltage was lowered to 1.0V.

Also, characteristics (A) to (D) given below were measured in respect of the hydrogen absorbing alloy used in the secondary battery for each of Examples 1 to 16 and Comparative Examples 1 to 5:

(A) A rechargeable hydrogen storage capacity (which is a term for a hydrogen absorbing alloy specified in JIS H7003) was obtained as a hydrogen absorption characteristic for each of the hydrogen absorbing alloys by measuring the iso-thermal line of pressure-composition at 60° C. and under a hydrogen pressure lower than 10 atm. by the Sievert's method (JIS H7201). Table 3 shows the results.

(B) The crystal structure of each of the hydrogen absorbing alloys was observed from the X-ray diffraction pattern by using a Cu-Kα ray as the X-ray source so as to determine the crystal structure of the principal phase, with the results as shown in Table 3. Incidentally, the expression "$Ce_2Ni_7$ type+$PuNi_3$ type" in Table 3 denotes that the principal phase consists of two crystal phases, e.g., $Ce_2Ni_7$ type and $PuNi_3$ type.

Figure 3:
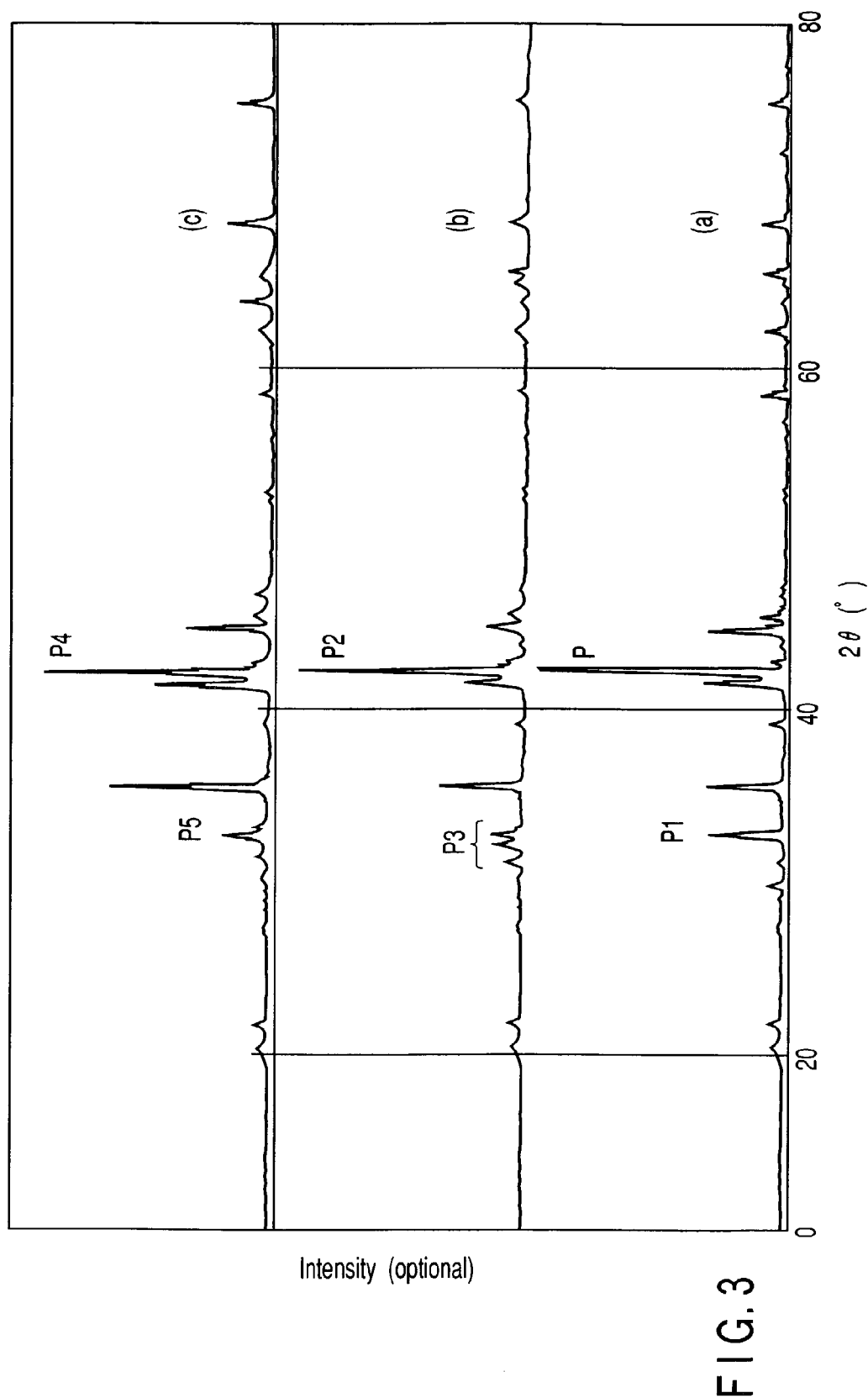
FIG. 3 is a graph showing the X-ray diffraction patterns using a CuKα ray in respect of the hydrogen absorbing alloys for Examples 1, 13 and 14 of the present invention.

FIG. 3 shows the X-ray diffraction patterns of the hydrogen absorbing alloys for Examples 1, 13 and 14. Diffraction pattern (a) shown in FIG. 3 is the diffraction pattern of the hydrogen absorbing alloy for Example 1 which contained as the principal phase the phase having the $Ce_2Ni_7$ type crystal structure. In the hydrogen absorbing alloy for Example 1, main peak P appeared at the 2θ value (θ denoting the Bragg angle) falling within a range of $42.1°\pm1°$, and main peak P1 appeared at the 2θ value falling within a range of from 31° to 34°. Also, the peak P appearing at the 2θ value falling within a range of $42.1°\pm1°$ has the highest intensity. Diffraction patterns (b) and (c) shown in FIG. 2 cover the hydrogen absorbing alloys for Examples 13 and 14, respectively, which contained as a principal phase a phase having a crystal structure similar to the $Ce_2Ni_7$ type structure. In diffraction pattern (b) shown in FIG. 2 (Example 13), peak P2 having the highest intensity appeared at the 2θ value falling within a range of $42.1°\pm1°$ and peak P3 appearing at the value of 2θ falling within a range of from 31° to 34° was found as being split into three. Also, the intensity of peak P3 was lower than that of peak P1. On the other hand, in diffraction pattern (c) shown in FIG. 2 (Example 14), peak P4 having the highest intensity appeared at the 2θ value falling within a range of $42.1°\pm1°$ and peak P5 having the intensity lower than that of peak P1 appeared at the value of 2θ falling within a range of from 31° to 34°. Incidentally, the intensity ratio of the diffraction pattern (c), which was calculated by using formula (I) given below, was found to be 22%:

$$I_3/I_4 \quad (I)$$

where $I_4$ denotes the intensity of peak P4, and $I_3$ denotes the intensity of peak P5.

Figure 4:
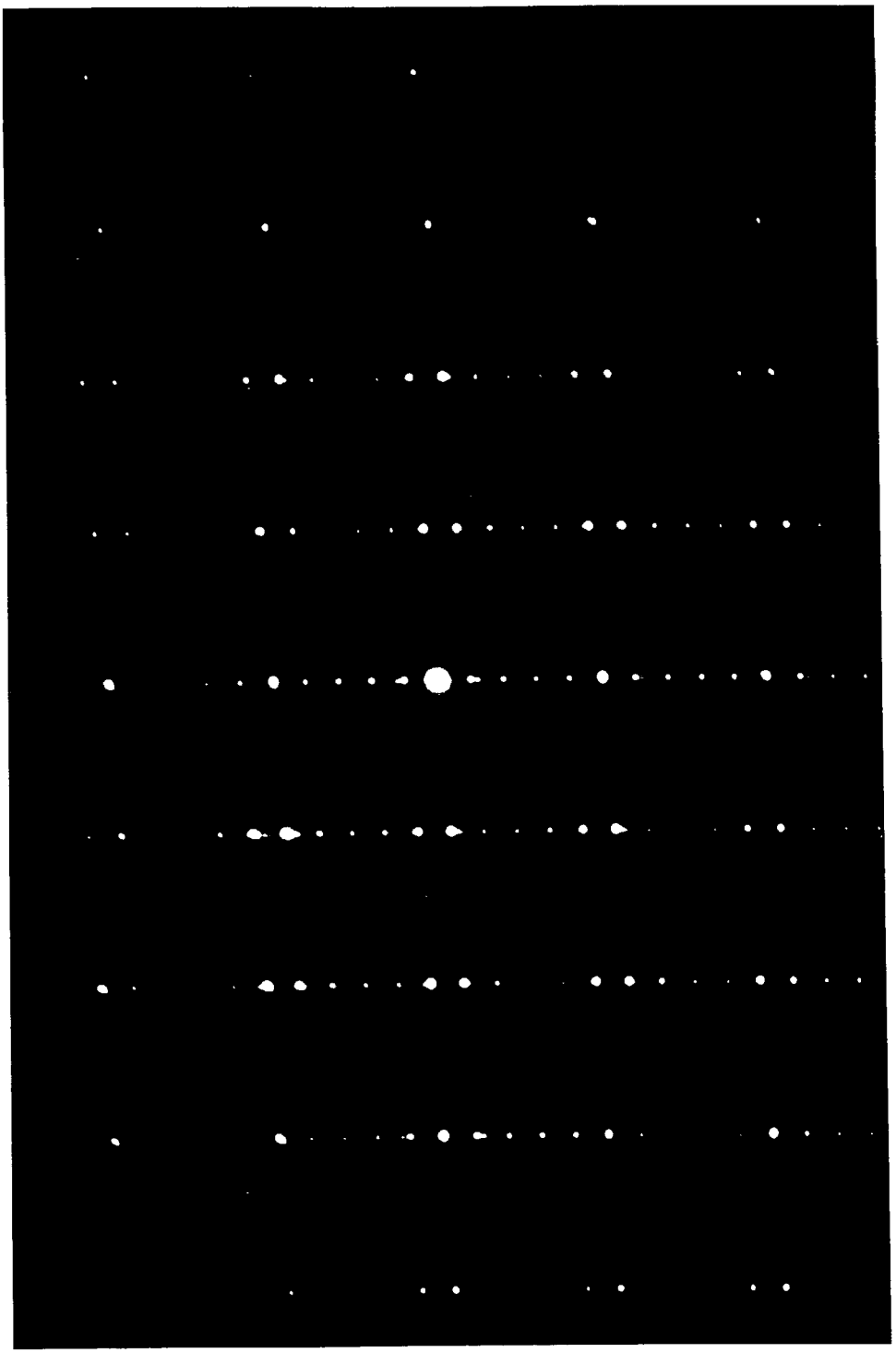
FIG. 4 is a transmission electron micrograph showing the electron diffraction analysis pattern of the hydrogen absorbing alloy for Example 14 of the present invention.
Figure 5:
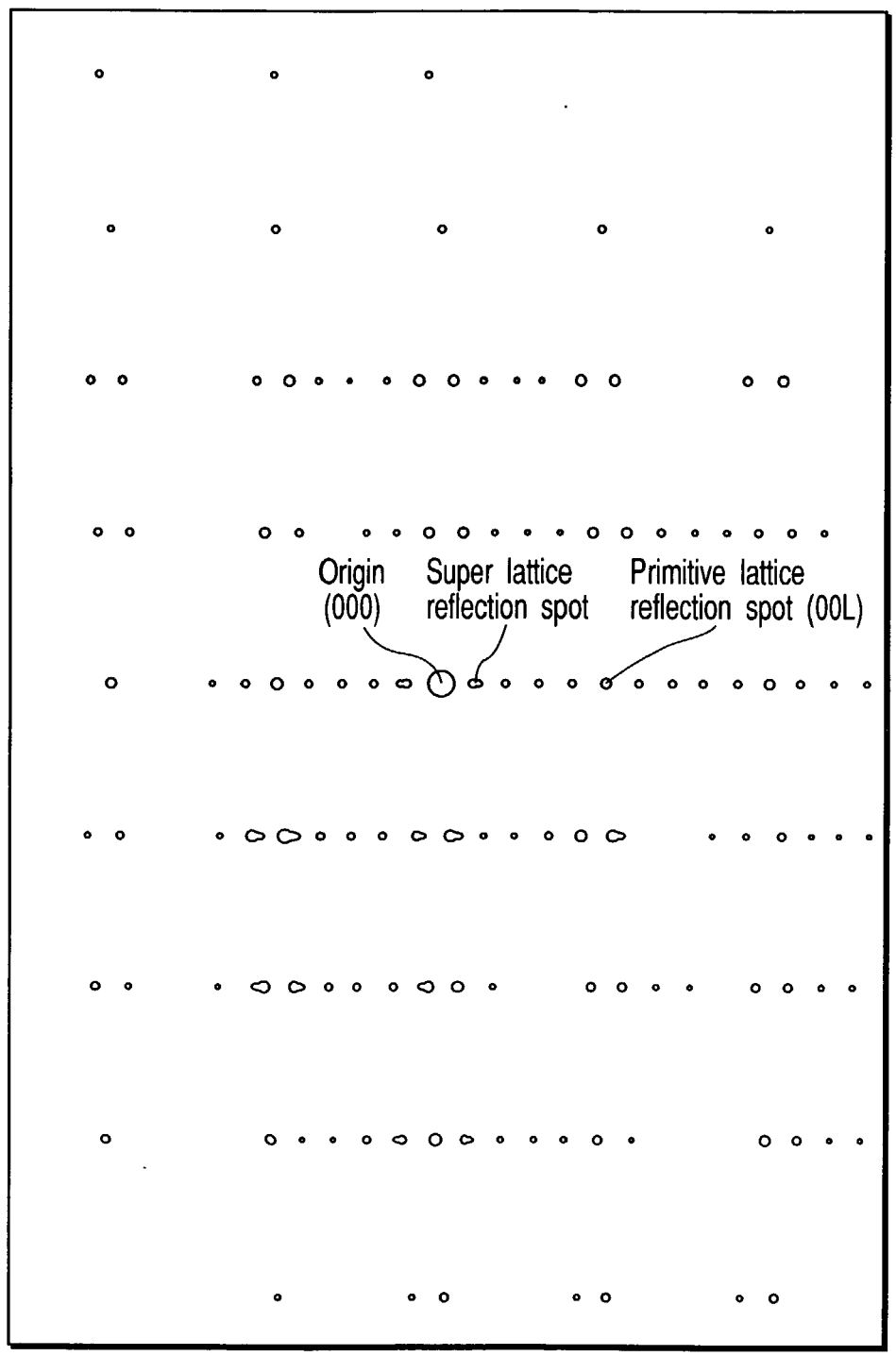
FIG. 5 is a schematic drawing for explaining the micrograph shown in FIG. 4.

Further, the electron diffraction analysis pattern was photographed by a transmission electron microscope (TEM) in respect of the hydrogen absorbing alloy for each of Examples 1, 13 and 14. FIG. 4 is the micrograph showing the electron diffraction analysis pattern of the hydrogen absorbing alloy for Example 14. Also, FIG. 5 is a schematic drawing for explaining the micrograph shown in FIG. 4. As apparent from FIGS. 4 and 5, there are four supper lattice reflection spots between the primitive lattice reflection spot (00L) and the origin (000) in the hydrogen absorbing alloy for Example 14. It is also seen that these supper lattice reflection spots are present at four points at which the distance $|G_{00L}|$ between the primitive lattice reflection spot (00L) and the origin (000) is equally divided into five sections. Incidentally, the distance $|G_{00L}|$ was found to be 0.4 $nm^{-1}$. It has also been found that the supper lattice reflection spots are present at four points at which the distance $|G_{00L}|$ between the primitive lattice reflection spot (00L) and the origin (000) is equally divided into five sections in the electron diffraction analysis pattern for the hydrogen absorbing alloy for Example 13. On the other hand, it has been found that the supper lattice reflection spots are present at two points at which the distance $|G_{00L}|$ between the primitive lattice reflection spot (00L) and the origin (000) is equally divided into three sections in the electron diffraction analysis pattern for the hydrogen absorbing alloy for Example 1.

Incidentally, the principal phase of the hydrogen absorbing alloy for Example 8 contains a phase having a $PuNi_3$ type structure and another phase having a $Ce_2Ni_7$ structure. In the hydrogen absorbing alloy for Example 8, the peaks appearing respectively at the 2θ value falling within a range of $42.1°\pm1°$ and at the 2θ value falling within a range of from 31° to 34° are the main peaks. Also, the peak appearing at the 2θ value falling within a range of $42.1°\pm1°$ was found to have the highest intensity. The hydrogen absorbing alloy for each of Examples 15 and 16 contains as the principal phase a phase having a crystal structure similar to the $PuNi_3$ type structure. In the hydrogen absorbing alloy for Example 15, the peak having the highest intensity appeared at the value of 2θ falling within a range of $42.1°\pm1°$, and the peak appearing at the value of 2θ falling within a range of from 31° to 34° was found as being split into two. Also, the intensity of the peak split into two was lower than that of the peak that appeared at the value of 2θ falling within a range of from 31° to 34° in the diffraction pattern for Example 8 referred to previously. On the other hand, the peak having the highest intensity appeared at the value of 2θ falling within a range of $42.1°\pm1°$ in the X-ray diffraction pattern of the hydrogen absorbing alloy for Example 16, and the intensity of the peak appearing at the value of 2θ falling within a range of from 31° to 34° was lower than that of the peak that appeared at the value of 2θ falling within a range of from 31° to 34° in the diffraction pattern for Example 8 referred to previously. The intensity ratio calculated by formula (I) referred to previously was found to be 18% in the hydrogen absorbing alloy for Example 16.

(C) A secondary electron image and a reflected electron image of each of the hydrogen absorbing alloys was photographed by using a scanning electron microscope (SEM) so as to detect a phase differing from the principal phase. The composition of the phase differing from the principal phase was analyzed by an energy dispersive X-ray spectroscopy (EDX) of the scanning electron microscope. It has been found from the result of the composition analysis and the X-ray diffraction pattern obtained in item (B) referred to above that the phase differing from the principal phase was a phase having a $MgCu_2$ type crystal structure.

(D) The contents of the principal phase and the $MgCu_2$ type phase were measured as follows for each of the hydrogen absorbing alloys so as to obtain the results as shown in Table 3.

Optional five view fields of the hydrogen absorbing alloy for each of Examples 1 to 8, 13 to 16 and Comparative Examples 2, 4, 5 were photographed by a scanning electron microscope. The area ratio of the target phase based on the alloy area within the view field was obtained for each of the micrographs. The average value of the area ratios thus obtained was calculated and given in Table 3 as the volume ratio of the target phase in the hydrogen absorbing alloy.

On the other hand, optional five view fields of the hydrogen absorbing alloy for each of Examples 9 to 12 and Comparative Examples 1, 3 were photographed by a transmission electron microscope. The area ratio of the target phase based on the alloy area within the view field was obtained for each of the micrographs. The average value of the area ratios thus obtained was calculated and given in Table 3 as the volume ratio of the target phase in the hydrogen absorbing alloy.

TABLE 2

| | Composition | Heat treatment conditions Temperature (° C.) | Time (h) |
|---|---|---|---|
| Example 1 | $Lm(2)_{0.77}Mg_{0.23}Ni_{3.34}Al_{0.08}$ | 935 | 10 |
| Example 2 | $La_{0.6}Nd_{0.14}Mg_{0.26}Ni_{3.29}Mn_{0.02}Si_{0.01}$ | 940 | 8 |
| Example 3 | $La_{0.53}Pr_{0.2}Mg_{0.27}Ni_{3.1}Co_{0.1}Fe_{0.01}Al_{0.08}$ | 945 | 6 |
| Example 4 | $Lm(2)_{0.77}Mg_{0.23}Ni_{3.35}Al_{0.1}Mo_{0.005}$ | 940 | 5 |
| Example 5 | $Lm(1)_{0.8}Mg_{0.2}Ni_{3.4}Co_{0.05}Mn_{0.02}Al_{0.1}Ta_{0.005}$ | 915 | 7 |
| Example 6 | $La_{0.75}Ce_{0.05}Mg_{0.2}Ni_{3.45}Zn_{0.02}Al_{0.12}Li_{0.005}$ | 920 | 6 |
| Example 7 | $Lm(1)_{0.74}Y_{0.07}Mg_{0.19}Ni_{3.45}Co_{0.08}Sn_{0.01}$ | 925 | 9 |
| Example 8 | $Lm(3)_{0.7}Mg_{0.3}Ni_{3.25}Cu_{0.02}Al_{0.06}$ | 945 | 7 |
| Example 9 | $Lm(4)_{0.76}Mg_{0.24}Ni_{3.35}Co_{0.02}W_{0.002}B_{0.01}Al_{0.05}$ | 970 | 2 |
| Example 10 | $Lm(1)_{0.68}Mm(1)_{0.11}Mg_{0.21}Ni_{3.14}Co_{0.2}Al_{0.12}Ga_{0.03}$ | 930 | 1 |
| Example 11 | $Lm(1)_{0.66}Mm(2)_{0.1}Mg_{0.24}Ni_{3.3}Co_{0.06}Mn_{0.03}V_{0.002}Al_{0.07}$ | 935 | 3 |
| Example 12 | $Lm(4)_{0.76}Ca_{0.01}Mg_{0.23}Ni_{3.3}Cr_{0.002}Al_{0.11}$ | 980 | 2 |
| Example 13 | $Lm(2)_{0.765}Zr_{0.005}Mg_{0.23}Ni_{3.31}P_{0.002}Al_{0.1}$ | 935 | 4 |
| Example 14 | $Lm(3)_{0.775}Ti_{0.005}Mg_{0.22}Ni_{3.36}Al_{0.15}S_{0.003}$ | 945 | 3 |
| Example 15 | $Lm(3)_{0.77}Mg_{0.23}Ni_{3.06}Co_{0.13}Al_{0.12}$ | 940 | 5 |
| Example 16 | $Lm(1)_{0.73}Mm(1)_{0.05}Mg_{0.22}Ni_{3.13}Co_{0.2}Mn_{0.01}Sn_{0.02}Al_{0.07}$ | 960 | 4 |
| Comparative Example 1 | $Mm(2)_{0.65}Mg_{0.35}Ni_{2.27}Co_{0.3}Mn_{0.3}Fe_{0.02}Al_{0.14}$ | 850 | 4 |
| Comparative Example 2 | $(La_{0.32}Ce_{0.48}Pr_{0.05}Nd_{0.13}Sm_{0.02})_{0.975}Mg_{0.025}Ni_{2.925}Mn_{0.35}Cu_{0.1}Nb_{0.075}$ | 900 | 12 |
| Comparative Example 3 | $La_{0.917}Mg_{0.083}Ni_{4.75}$ | — | — |
| Comparative Example 4 | $La_{0.9}Mg_{0.1}Ni_{4.8}$ | 1000 | 4 |
| Comparative Example 5 | $La_{0.5}Mg_{0.5}Ni_{2.1}$ | 800 | 5 |

Note:
The alloys for Examples 9 to 12 and Comparative Example 1 were prepared by a rapid solidification process, and the alloy for Comparative Example 3 was prepared by a mechanical alloying method.

TABLE 3

| | Capacity (mAh) | Cycle life | Rechargeable hydrogen storage capacity (H/M) | Crystal structure of principal phase | Principal phase content (% by volume) | Content of $AB_2$ type phase (% by volume) |
|---|---|---|---|---|---|---|
| Example 1 | 1350 | 325 | 1.09 | $Ce_2Ni_7$ type | 98 | 0 |
| Example 2 | 1335 | 320 | 1.08 | $Ce_2Ni_7$ type + $PuNi_3$ type | 96 | 0.5 |
| Example 3 | 1360 | 295 | 1.06 | $Ce_2Ni_7$ type + $CeNi_3$ type | 92 | 1.1 |
| Example 4 | 1355 | 290 | 1.05 | $Ce_2Ni_7$ type + $PuNi_3$ type | 91 | 1.5 |
| Example 5 | 1350 | 295 | 1.07 | $Ce_2Ni_7$ type | 94 | 0.8 |
| Example 6 | 1320 | 285 | 1.03 | $Ce_2Ni_7$ type | 89 | 2.1 |
| Example 7 | 1330 | 280 | 0.92 | $Ce_2Ni_7$ type | 88 | 2.6 |
| Example 8 | 1368 | 285 | 1.08 | $Ce_2Ni_7$ type + $PuNi_3$ type | 90 | 2.4 |
| Example 9 | 1365 | 270 | 0.94 | $Ce_2Ni_7$ type | 88 | 3.6 |
| Example 10 | 1335 | 265 | 0.96 | $Ce_2Ni_7$ type + $Gd_2Co_7$ type | 85 | 4.8 |
| Example 11 | 1355 | 320 | 0.99 | $Ce_2Ni_7$ type | 94 | 0.4 |
| Example 12 | 1345 | 230 | 0.97 | $Ce_2Ni_7$ type | 90 | 1.2 |

TABLE 3-continued

|  | Capacity (mAh) | Cycle life | Rechargeable hydrogen storage capacity (H/M) | Crystal structure of principal phase | Principal phase content (% by volume) | Content of $AB_2$ type phase (% by volume) |
|---|---|---|---|---|---|---|
| Example 13 | 1335 | 295 | 0.89 | Similar to $Ce_2Ni_7$ type | 89 | 1.1 |
| Example 14 | 1340 | 275 | 0.87 | Similar to $Ce_2Ni_7$ type | 82 | 3.5 |
| Example 15 | 1330 | 250 | 0.86 | Similar to $PuNi_3$ type | 83 | 4.2 |
| Example 16 | 1325 | 220 | 0.85 | Similar to $PuNi_3$ type | 72 | 5.3 |
| Comparative Example 1 | 1290 | 70 | 0.68 | $CaCu_5$ type | 80 | 15 |
| Comparative Example 2 | 1020 | 25 | 0.57 | $Ce_2Ni_7$ type | 63 | 18 |
| Comparative Example 3 | 700 | 10 | 0.45 | $CaCu_5$ type | 92 | 0 |
| Comparative Example 4 | 1250 | 25 | 0.69 | $CaCu_5$ type | 95 | 3 |
| Comparative Example 5 | 800 | 15 | 0.42 | $MgCu_2$ type | 75 | — |

To reiterate, the hydrogen absorbing alloy for each of Examples 1 to 16 contains as the principal phase at least one kind of the phase selected from the group consisting of the first phase referred to previously and the second phase referred to previously, and the amount of the $AB_2$ type phase such as the $MgCu_2$ type phase contained in the hydrogen absorbing alloy is not larger than 10% by volume. As apparent from Tables 2 and 3, the rechargeable hydrogen storage capacity of the hydrogen absorbing alloy for each of Examples 1 to 16 is larger than that of the hydrogen absorbing alloy for each of Comparative Examples 1 to 5. Incidentally, the hydrogen absorbing alloy for Comparative Example 1 has a composition equal to that of the hydrogen absorbing alloy disclosed in U.S. Pat. No. 5,840,166 and contains the $CaCu_5$ type phase as the principal phase. Also, the hydrogen absorbing alloy for Comparative Example 2 has a composition equal to that of the hydrogen absorbing alloy disclosed in Japanese Patent Disclosure No. 11-29832, contains the $Ce_2Ni_7$ type phase as the principal phase, and contains an $AB_2$ type phase in an amount exceeding 10% by volume. On the other hand, the hydrogen absorbing alloy for Comparative Example 3 has a composition equal to that of the hydrogen absorbing alloy disclosed in Japanese Patent Disclosure No. 10-1731.

It is also seen that the secondary battery for each of Examples 1 to 16 was superior to the secondary battery for each of Comparative Examples 1 to 5 in each of the discharge capacity and the charge-discharge cycle life.

EXAMPLES 17 TO 32 AND COMPARATIVE EXAMPLES 6 TO 10

Hydrogen absorbing alloys were prepared by the high frequency induction melting method, the rapid solidification process or the mechanical alloying method as described in the following.

(High Frequency Induction Melting Method)

Each of the elements constituting the composition shown in Table 4 was weighed, followed by melting the composition in a high frequency induction furnace under an argon gas atmosphere so as to obtain an alloy ingot. Then, a heat treatment was applied to the alloy ingot thus obtained under an argon gas atmosphere and under the conditions shown in Table 4 so as to obtain hydrogen absorbing alloys for Examples 17 to 25 and 29 to 32 and Comparative Examples 7, 9, 10.

(Rapid Solidification Process)

Each of the elements constituting the composition shown in Table 4 was weighed, followed by melting the composition in a high frequency induction furnace under an argon gas atmosphere so as to obtain an alloy ingot. The alloy ingot thus obtained was melted, followed by dripping the resultant melt onto the surface of a single roll made of copper and rotating at a peripheral velocity of 10 m/sec under an argon gas atmosphere so as to rapidly cool the melt and, thus, to obtain a flake-like hydrogen absorbing alloy. Further, a heat treatment was applied to the resultant hydrogen absorbing alloy flakes under an argon gas atmosphere and under the conditions shown in Table 4 so as to obtain hydrogen absorbing alloys for Examples 26 to 28 and Comparative Example 6.

(Mechanical Alloying Method)

A raw material metal mixture prepared by mixing Lm(1) and Ni at an atomic ratio Lm(1):Ni of 1:3 was melted in an arc furnace, followed by cooling the melt so as to obtain an alloy (a) consisting of a $Lm(1)Ni_3$ phase. Also, another raw material metal mixture prepared by mixing Lm(1) and Ni at an atomic ratio Lm(1):Ni of 1:4 was melted in an arc furnace, followed by cooling the melt so as to obtain an alloy (b) consisting of a $Lm(1)Ni_4$ phase. The alloy (a) in an amount of 100 g and the alloy (b) in an amount of 100 g were put in a planetary ball mill having steel balls put therein so as to be subjected to a mechanical alloying for 10 hours at room temperature under an argon gas atmosphere, thereby obtaining an alloy (c) consisting of a $Lm(1)Ni_3$ phase, a $Lm(1)Ni_4$ phase and a $Lm(1)_5Ni_{19}$ phase.

On the other hand, a raw material metal mixture prepared by mixing Lm(1), Mg and Ni at an atomic ratio Lm(1):Mg:Ni of 0.9:0.1:5 was melted in an arc furnace, followed by cooling the melt so as to obtain an alloy (d) consisting of a $Lm(1)_{0.9}Mg_{0.1}Ni_5$ phase. The alloy (d) in an amount of 30 g and the alloy (c) in an amount of 300 g were put in a planetary ball mill having steel balls put therein so as to be subjected to a mechanical alloying for 10 hours at room temperature under an argon gas atmosphere, thereby obtaining an alloy for Comparative Example 8 consisting of a $Lm(1)Ni_3$ phase, a $Lm(1)Ni_4$ phase, a $Lm(1)_5Ni_{19}$ phase and a $Lm(1)_{0.9}Mg_{0.1}Ni_5$ phase.

A cylindrical nickel hydrogen secondary battery was assembled as in Example 1 by using each of the hydrogen absorbing alloys thus prepared.

The secondary battery prepared in each of Examples 17 to 32 and Comparative Examples 6 to 10 was left to stand under room temperature for 36 hours. Then, each of the discharge capacity and the charge-discharge cycle life of the secondary battery were measured as in Example 1 so as to obtain the results shown in Table 5.

Also, characteristics (A) to (F) given below were measured in respect of the hydrogen absorbing alloy used in the secondary battery for each of Examples 17 to 32 and Comparative Examples 6 to 10:

(A) A rechargeable hydrogen storage capacity was obtained for each of the hydrogen absorbing alloys as in Example 1. Table 5 shows the results.

(B) The crystal structure of each of the hydrogen absorbing alloys was observed from the X-ray diffraction pattern by using a Cu-Kα ray as the X-ray source so as to determine the crystal structure of the principal phase. Table 5 shows the results.

In the hydrogen absorbing alloy for Example 29, the peak having the highest intensity appeared at the value of 2θ falling within a range of 42.1°±1° in the X-ray diffraction pattern, and a peak appeared at the value of 2θ falling within a range of from 31° to 34° was found as being split into two. The intensity of the two-split peak was lower than that of peak P1 in diffraction pattern (a) of the normal structure referred to previously. On the other hand, in the hydrogen absorbing alloy for Example 30, the peak having the highest intensity appeared at the value of 2θ falling within a range of 42.1°±1° in the X-ray diffraction pattern, and a peak having an intensity lower than that of peak P1 referred previously appeared at the value of 2θ falling within a range of from 31° to 34°. Incidentally, the intensity ratio calculated by formula (I) referred to previously on the basis of the diffraction pattern of the hydrogen absorbing alloy for Example 30 was found to be 24%.

Further, the electron diffraction analysis pattern for the hydrogen absorbing alloy for each of Examples 29 and 30 was photographed by a transmission electron microscope (TEM). It has been found that there were four supper lattice reflection spots between the primitive lattice reflection points (00L) and the origin (000) in the hydrogen absorbing alloy for each of Examples 29 and 30. It has also been found that the supper lattice reflection spots were present in four points at which the distance $|G_{00L}|$ between the primitive lattice reflection spot (00L) and the origin (000) was equally divided into five sections.

Also, the peak having the highest intensity appeared at the value of 2θ falling within a range of 42.1°±1° in the X-ray diffraction pattern of the hydrogen absorbing alloy for Example 31. Further, a peak appeared at the value of 2θ falling within a range of from 31° to 34° was found as being split into three. The intensity of the three-split peak was found to be lower than that of the peak appearing in the diffraction pattern of the normal structure referred to previously. On the other hand, the peak having the highest intensity appeared at the value of 2θ falling within a range of 42.1°±1° in the X-ray diffraction pattern of the hydrogen absorbing alloy for Example 32. Also, a peak having an intensity lower than that of peak of the normal structure referred to previously appeared at the value of 2θ falling within a range of from 31° to 34°. Incidentally, the intensity ratio calculated by formula (I) referred to previously on the basis of the diffraction pattern of the hydrogen absorbing alloy for Example 32 was found to be 19%.

(C) The volume ratio of the principal phase for each of the hydrogen absorbing alloys was measured as follows. Table 5 shows the results.

Specifically, optional five view fields of the hydrogen absorbing alloy for each of Examples 17 to 25, 29 to 32 and Comparative Examples 7, 9, 10 were photographed by a scanning electron microscope. Then, the area ratio of the target phase relative to the alloy area within the view field was obtained for each of the micrographs. Further, the average value of the area ratios thus obtained was calculated and given in Table 5 as the volume ratio of the target phase in the hydrogen absorbing alloy.

On the other hand, optional five view fields of the hydrogen absorbing alloy for each of Examples 26 to 28 and Comparative Examples 6, 8 were photographed by a transmission electron microscope. Then, the area ratio of the target phase relative to the alloy area within the view field was obtained for each of the micrographs. Further, the average value of the area ratios thus obtained was calculated and given in Table 5 as the volume ratio of the target phase in the hydrogen absorbing alloy.

(D) (1,0,0) plane of the crystal grain in optional 30 view fields were photographed by a transmission electron microscope with a magnification of 30,000 in respect of each of the hydrogen absorbing alloys. For each view field, the area of the parallel growth region excluding the principal phase was measured. Then the area ratio of the parallel growth region relative to the alloy area within the view field was calculated. The average value of the calculated area ratios of the 30 view fields was obtained and given in Table 5 as the volume ratio of the parallel growth region of the crystal grain.

(E) (1,0,0) plane of the crystal grain in optional 30 view fields were photographed by a transmission electron microscope with a magnification of 30,000 in respect of each of the hydrogen absorbing alloys. For each view field, the area of the parallel growth region excluding the principal phase was measured. The area ratio of the parallel growth region relative to the alloy area within the view field was calculated. Further, a ratio of the number of view fields, in which the volume ratio of the parallel growth region was not higher than 40% by volume, to the 30 view fields was calculated and given in Table 5 as a ratio of the number of crystal grains, in which the volume ratio of the parallel growth region was not higher than 40% by volume, to the total number of crystal grains, said ratio being hereinafter referred to as a "crystal grain ratio".

(F) The composition of the parallel growth region excluding the principal phase of each of the hydrogen absorbing alloys was analyzed by an energy dispersive X-ray spectroscopy (EDX) of the scanning electron microscope. The crystal structure of the parallel growth was specified from the result of the composition analysis and the X-ray diffraction pattern obtained in item (B) described previously. The results are shown in Table 5.

Figure 6:
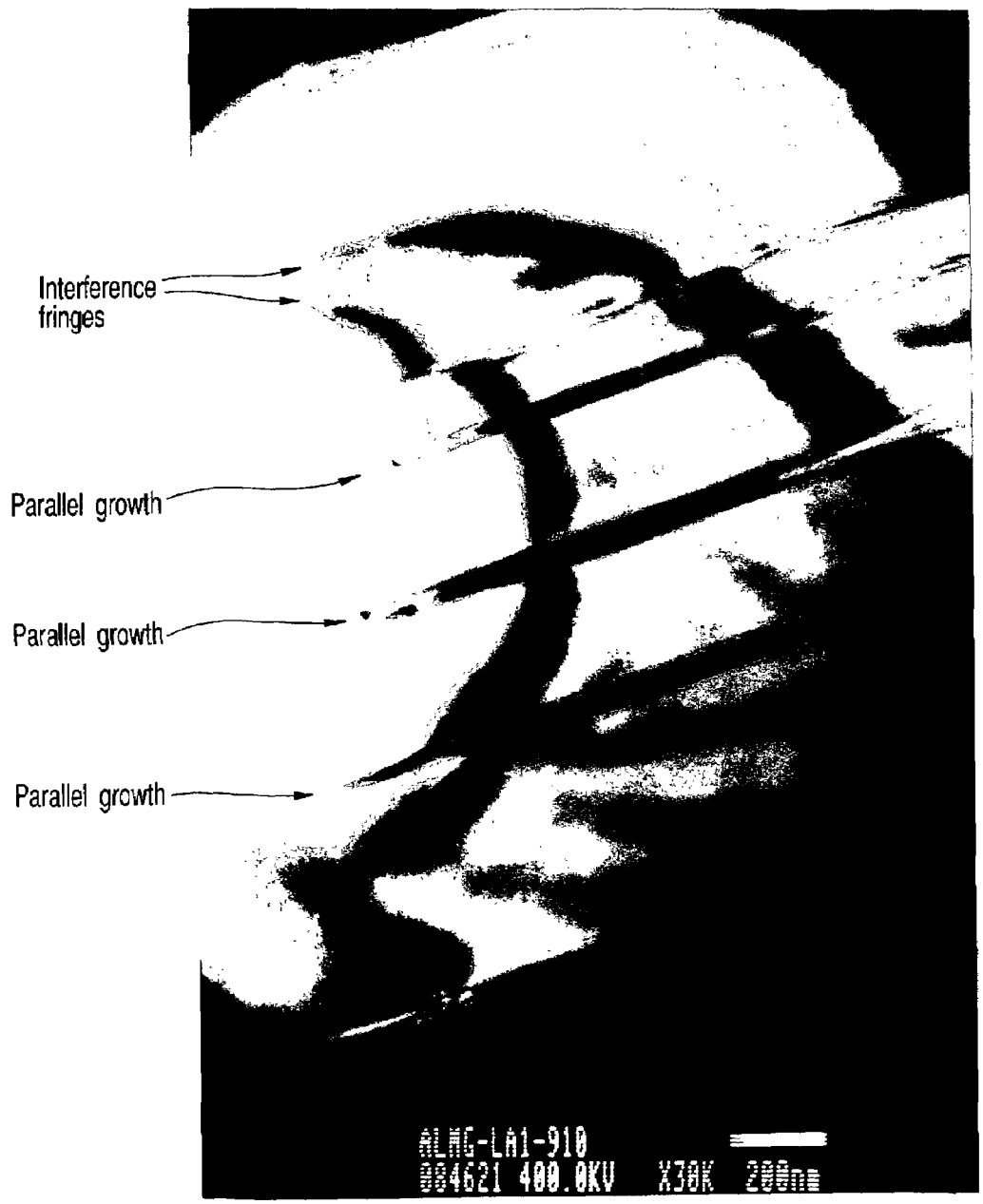
FIG. 6 is a transmission electron micrograph of the hydrogen absorbing alloy for Example 23 of the present invention.

FIG. 6 shows one view field of the hydrogen absorbing alloy for Example 23, which was selected from among the micrographs obtained in measurements (D) and (E) described previously. The grayish oblique pattern present in the central portion of the photo of FIG. 6 denotes the parallel growth region excluding the principal phase. Incidentally, the curved pattern shown in the photo denotes an interference fringes.

TABLE 4

|  | Composition | Heat treatment conditions Temperature (° C.) | Time (h) |
|---|---|---|---|
| Example 17 | $Lm(1)_{0.77}Mg_{0.23}Ni_{3.34}Al_{0.11}$ | 925 | 6 |
| Example 18 | $La_{0.62}Pr_{0.14}Mg_{0.24}Ni_{3.29}Mn_{0.02}Fe_{0.01}$ | 950 | 8 |
| Example 19 | $La_{0.55}Nd_{0.2}Mg_{0.25}Ni_{3.1}Co_{0.1}Si_{0.01}Al_{0.08}$ | 970 | 10 |
| Example 20 | $Lm(3)_{0.77}Mg_{0.23}Ni_{3.35}Al_{0.1}Ta_{0.005}$ | 940 | 5 |
| Example 21 | $Lm(2)_{0.8}Mg_{0.2}Ni_{3.4}Co_{0.05}Mn_{0.02}Al_{0.1}Mo_{0.005}$ | 935 | 8 |
| Example 22 | $La_{0.71}Ce_{0.07}Mg_{0.22}Ni_{3.35}Zn_{0.03}Al_{0.12}Li_{0.003}$ | 920 | 5 |
| Example 23 | $Lm(2)_{0.74}Y_{0.07}Mg_{0.19}Ni_{3.45}Co_{0.1}Sn_{0.01}$ | 930 | 4 |
| Example 24 | $Lm(1)_{0.71}Mg_{0.29}Ni_{3.25}Cu_{0.02}Al_{0.08}$ | 915 | 7 |
| Example 25 | $Lm(3)_{0.76}Mg_{0.24}Ni_{3.35}Co_{0.02}W_{0.002}B_{0.005}Al_{0.05}$ | 960 | 8 |
| Example 26 | $Lm(2)_{0.7}Mm(1)_{0.09}Mg_{0.21}Ni_{3.32}Al_{0.12}Ga_{0.03}$ | 950 | 9 |
| Example 27 | $Lm(1)_{0.71}Mm(2)_{0.05}Mg_{0.24}Ni_{3.3}Co_{0.06}Mn_{0.03}V_{0.002}Al_{0.07}$ | 965 | 5 |
| Example 28 | $Lm(4)_{0.76}Ca_{0.01}Mg_{0.23}Ni_{3.3}Cr_{0.003}Al_{0.14}$ | 980 | 2 |
| Example 29 | $Lm(1)_{0.755}Zr_{0.005}Mg_{0.24}Ni_{3.31}P_{0.002}Al_{0.1}$ | 955 | 10 |
| Example 30 | $Lm(2)_{0.785}Ti_{0.005}Mg_{0.21}Ni_{3.36}Al_{0.15}S_{0.003}$ | 965 | 8 |
| Example 31 | $Lm(2)_{0.76}Mg_{0.24}Ni_{3.18}Co_{0.15}Al_{0.12}$ | 950 | 7 |
| Example 32 | $Lm(1)_{0.73}Mm_{0.05}Mg_{0.22}Ni_{3.02}Co_{0.2}Mn_{0.01}Sn_{0.02}Al_{0.07}$ | 960 | 5 |
| Comparative Example 6 | $Mm(2)_{0.72}Mg_{0.28}Ni_{2.66}Co_{0.4}Mn_{0.4}Fe_{0.02}Al_{0.15}$ | 900 | 4 |
| Comparative Example 7 | $(La_{0.3}Ce_{0.49}Pr_{0.05}Nd_{0.14}Sm_{0.02})_{0.975}Mg_{0.025}Ni_3Mn_{0.35}Cu_{0.1}Ga_{0.05}$ | 900 | 12 |
| Comparative Example 8 | $Lm(1)_{0.917}Mg_{0.083}Ni_{4.75}$ | — | — |
| Comparative Example 9 | $La_{0.9}Mg_{0.1}Ni_{4.6}$ | 1000 | 5 |
| Comparative Example 10 | $La_{0.55}Mg_{0.45}Ni_{2.3}$ | 800 | 7 |

Note:
The alloys for Examples 26 to 28 and Comparative Example 6 were prepared by a rapid solidification process, and the alloy for Comparative Example 8 was prepared by a mechanical alloying method.

TABLE 5

|  | Capacity (mAh) | Cycle life | Rechargeable hydrogen storage capacity (H/M) | Crystal structure of principal phase | Principal phase content (% by volume) | Parallel growth content of crystal grain (% by volume) | Crystal grain ratio (%) | Crystal structure of parallel growth |
|---|---|---|---|---|---|---|---|---|
| Example 17 | 1350 | 325 | 1.08 | $Ce_2Ni_7$ type | 99 | 5 | 95 | $PuNi_3$ type |
| Example 18 | 1320 | 315 | 1.05 | $Ce_2Ni_7$ type + $PuNi_3$ type | 97 | 7 | 92 | $PuNi_3$ type + $A_5B_{19}$ type |
| Example 19 | 1330 | 290 | 1.04 | $Ce_2Ni_7$ type + $PuNi_3$ type | 93 | 15 | 88 | $CeNi_3$ type + $A_5B_{19}$ type |
| Example 20 | 1368 | 280 | 1.06 | $Ce_2Ni_7$ type + $CeNi_3$ type | 91 | 17 | 85 | $PuNi_3$ type + $A_5B_{19}$ type |
| Example 21 | 1365 | 295 | 1.04 | $Ce_2Ni_7$ type | 94 | 8 | 90 | $PuNi_3$ type |
| Example 22 | 1335 | 285 | 1.03 | $Ce_2Ni_7$ type | 93 | 14 | 82 | $A_5B_{19}$ type |
| Example 23 | 1355 | 280 | 1.02 | $Ce_2Ni_7$ type | 95 | 18 | 83 | $PuNi_3$ type + $A_5B_{19}$ type |
| Example 24 | 1350 | 285 | 0.98 | $Ce_2Ni_7$ type + $PuNi_3$ type | 96 | 20 | 85 | $CeNi_3$ type + $A_5B_{19}$ type |
| Example 25 | 1335 | 270 | 1.02 | $Ce_2Ni_7$ type | 92 | 24 | 72 | $PuNi_3$ type + $A_5B_{19}$ type |
| Example 26 | 1360 | 265 | 0.96 | $Ce_2Ni_7$ type + $Gd_2Co_7$ type | 90 | 30 | 70 | $CeNi_3$ type + $A_5B_{19}$ type |
| Example 27 | 1355 | 320 | 0.99 | $Ce_2Ni_7$ type | 94 | 4 | 90 | $PuNi_3$ type + $A_5B_{19}$ type |
| Example 28 | 1365 | 235 | 0.97 | $Ce_2Ni_7$ type | 90 | 8 | 88 | $PuNi_3$ type + $A_5B_{19}$ type |
| Example 29 | 1335 | 295 | 0.88 | Similar to $Ce_2Ni_7$ type | 91 | 10 | 75 | $PuNi_3$ type + $A_5B_{19}$ type |
| Example 30 | 1355 | 275 | 0.86 | Similar to $Ce_2Ni_7$ type | 88 | 18 | 80 | $PuNi_3$ type + $A_5B_{19}$ type |
| Example 31 | 1345 | 250 | 0.84 | Similar to $PuNi_3$ type | 85 | 35 | 65 | $Ce_2Ni_7$ type + $A_5B_{19}$ type |
| Example 32 | 1350 | 220 | 0.83 | Similar to $PuNi_3$ type | 78 | 40 | 60 | $Ce_2Ni_7$ type + $A_5B_{19}$ type |

TABLE 5-continued

|  | Capacity (mAh) | Cycle life | Rechargeable hydrogen storage capacity (H/M) | Crystal structure of principal phase | Principal phase content (% by volume) | Parallel growth content of crystal grain (% by volume) | Crystal grain ratio (%) | Crystal structure of parallel growth |
|---|---|---|---|---|---|---|---|---|
| Comparative Example 6 | 1250 | 70 | 0.68 | $CaCu_5$ type | 82 | 55 | 55 | $Ce_2Ni_7$ type |
| Comparative Example 7 | 1030 | 25 | 0.57 | $Ce_2Ni_7$ type | 65 | 50 | 50 | $CaCu_5$ type + $PuNi_3$ type |
| Comparative Example 8 | 740 | 10 | 0.45 | $CaCu_5$ type | 93 | 3 | 88 | $Ce_2Ni_7$ type + $A_5B_{19}$ type |
| Comparative Example 9 | 1200 | 15 | 0.69 | $CaCu_5$ type | 92 | 15 | 78 | $Ce_2Ni_7$ type + $A_5B_{19}$ type |
| Comparative Example 10 | 750 | 15 | 0.42 | $MgCu_2$ type | 72 | 30 | 45 | $PuNi_3$ type |

To reiterate, the hydrogen absorbing alloy for each of Examples 17 to 32 contains as the principal phase at least one kind of the phase selected from the group consisting of the first phase referred to previously and the second phase referred to previously, and has a composition represented by formula (1) given previously. Also, a parallel growth region that has a crystal structure differing from the crystal structure of the principal phase precipitates in at least one crystal grain of the principal phase in the hydrogen absorbing alloy for each of Examples 17 to 32. As apparent from Tables 4 and 5, the rechargeable hydrogen storage capacity of the hydrogen absorbing alloy for each of Examples 17 to 32 is larger than that of the hydrogen absorbing alloy for each of Comparative Examples 6 to 10. Incidentally, the hydrogen absorbing alloy for Comparative Example 6 has a composition equal to that of the hydrogen absorbing alloy disclosed in U.S. Pat. No. 5,840,166 and contains the $CaCu_5$ type phase as the principal phase. Also, the hydrogen absorbing alloy for Comparative Example 7 has a composition equal to that of the hydrogen absorbing alloy disclosed in Japanese Patent Disclosure No. 11-29832, and contains as the principal phase the $Ce_2Ni_7$ type phase. On the other hand, the hydrogen absorbing alloy for Comparative Example 8 has a composition equal to that of the hydrogen absorbing alloy disclosed in Japanese Patent Disclosure No. 10-1731.

It is also seen that the secondary battery for each of Examples 17 to 32 was superior to the secondary battery for each of Comparative Examples 6 to 10 in each of the discharge capacity and the charge-discharge cycle life.

EXAMPLES 33 TO 40

Hydrogen absorbing alloys were prepared by the high frequency induction melting method as described in the following.

(High Frequency Induction Melting Method)

Each of the elements constituting the composition shown in Table 6 was weighed, followed by melting the composition in a high frequency induction furnace under an argon gas atmosphere so as to obtain an alloy ingot. Then, a heat treatment was applied to the alloy ingot thus obtained under an argon gas atmosphere and under the conditions shown in Table 6 so as to obtain hydrogen absorbing alloys for Examples 33 to 40.

A cylindrical nickel hydrogen secondary battery was assembled as in Example 1 by using each of the hydrogen absorbing alloys thus prepared.

The secondary battery prepared in each of Examples 33 to 40 was left to stand under room temperature for 36 hours. Then, each of the discharge capacity and the charge-discharge cycle life of the secondary battery were measured as in Example 1 so as to obtain the results shown in Table 6.

The rechargeable hydrogen storage capacity, the crystal structure and the content of the principal phase, the content of the $AB_2$ type phase, the content of the parallel growth in the crystal grain, the crystal grain ratio, and the crystal structure of the parallel growth were measured as in Examples 1 and 17 in respect of the hydrogen absorbing alloy used in the secondary battery for each of Examples 33 to 40. Tables 6 and 7 show the results.

TABLE 6

|  | Composition | Heat treatment conditions | | Capacity (mAh) | Cycle life | Rechargeable hydrogen storage capacity (H/M) |
|---|---|---|---|---|---|---|
|  |  | Temperature (° C.) | Time (h) |  |  |  |
| Example 33 | $Lm(1)_{0.76}Mg_{0.24}Ni_{3.32}Al_{0.11}$ | 910 | 7 | 1350 | 325 | 1.04 |
| Example 34 | $Lm(2)_{0.77}Mg_{0.23}Ni_{3.24}Co_{0.05}Al_{0.11}$ | 930 | 5 | 1340 | 330 | 1.05 |
| Example 35 | $Lm(3)_{0.77}Mg_{0.23}Ni_{3.24}Mn_{0.02}Al_{0.13}$ | 950 | 7 | 1345 | 320 | 1.04 |
| Example 36 | $Lm(3)_{0.79}Mg_{0.21}Ni_{3.3}Mn_{0.08}Al_{0.12}$ | 955 | 4 | 1360 | 340 | 1.06 |
| Example 37 | $Lm(4)_{0.78}Mg_{0.22}Ni_{3.15}Co_{0.1}Mn_{0.03}Al_{0.15}$ | 960 | 8 | 1365 | 305 | 1.04 |
| Example 38 | $Lm(3)_{0.77}Mg_{0.23}Ni_{3.24}Cu_{0.03}Al_{0.11}$ | 955 | 10 | 1350 | 335 | 1.03 |

TABLE 6-continued

|  | Composition | Heat treatment conditions | | Capacity (mAh) | Cycle life | Rechargeable hydrogen storage capacity (H/M) |
|---|---|---|---|---|---|---|
|  |  | Temperature (° C.) | Time (h) |  |  |  |
| Example 39 | $Lm(2)_{0.77}Mg_{0.23}Ni_{3.3}Al_{0.13}$ | 935 | 6 | 1365 | 340 | 1.03 |
| Example 40 | $Lm(3)_{0.76}Mg_{0.24}Ni_{3.3}Al_{0.12}$ | 940 | 7 | 1360 | 345 | 1.05 |

TABLE 7

| | Crystal structure of principal phase | Principal phase content (% by volume) | Content of $AB_2$ type phase (% by volume) | Parallel growth content of crystal grain (% by volume) | Crystal grain ratio (%) | Crystal structure of parallel growth |
|---|---|---|---|---|---|---|
| Example 33 | $Ce_2Ni_7$ type | 98 | 0 | 5 | 95 | $PuNi_3$ type + $A_5B_{19}$ type |
| Example 34 | $Ce_2Ni_7$ type + $PuNi_3$ type | 96 | 0.5 | 7 | 92 | $PuNi_3$ type + $A_5B_{19}$ type |
| Example 35 | $Ce_2Ni_7$ type | 92 | 1.1 | 12 | 88 | $CeNi_3$ type + $A_5B_{19}$ type |
| Example 36 | $Ce_2Ni_7$ type | 95 | 1.5 | 11 | 90 | $PuNi_3$ type + $A_5B_{19}$ type |
| Example 37 | $Ce_2Ni_7$ type | 94 | 0.8 | 8 | 90 | $PuNi_3$ type + $A_5B_{19}$ type |
| Example 38 | $Ce_2Ni_7$ type + $PuNi_3$ type | 97 | 0.4 | 6 | 92 | $CeNi_3$ type + $A_5B_{19}$ type |
| Example 39 | $Ce_2Ni_7$ type | 96 | 0.7 | 7 | 93 | $PuNi_3$ type + $A_5B_{19}$ type |
| Example 40 | $Ce_2Ni_7$ type | 94 | 0.9 | 8 | 95 | $PuNi_3$ type + $A_5B_{19}$ type |

As apparent from Tables 6 and 7, the secondary battery for each of Examples 33 to 40 has a long charge-discharge cycle life, which exceeds 300.

Table 8 shows the compositions of mish metals Lm and Mm referred to herein later in Tables 9, 11 and 13:

TABLE 8

(Lm, Mm shown in Tables 9, 11, 13 ... unit: wt %)

| | La | Ce | Pr | Nd | Sm |
|---|---|---|---|---|---|
| Lm(5) | 95 | 0.4 | 1.2 | 3.4 | — |
| Lm(6) | 83 | 1.3 | 2.3 | 13.4 | — |
| Lm(7) | 71 | 2.2 | 5.6 | 21.2 | — |
| Lm(8) | 50 | 2.8 | 15.7 | 31.5 | — |
| Mm(3) | 35 | 53 | 1.8 | 9.9 | 0.3 |

EXAMPLES 41 TO 56 AND COMPARATIVE EXAMPLES 11 TO 15

Hydrogen absorbing alloys were prepared by the high frequency induction melting method, the rapid solidification process or the mechanical alloying method as described in the following.

(High Frequency Induction Melting Method)

Each of the elements constituting the composition shown in Table 9 was weighed, followed by melting the composition in a high frequency induction furnace under an argon gas atmosphere so as to obtain an alloy ingot. Then, a heat treatment was applied to the alloy ingot thus obtained under an argon gas atmosphere and under the conditions shown in Table 9 so as to obtain hydrogen absorbing alloys for Examples 41 to 48, 53 to 56 and Comparative Examples 12, 14, 15.

(Rapid Solidification Process)

Each of the elements constituting the composition shown in Table 9 was weighed, followed by melting the composition in a high frequency induction furnace under an argon gas atmosphere so as to obtain an alloy ingot. The alloy ingot thus obtained was melted, followed by dripping the resultant melt onto the surface of a single roll made of copper and rotating at a peripheral velocity of 5 m/sec under an argon gas atmosphere so as to rapidly cool the melt and, thus, to obtain a flake-like hydrogen absorbing alloy. Further, a heat treatment was applied to the resultant hydrogen absorbing alloy flakes under an argon gas atmosphere and under the conditions shown in Table 9 so as to obtain hydrogen absorbing alloys for Examples 49 to 52 and Comparative Example 11.

(Mechanical Alloying Method)

A raw material metal mixture prepared by mixing Lm(5) and Ni at an atomic ratio Lm(5):Ni of 1:3 was melted in an arc furnace, followed by cooling the melt so as to obtain an alloy (a) consisting of a $Lm(5)Ni_3$ phase. Also, another raw material metal mixture prepared by mixing Lm(5) and Ni at an atomic ratio Lm(5):Ni of 1:4 was melted in an arc furnace, followed by cooling the melt so as to obtain an alloy (b) consisting of a $Lm(5)Ni_4$ phase. The alloy (a) in an amount of 100 g and the alloy (b) in an amount of 100 g were put in a planetary ball mill having steel balls put therein so as to be subjected to a mechanical alloying for 10 hours at room temperature under an argon gas atmosphere, thereby obtaining an alloy (c) consisting of a Lm(5)Ni$_3$ phase, a Lm(5)Ni$_4$ phase and a Lm(5)$_5$Ni$_{19}$ phase.

On the other hand, a raw material metal mixture prepared by mixing Lm(5), Mg and Ni at an atomic ratio Lm(5):Mg:Ni of 0.9:0.1:5 was melted in an arc furnace, followed by cooling the melt so as to obtain an alloy (d) consisting of a Lm(5)$_{0.9}$Mg$_{0.1}$Ni$_5$ phase. The alloy (d) in an amount of 30 g and the alloy (c) in an amount of 300 g were put in a planetary ball mill having steel balls put therein so as to be subjected to a mechanical alloying for 10 hours at room temperature under an argon gas atmosphere, thereby obtaining an alloy for Comparative Example 13 consisting of a Lm(5)Ni$_3$ phase, a Lm(5)Ni$_4$ phase, a Lm(5)$_5$Ni$_{19}$ phase and a Lm(5)$_{0.9}$Mg$_{0.1}$Ni$_5$ phase.

Each of the hydrogen absorbing alloys thus prepared was pulverized under an inert gas atmosphere so as to permit the pulverized powder to have an average particle diameter of 50 µm. Then, 0.5 parts by weight of a nickel powder available on the market, which had been prepared by the carbonyl method, and 0.5 parts by weight of a Ketchen black powder were added to and mixed with 100 parts by weight of the alloy powder thus prepared. Further, a paste was prepared by adding 1 parts by weight of styrene butadiene rubber (SBR), 0.2 parts by weight of sodium polyacrylate, 0.2 parts by weight of carboxymethyl cellulose, and 50 parts by weight of water to 100 parts by weight of the mixed powder, followed by stirring the mixture. Still further, a punched thin iron plate having a nickel plating applied to the surface was coated with the paste thus obtained, followed by drying the paste so as to obtain a coated plate. The thickness of the coated plate thus obtained was adjusted by applying a roll press to the coated plate, followed by cutting the coated plate into pieces each having a desired size so as to prepare a negative electrode containing 3.5 g of the hydrogen absorbing alloy.

On the other hand, prepared as a separator was a polyolefin based unwoven fabric having acrylic acid introduced therein by a graft copolymerization.

An electrode group was prepared by spirally winding a laminate structure comprising the negative electrode prepared as described above, a paste type nickel positive electrode having a nominal capacity of 700 mAh, which had been prepared by the known method, and the separator described above, which was interposed between the positive electrode and the negative electrode.

The electrode group thus prepared was put in a cylindrical case together with 1.5 ml of an alkaline electrolyte containing 7 mol of KOH and 1 mol of LiOH, followed by sealing the case so as to assemble a cylindrical nickel hydrogen secondary battery of size AAA having a nominal capacity of 700 mAh.

Each of the secondary batteries prepared in Examples 41 to 56 and Comparative Examples 11 to 15 was left to stand at room temperature for 24 hours. Then, a charge-discharge cycle, in which the secondary battery was charged under a current of 70 mA for 15 hours, followed by discharging the secondary battery under a current of 70 mA until the battery voltage was lowered to 0.7V, was carried out four times. Further, the charge-discharge cycle was repeated under an environment of 45° C. so as to measure the number of cycles reached at the time when the discharge capacity of the secondary battery was lowered to 80% of the discharge capacity of the first cycle. Table 10 shows the number of cycles and the discharge capacity of the first cycle. Incidentally, the charging process of the charge-discharge cycle was performed by employing a −ΔV method in which the charging current was set at 700 mA and the charging was finished at the time when the voltage was lowered by 10 mV from the maximum voltage in the charging process. On the other hand, the discharge process was performed under a current of 1,400 mA until the battery voltage was lowered to 1.0V.

Also, characteristics (A) to (E) given below were measured in respect of the hydrogen absorbing alloy used in the secondary battery for each of Examples 41 to 56 and Comparative Examples 11 to 15:

(A) A rechargeable hydrogen storage capacity (which is a term for a hydrogen absorbing alloy specified in JIS H7003) was obtained as a hydrogen absorption characteristic for each of the hydrogen absorbing alloys by measuring the iso-thermal line of pressure-composition at 50° C. and under a hydrogen pressure lower than 10 atm. by the Sievert's method (JIS H7201). Table 10 shows the results.

(B) The intensity ratio ($I_1/I_2$) of each of the hydrogen absorbing alloys was calculated from the X-ray diffraction pattern by using a Cu-Kα ray as the X-ray source. Table 10 shows the results. Incidentally, $I_2$ used for calculating the intensity ratio denotes an intensity of a peak having a highest intensity in the X-ray diffraction pattern. On the other hand, $I_1$ denotes an intensity of a peak having a highest intensity observed at the value of 2θ falling within a range of from 8° to 13°.

(C) The crystal structure of each of the hydrogen absorbing alloys was observed from the X-ray diffraction pattern obtained in item (B) given above so as to determine the crystal structure of the principal phase. Table 10 shows the results.

In the hydrogen absorbing alloy for Example 53, the peak having the highest intensity appeared at the value of 2θ falling within a range of 42.1°±1° in the X-ray diffraction pattern, and a peak appeared at the value of 2θ falling within a range of from 31° to 34° was found as being split into three. The intensity of the three-split peak was lower than that of peak P1 in diffraction pattern (a) of the normal structure referred to previously. On the other hand, in the hydrogen absorbing alloy for Example 54, the peak having the highest intensity appeared at the value of 2θ falling within a range of 42.1°±1° in the X-ray diffraction pattern, and a peak having an intensity lower than that of peak P1 referred previously appeared at the value of 2θ falling within a range of from 31° to 34°. Incidentally, the intensity ratio calculated by formula (I) referred to previously on the basis of the diffraction pattern of the hydrogen absorbing alloy for Example 54 was found to be 23%.

Further, the electron diffraction analysis pattern for the hydrogen absorbing alloy for each of Examples 53 and 54 was photographed by a transmission electron microscope (TEM). It has been found that there were four supper lattice reflection spots between the primitive lattice reflection points (00L) and the origin (000) in the hydrogen absorbing alloy for each of Examples 53 and 54. It has also been found that the supper lattice reflection spots were present in four points at which the distance |G$_{00L}$| between the primitive lattice reflection spot (00L) and the origin (000) was equally divided into five sections.

Also, the peak having the highest intensity appeared at the value of 2θ falling within a range of 42.1°±1° in the X-ray diffraction pattern of the hydrogen absorbing alloy for Example 55. Further, a peak appeared at the value of 2θ falling within a range of from 31° to 34° in the X-ray diffraction pattern was found as being split into four. The intensity of the four-split peak was found to be lower than that of the peak appearing in the diffraction pattern of the normal structure referred to previously. On the other hand, the peak having the highest intensity appeared at the value of 2θ falling within a range of 42.1°±1° in the X-ray diffraction pattern of the hydrogen absorbing alloy for Example 56. Also, a peak having an intensity lower than that of peak of the normal structure referred to previously appeared at the value of 2θ falling within a range of from 31° to 34°. Incidentally, the intensity ratio calculated by formula (I) referred to previously on the basis of the diffraction pattern of the hydrogen absorbing alloy for Example 56 was found to be 19%.

(D) A secondary electron image and a reflected electron image of each of the hydrogen absorbing alloys was photographed by using a scanning electron microscope (SEM) so as to detect a phase differing from the principal phase. The composition of the phase differing from the principal phase was analyzed by an energy dispersive X-ray spectroscopy (EDX) of the scanning electron microscope. It has been found from the result of the composition analysis and the X-ray diffraction pattern obtained in item (B) referred to above that the phase differing from the principal phase was a phase having a $MgCu_2$ type crystal structure.

(E) The content of the $MgCu_2$ type phase was measured as follows for each of the hydrogen absorbing alloys so as to obtain the results as shown in Table 10.

Optional five view fields of the hydrogen absorbing alloy for each of Examples 41 to 48, 53 to 56 and Comparative Examples 12, 14, 15 were photographed by a scanning electron microscope. The area ratio of the target phase based on the alloy area within the view field was obtained for each of the micrographs. The average value of the area ratios thus obtained was calculated and given in Table 10 as the volume ratio of the target phase in the hydrogen absorbing alloy.

On the other hand, optional five view fields of the hydrogen absorbing alloy for each of Examples 49 to 52 and Comparative Examples 11, 13 were photographed by a transmission electron microscope. The area ratio of the target phase based on the alloy area within the view field was obtained for each of the micrographs. The average value of the area ratios thus obtained was calculated and given in Table 10 as the volume ratio of the target phase in the hydrogen absorbing alloy.

TABLE 9

| | Composition | Heat treatment conditions Temperature (° C.) | Time (h) |
|---|---|---|---|
| Example 41 | $Lm(7)_{0.77}Mg_{0.23}Ni_{3.3}Al_{0.12}$ | 945 | 10 |
| Example 42 | $La_{0.6}Pr_{0.14}Mg_{0.26}Ni_{3.29}Mn_{0.02}Si_{0.01}Al_{0.07}$ | 950 | 8 |
| Example 43 | $La_{0.53}Nd_{0.2}Mg_{0.27}Ni_{3.1}Co_{0.12}Fe_{0.01}Al_{0.1}$ | 955 | 6 |
| Example 44 | $Lm(5)_{0.77}Mg_{0.23}Ni_{3.3}Al_{0.11}Mo_{0.003}$ | 920 | 5 |
| Example 45 | $Lm(8)_{0.8}Mg_{0.2}Ni_{3.34}Co_{0.05}Mn_{0.02}Al_{0.1}Ta_{0.005}$ | 985 | 7 |
| Example 46 | $La_{0.77}Ce_{0.03}Mg_{0.2}Ni_{3.45}Zn_{0.02}Al_{0.12}Li_{0.005}$ | 920 | 6 |
| Example 47 | $Lm(5)_{0.74}Y_{0.07}Mg_{0.19}Ni_{3.24}Co_{0.08}Sn_{0.01}Al_{0.08}$ | 915 | 9 |
| Example 48 | $Lm(6)_{0.7}Mg_{0.3}Ni_{3.23}Cu_{0.02}Al_{0.09}$ | 935 | 7 |
| Example 49 | $Lm(7)_{0.76}Mg_{0.24}Ni_{3.3}Co_{0.02}W_{0.002}B_{0.01}Al_{0.11}$ | 950 | 2 |
| Example 50 | $Lm(5)_{0.68}Mm(3)_{0.11}Mg_{0.21}Ni_{3.14}Co_{0.2}Al_{0.12}Ga_{0.03}$ | 935 | 1 |
| Example 51 | $Lm(5)_{0.76}Mg_{0.24}Ni_{3.3}Co_{0.06}Mn_{0.03}V_{0.002}Al_{0.07}$ | 915 | 3 |
| Example 52 | $Lm(8)_{0.76}Ca_{0.01}Mg_{0.23}Ni_{3.3}Cr_{0.002}Al_{0.11}$ | 975 | 2 |
| Example 53 | $Lm(6)_{0.765}Zr_{0.005}Mg_{0.23}Ni_{3.31}P_{0.002}Al_{0.1}$ | 935 | 4 |
| Example 54 | $Lm(7)_{0.775}Ti_{0.005}Mg_{0.22}Ni_{3.36}Al_{0.15}S_{0.003}$ | 940 | 3 |
| Example 55 | $Lm(7)_{0.77}Mg_{0.23}Ni_{3.16}Co_{0.063}Al_{0.12}$ | 940 | 5 |
| Example 56 | $Lm(5)_{0.73}Mm(3)_{0.05}Mg_{0.22}Ni_{3.08}Co_{0.1}Mn_{0.01}Sn_{0.02}Al_{0.07}$ | 950 | 4 |
| Comparative Example 11 | $Mm(3)_{0.65}Mg_{0.35}Ni_{2.27}Co_{0.3}Mn_{0.3}Fe_{0.02}Al_{0.14}$ | 900 | 4 |
| Comparative Example 12 | $Mm(3)_{0.975}Mg_{0.025}Ni_{2.925}Mn_{0.35}Cu_{0.1}Nb_{0.075}$ | 900 | 12 |
| Comparative Example 13 | $Lm(5)_{0.917}Mg_{0.083}Ni_{4.75}$ | — | — |
| Comparative Example 14 | $La_{0.33}Mg_{0.67}Ni_3$ | 1000 | 4 |
| Comparative Example 15 | $Lm(5)_{0.5}Mg_{0.5}Ni_{2.2}$ | 800 | 5 |

Note:
The alloys for Examples 49 to 52 and Comparative Example 11 were prepared by a rapid solidification process, and the alloy for Comparative Example 13 was prepared by a mechanical alloying method.

TABLE 10

| | Capacity (mAh) | Cycle life | Rechargeable hydrogen storage capacity (H/M) | Crystal structure of principal phase | Intensity ratio ($I_1/I_2$) | Content of $AB_2$ type phase (% by volume) |
|---|---|---|---|---|---|---|
| Example 41 | 610 | 320 | 1.07 | $Ce_2Ni_7$ type | 0.005 | 0.1 |
| Example 42 | 605 | 320 | 1.03 | $Ce_2Ni_7$ type + $PuNi_3$ type | 0.008 | 0.2 |
| Example 43 | 610 | 295 | 1.06 | $Ce_2Ni_7$ type + $CeNi_3$ type | 0 | 0.8 |
| Example 44 | 600 | 290 | 1.05 | $Ce_2Ni_7$ type + $PuNi_3$ type | 0.002 | 0.5 |
| Example 45 | 605 | 295 | 1.08 | $Ce_2Ni_7$ type | 0.01 | 0.8 |

TABLE 10-continued

|  | Capacity (mAh) | Cycle life | Rechargeable hydrogen storage capacity (H/M) | Crystal structure of principal phase | Intensity ratio ($I_1/I_2$) | Content of $AB_2$ type phase (% by volume) |
|---|---|---|---|---|---|---|
| Example 46 | 595 | 285 | 0.94 | $Ce_2Ni_7$ type + $PuNi_3$ type | 0.004 | 1.9 |
| Example 47 | 590 | 280 | 0.92 | $Ce_2Ni_7$ type | 0.009 | 2.6 |
| Example 48 | 585 | 285 | 1.08 | $Ce_2Ni_7$ type + $PuNi_3$ type | 0 | 2.4 |
| Example 49 | 595 | 270 | 0.94 | $Ce_2Ni_7$ type | 0.007 | 2.9 |
| Example 50 | 600 | 265 | 0.96 | $Ce_2Ni_7$ type + $Gd_2Co_7$ type | 0.011 | 4.6 |
| Example 51 | 610 | 310 | 0.99 | $Ce_2Ni_7$ type | 0.008 | 0.4 |
| Example 52 | 615 | 230 | 0.97 | $Ce_2Ni_7$ type | 0.006 | 2.2 |
| Example 53 | 610 | 295 | 0.89 | Similar to $Ce_2Ni_7$ type | 0.01 | 1.1 |
| Example 54 | 615 | 275 | 0.87 | Similar to $Ce_2Ni_7$ type | 0 | 3.6 |
| Example 55 | 610 | 250 | 0.86 | Similar to $PuNi_3$ type | 0.003 | 4.1 |
| Example 56 | 605 | 240 | 0.85 | Similar to $PuNi_3$ type | 0.007 | 5.1 |
| Comparative Example 11 | 550 | 75 | 0.7 | $CaCu_5$ type | 0.08 | 14 |
| Comparative Example 12 | 560 | 25 | 0.58 | $Ce_2Ni_7$ type | 0.002 | 17 |
| Comparative Example 13 | 460 | 10 | 0.44 | $CaCu_5$ type | 0 | 0 |
| Comparative Example 14 | 540 | 10 | 0.25 | $PuNi_3$ type | 0.23 | 19 |
| Comparative Example 15 | 420 | 15 | 0.34 | $MgCu_2$ type | 0.17 | 78 |

To reiterate, the hydrogen absorbing alloy for each of Examples 41 to 56 had a composition represented by formula (3) given previously and had less than 0.15 of the intensity ratio calculated by formula (2) given previously. Also, the amount of the $AB_2$ type phase such as the $MgCu_2$ type phase contained in the hydrogen absorbing alloy was not larger than 10% by volume. As apparent from Tables 9 and 10, the rechargeable hydrogen storage capacity of the hydrogen absorbing alloy for each of Examples 41 to 56 was larger than that of the hydrogen absorbing alloy for each of Comparative Examples 11 to 15. Incidentally, the hydrogen absorbing alloy for Comparative Example 11 had a composition equal to that of the hydrogen absorbing alloy disclosed in U.S. Pat. No. 5,840,166. And the hydrogen absorbing alloy for Comparative Example 11 contained the $AB_2$ type phase in an amount exceeding 10% by volume. Also, the hydrogen absorbing alloy for Comparative Example 12 had a composition equal to that of the hydrogen absorbing alloy disclosed in Japanese Patent Disclosure No. 11-29832. And the hydrogen absorbing alloy for Comparative Example 12 contained the $AB_2$ type phase in an amount exceeding 10% by volume. On the other hand, the hydrogen absorbing alloy for Comparative Example 13 had a composition equal to that of the hydrogen absorbing alloy disclosed in Japanese Patent Disclosure No. 10-1731.

It is also seen that the secondary battery for each of Examples 41 to 56 was found to be superior to the secondary battery for each of Comparative Examples 11 to 15 in each of the discharge capacity and the charge-discharge cycle life.

EXAMPLES 57 TO 72 AND COMPARATIVE EXAMPLES 16 TO 20

Hydrogen absorbing alloys were prepared by the high frequency induction melting method, the rapid solidification process or the mechanical alloying method as described in the following.

(High Frequency Induction Melting Method)

Each of the elements constituting the composition shown in Table 11 was weighed, followed by melting the composition in a high frequency induction furnace under an argon gas atmosphere so as to obtain an alloy ingot. Then, a heat treatment was applied to the alloy ingot thus obtained under an argon gas atmosphere and under the conditions shown in Table 11 so as to obtain hydrogen absorbing alloys for Examples 57 to 65 and 69 to 72 and Comparative Examples 17, 19, 20.

(Rapid Solidification Process)

Each of the elements constituting the composition shown in Table 11 was weighed, followed by melting the composition in a high frequency induction furnace under an argon gas atmosphere so as to obtain an alloy ingot. The alloy ingot thus obtained was melted, followed by dripping the resultant melt onto the surface of a single roll made of copper and rotating at a peripheral velocity of 7 m/sec under an argon gas atmosphere so as to rapidly cool the melt and, thus, to obtain a flake-like hydrogen absorbing alloy. Further, a heat treatment was applied to the resultant hydrogen absorbing alloy flakes under an argon gas atmosphere and under the conditions shown in Table 11 so as to obtain hydrogen absorbing alloys for Examples 66 to 68 and Comparative Example 16.

(Mechanical Alloying Method)

A raw material metal mixture prepared by mixing Lm(6) and Ni at an atomic ratio Lm(6):Ni of 1:3 was melted in an arc furnace, followed by cooling the melt so as to obtain an alloy (a) consisting of a $Lm(6)Ni_3$ phase. Also, another raw material metal mixture prepared by mixing Lm(6) and Ni at an atomic ratio Lm(6):Ni of 1:4 was melted in an arc furnace, followed by cooling the melt so as to obtain an alloy (b) consisting of a $Lm(6)Ni_4$ phase. The alloy (a) in an amount of 100 g and the alloy (b) in an amount of 100 g were put in a planetary ball mill having steel balls put therein so as to be subjected to a mechanical alloying for 10 hours at room temperature under an argon gas atmosphere, thereby obtaining an alloy (c) consisting of a $Lm(6)Ni_3$ phase, a $Lm(6)Ni_4$ phase and a $Lm(6)_5Ni_{19}$ phase.

On the other hand, a raw material metal mixture prepared by mixing Lm(6), Mg and Ni at an atomic ratio Lm(6):Mg:

Ni of 0.9:0.1:5 was melted in an arc furnace, followed by cooling the melt so as to obtain an alloy (d) consisting of a $Lm(6)_{0.9}Mg_{0.1}Ni_5$ phase. The alloy (d) in an amount of 30 g and the alloy (c) in an amount of 300 g were put in a planetary ball mill having steel balls put therein so as to be subjected to a mechanical alloying for 10 hours at room temperature under an argon gas atmosphere, thereby obtaining an alloy for Comparative Example 18 consisting of a $Lm(6)Ni_3$ phase, a $Lm(6)Ni_4$ phase, a $Lm(6)_5Ni_{19}$ phase and a $Lm(6)_{0.9}Mg_{0.1}Ni_5$ phase.

A cylindrical nickel hydrogen secondary battery was assembled as in Example 41 by using each of the hydrogen absorbing alloys thus prepared.

The secondary battery prepared in each of Examples 57 to 72 and Comparative Examples 16 to 20 was left to stand under room temperature for 24 hours. Then, each of the discharge capacity and the charge-discharge cycle life of the secondary battery were measured as in Example 41 so as to obtain the results shown in Table 12.

Also, characteristics (A) to (F) given below were measured in respect of the hydrogen absorbing alloy used in the secondary battery for each of Examples 57 to 72 and Comparative Examples 16 to 20:

(A) A rechargeable hydrogen storage capacity was obtained for each of the hydrogen absorbing alloys as in Example 41. Table 12 shows the results.

(B) The intensity ratio $(I_1/I_2)$ of each of the hydrogen absorbing alloys was calculated from the X-ray diffraction pattern by using a Cu-Kα ray as the X-ray source. Table 12 shows the results.

(C) The crystal structure of each of the hydrogen absorbing alloys was observed from the X-ray diffraction pattern obtained in item (B) above so as to determine the crystal structure of the principal phase. Table 12 shows the results.

In the hydrogen absorbing alloy for Example 69, the peak having the highest intensity appeared at the value of 2θ falling within a range of 42.1°±1° in the X-ray diffraction pattern, and a peak appeared at the value of 2θ falling within a range of from 31° to 34° was found as being split into three. The intensity of the three-split peak was lower than that of peak P1 in diffraction pattern (a) of the normal structure referred to previously. On the other hand, in the hydrogen absorbing alloy for Example 70, the peak having the highest intensity appeared at the value of 2θ falling within a range of 42.1°±1° in the X-ray diffraction pattern, and a peak having an intensity lower than that of peak P1 referred previously appeared at the value of 2θ falling within a range of from 31° to 34°. Incidentally, the intensity ratio calculated by formula (I) referred to previously on the basis of the diffraction pattern of the hydrogen absorbing alloy for Example 70 was found to be 26%.

Further, the electron diffraction analysis pattern for the hydrogen absorbing alloy for each of Examples 69 and 70 was photographed by a transmission electron microscope (TEM). It has been found that there were four supper lattice reflection spots between the primitive lattice reflection points (00L) and the origin (000) in the hydrogen absorbing alloy for each of Examples 69 and 70. It has also been found that the supper lattice reflection spots were present in four points at which the distance $|G_{00L}|$ between the primitive lattice reflection spot (00L) and the origin (000) was equally divided into five sections.

Also, the peak having the highest intensity appeared at the value of 2θ falling within a range of 42.1°±1° in the X-ray diffraction pattern of the hydrogen absorbing alloy for Example 71. Further, a peak appeared at the value of 2θ falling within a range of from 31° to 34° was found as being split into two. The intensity of the two-split peak was found to be lower than that of the peak appearing in the diffraction pattern of the normal structure referred to previously. On the other hand, the peak having the highest intensity appeared at the value of 2θ falling within a range of 42.1°±1° in the X-ray diffraction pattern of the hydrogen absorbing alloy for Example 72. Also, a peak having an intensity lower than that of peak of the normal structure referred to previously appeared at the value of 2θ falling within a range of from 31° to 34°. Incidentally, the intensity ratio calculated by formula (I) referred to previously on the basis of the diffraction pattern of the hydrogen absorbing alloy for Example 72 was found to be 21%.

(D) The volume ratio of the parallel growth region in the crystal grain was measured as in Example 17 for each of the hydrogen absorbing alloys. Table 12 shows the results.

(E) A ratio of the number of crystal grains, in which the volume ratio of the parallel growth region was not higher than 40%, to the total number of crystal grains was calculated as in Example 17 and given in Table 12, said ratio being hereinafter referred to as a "crystal grain ratio".

(F) The composition of the parallel growth region excluding the principal phase of each of the hydrogen absorbing alloys was analyzed by an energy dispersive X-ray spectroscopy (EDX) of the scanning electron microscope. The crystal structure of the parallel growth region was specified from the result of the composition analysis and the X-ray diffraction pattern obtained in item (B) described previously. The results are shown in Table 12.

TABLE 11

| | Composition | Heat treatment conditions Temperature (° C.) | Time (h) |
|---|---|---|---|
| Example 57 | $Lm(5)_{0.78}Mg_{0.22}Ni_{3.34}Al_{0.12}$ | 915 | 6 |
| Example 58 | $Lm(5)_{0.62}Pr_{0.14}Mg_{0.24}Ni_{3.29}Mn_{0.02}Fe_{0.01}Al_{0.09}$ | 950 | 5 |
| Example 59 | $La_{0.63}Nd_{0.12}Mg_{0.25}Ni_{3.1}Co_{0.1}Si_{0.01}Al_{0.1}$ | 970 | 11 |
| Example 60 | $Lm(7)_{0.77}Mg_{0.23}Ni_{3.35}Al_{0.1}Ta_{0.003}$ | 945 | 6 |
| Example 61 | $Lm(6)_{0.8}Mg_{0.2}Ni_{3.4}Co_{0.05}Mn_{0.02}Al_{0.1}Mo_{0.002}$ | 930 | 7 |
| Example 62 | $La_{0.72}Ce_{0.05}Mg_{0.23}Ni_{3.35}Zn_{0.03}Al_{0.12}Li_{0.003}$ | 915 | 6 |
| Example 63 | $Lm(6)_{0.74}Y_{0.07}Mg_{0.19}Ni_{3.45}Co_{0.1}Sn_{0.01}$ | 930 | 5 |
| Example 64 | $Lm(5)_{0.74}Mg_{0.26}Ni_{3.25}Cu_{0.02}Al_{0.1}$ | 915 | 4 |
| Example 65 | $Lm(7)_{0.78}Mg_{0.22}Ni_{3.3}Co_{0.02}W_{0.002}B_{0.003}Al_{0.1}$ | 955 | 4 |
| Example 66 | $Lm(5)_{0.74}Mm(3)_{0.05}Mg_{0.21}Ni_{3.3}Al_{0.12}Ga_{0.03}$ | 915 | 3 |
| Example 67 | $Lm(6)_{0.76}Mg_{0.24}Ni_{3.3}Co_{0.06}Mn_{0.03}V_{0.002}Al_{0.1}$ | 935 | 4 |
| Example 68 | $Lm(8)_{0.76}Ca_{0.01}Mg_{0.23}Ni_{3.3}Cr_{0.003}Al_{0.12}$ | 975 | 2 |

TABLE 11-continued

|  | Composition | Heat treatment conditions Temperature (° C.) | Time (h) |
|---|---|---|---|
| Example 69 | $Lm(5)_{0.768}Zr_{0.002}Mg_{0.23}Ni_{3.31}P_{0.002}Al_{0.1}$ | 925 | 8 |
| Example 70 | $Lm(7)_{0.787}Ti_{0.003}Mg_{0.21}Ni_{3.36}Al_{0.13}S_{0.003}$ | 950 | 5 |
| Example 71 | $Lm(6)_{0.77}Mg_{0.23}Ni_{3.18}Co_{0.09}Al_{0.12}$ | 945 | 7 |
| Example 72 | $Lm(5)_{0.76}Mm(3)_{0.02}Mg_{0.22}Ni_{3.02}Co_{0.2}Mn_{0.01}Sn_{0.02}Al_{0.1}$ | 950 | 9 |
| Comparative Example 16 | $Mm(3)_{0.72}Mg_{0.28}Ni_{2.66}Co_{0.4}Mn_{0.4}Fe_{0.02}Al_{0.15}$ | 900 | 4 |
| Comparative Example 17 | $Mm(3)_{0.975}Mg_{0.025}Ni_{3}Mn_{0.35}Cu_{0.1}Ga_{0.05}$ | 900 | 12 |
| Comparative Example 18 | $Lm(6)_{0.917}Mg_{0.083}Ni_{4.75}$ | — | — |
| Comparative Example 19 | $Lm(6)_{0.33}Mg_{0.67}Ni_{3}$ | 1000 | 5 |
| Comparative Example 20 | $Lm(5)_{0.55}Mg_{0.45}Ni_{2.3}$ | 800 | 7 |

Note:
The alloys for Examples 66 to 68 and Comparative Example 16 were prepared by a rapid solidification process, and the alloy for Comparative Example 18 was prepared by a mechanical alloying method.

TABLE 12

|  | Capacity (mAh) | Cycle life | Rechargeable hydrogen storage capacity (H/M) | Intensity ratio ($I_1/I_2$) | Crystal structure of principal phase | Parallel growth content of crystal grain (% by volume) | Crystal grain ratio (%) | Crystal structure of parallel growth |
|---|---|---|---|---|---|---|---|---|
| Example 57 | 1355 | 325 | 1.06 | 0.003 | $Ce_2Ni_7$ type | 9 | 93 | $PuNi_3$ type + $A_5B_{19}$ type |
| Example 58 | 1350 | 315 | 1.04 | 0.002 | $Ce_2Ni_7$ type | 6 | 90 | $PuNi_3$ type |
| Example 59 | 1335 | 290 | 1.05 | 0 | $Ce_2Ni_7$ type + $CeNi_3$ type | 16 | 86 | $CeNi_3$ type + $A_5B_{19}$ type |
| Example 60 | 1360 | 280 | 1.06 | 0.002 | $Ce_2Ni_7$ type + $PuNi_3$ type | 14 | 87 | $PuNi_3$ type + $A_5B_{19}$ type |
| Example 61 | 1365 | 295 | 1.03 | 0 | $Ce_2Ni_7$ type | 7 | 91 | $PuNi_3$ type |
| Example 62 | 1350 | 285 | 1.04 | 0.005 | $Ce_2Ni_7$ type + $PuNi_3$ type | 17 | 84 | $A_5B_{19}$ type |
| Example 63 | 1335 | 280 | 1.02 | 0.002 | $Ce_2Ni_7$ type | 19 | 83 | $CeNi_3$ type + $A_5B_{19}$ type |
| Example 64 | 1360 | 285 | 0.99 | 0.003 | $Ce_2Ni_7$ type | 21 | 85 | $A_5B_{19}$ type |
| Example 65 | 1355 | 270 | 1.01 | 0.004 | $Ce_2Ni_7$ type | 22 | 75 | $PuNi_3$ type + $A_5B_{19}$ type |
| Example 66 | 1360 | 265 | 0.95 | 0.009 | $Ce_2Ni_7$ type + $Gd_2Co_7$ type | 31 | 70 | $CeNi_3$ type + $A_5B_{19}$ type |
| Example 67 | 1335 | 320 | 0.98 | 0.012 | $Ce_2Ni_7$ type | 6 | 90 | $PuNi_3$ type + $A_5B_{19}$ type |
| Example 68 | 1360 | 225 | 0.97 | 0.01 | $Ce_2Ni_7$ type | 9 | 87 | $PuNi_3$ type + $A_5B_{19}$ type |
| Example 69 | 1365 | 295 | 0.89 | 0.011 | Similar to $Ce_2Ni_7$ type | 11 | 76 | $CeNi_3$ type + $A_5B_{19}$ type |
| Example 70 | 1365 | 275 | 0.87 | 0.007 | Similar to $Ce_2Ni_7$ type | 17 | 80 | $PuNi_3$ type + $A_5B_{19}$ type |
| Example 71 | 1350 | 250 | 0.85 | 0.005 | Similar to $PuNi_3$ type | 32 | 66 | $Ce_2Ni_7$ type + $A_5B_{19}$ type |
| Example 72 | 1335 | 220 | 0.86 | 0.004 | Similar to $PuNi_3$ type | 39 | 61 | $Ce_2Ni_7$ type + $A_5B_{19}$ type |
| Comparative Example 16 | 1240 | 70 | 0.66 | 0.03 | $CaCu_5$ type | 60 | 53 | $Ce_2Ni_7$ type |
| Comparative Example 17 | 1000 | 25 | 0.55 | 0.01 | $Ce_2Ni_7$ type | 52 | 65 | $CaCu_5$ type + $PuNi_3$ type |
| Comparative Example 18 | 720 | 10 | 0.5 | 0 | $CaCu_5$ type | 5 | 85 | $Ce_2Ni_7$ type + $A_5B_{19}$ type |
| Comparative Example 19 | 680 | 15 | 0.22 | 0.28 | $PuNi_3$ type | 15 | 78 | $Ce_2Ni_7$ type + $A_5B_{19}$ type |
| Comparative Example 20 | 740 | 15 | 0.39 | 0.31 | $MgCu_2$ type | 28 | 55 | $PuNi_3$ type |

To reiterate, the hydrogen absorbing alloy for each of Examples 57 to 72 had a composition represented by formula (3) given previously and had less than 0.15 of the intensity ratio calculated by formula (2) given previously. Also, the parallel growth region that has a crystal structure differing from the crystal structure of the principal phase precipitates in at least one crystal grain of the principal phase. As apparent from Tables 11 and 12, the rechargeable hydrogen storage capacity of the hydrogen absorbing alloy for each of Examples 57 to 72 was larger than that of the hydrogen absorbing alloy for each of Comparative Examples 16 to 20. Incidentally, the hydrogen absorbing alloy for Comparative Example 16 had a composition equal to that of the hydrogen absorbing alloy disclosed in U.S. Pat. No. 5,840,166 and contained the $CaCu_5$ type phase as the principal phase. Also, the hydrogen absorbing alloy for Comparative Example 17 had a composition equal to that of the hydrogen absorbing alloy disclosed in Japanese Patent Disclosure No. 11-29832 and contained the $Ce_2Ni_7$ type phase as the principal phase. On the other hand, the hydrogen absorbing alloy for Comparative Example 18 had a composition equal to that of the hydrogen absorbing alloy disclosed in Japanese Patent Disclosure No. 10-1731.

It is also seen that the secondary battery for each of Examples 57 to 72 was found to be superior to the secondary battery for each of Comparative Examples 16 to 20 in each of the discharge capacity and the charge-discharge cycle life.

EXAMPLES 73 TO 80

Hydrogen absorbing alloys were prepared by the high frequency induction melting method as described in the following.

(High Frequency Induction Melting Method)

Each of the elements constituting the composition shown in Table 13 was weighed, followed by melting the composition in a high frequency induction furnace under an argon gas atmosphere so as to obtain an alloy ingot. Then, a heat treatment was applied to the alloy ingot thus obtained under an argon gas atmosphere and under the conditions shown in Table 13 so as to obtain hydrogen absorbing alloys for Examples 73 to 80.

A cylindrical nickel hydrogen secondary battery was assembled as in Example 41 by using each of the hydrogen absorbing alloys thus prepared.

The secondary battery prepared in each of Examples 73 to 80 was left to stand under room temperature for 24 hours. Then, each of the discharge capacity and the charge-discharge cycle life of the secondary battery were measured as in Example 41 so as to obtain the results shown in Table 13.

The rechargeable hydrogen storage capacity, the intensity ratio ($I_1/I_2$), the crystal structure of the principal phase, the content of the $AB_2$ type phase, the content of the parallel growth region in the crystal grain, the crystal grain ratio, and the crystal structure of the parallel growth region were measured as in Examples 41 and 57 in respect of the hydrogen absorbing alloy used in the secondary battery for each of Examples 73 to 80. Tables 13 and 14 show the results.

TABLE 13

|  | Composition | Heat treatment conditions Temperature (° C.) | Heat treatment conditions Time (h) | Capacity (mAh) | Cycle life | Rechargeable hydrogen storage capacity (H/M) |
|---|---|---|---|---|---|---|
| Example 73 | $Lm(5)_{0.77}Mg_{0.23}Ni_{3.3}Al_{0.12}$ | 915 | 8 | 1350 | 335 | 1.06 |
| Example 74 | $Lm(6)_{0.77}Mg_{0.23}Ni_{3.24}Co_{0.03}Al_{0.11}$ | 935 | 6 | 1340 | 330 | 1.04 |
| Example 75 | $Lm(7)_{0.76}Mg_{0.24}Ni_{3.24}Mn_{0.02}Al_{0.13}$ | 955 | 7 | 1345 | 320 | 1.03 |
| Example 76 | $Lm(7)_{0.79}Mg_{0.21}Ni_{3.23}Mn_{0.08}Al_{0.12}$ | 975 | 5 | 1360 | 330 | 1.05 |
| Example 77 | $Lm(8)_{0.78}Mg_{0.22}Ni_{3.15}Co_{0.1}Mn_{0.03}Al_{0.13}$ | 970 | 8 | 1365 | 295 | 1.03 |
| Example 78 | $Lm(7)_{0.77}Mg_{0.23}Ni_{3.24}Cu_{0.03}Al_{0.12}$ | 950 | 10 | 1350 | 325 | 1.06 |
| Example 79 | $Lm(6)_{0.77}Mg_{0.23}Ni_{3.3}Al_{0.12}$ | 935 | 5 | 1365 | 330 | 1.03 |
| Example 80 | $Lm(7)_{0.77}Mg_{0.23}Ni_{3.32}Al_{0.09}$ | 945 | 7 | 1360 | 340 | 1.05 |

TABLE 14

|  | Intensity ratio ($I_1/I_2$) | Content of $AB_2$ type phase (% by volume) | Crystal structure of principal phase | Parallel growth content of crystal grain (% by volume) | Crystal grain ratio (%) | Crystal structure of parallel growth |
|---|---|---|---|---|---|---|
| Example 73 | 0.003 | 0.1 | $Ce_2Ni_7$ type | 6 | 93 | $PuNi_3$ type + $A_5B_{19}$ type |
| Example 74 | 0 | 0.5 | $Ce_2Ni_7$ type + $PuNi_3$ type | 7 | 95 | $CeNi_3$ type + $A_5B_{19}$ type |
| Example 75 | 0.005 | 1.1 | $Ce_2Ni_7$ type + $CeNi_3$ type | 8 | 90 | $PuNi_3$ type + $A_5B_{19}$ type |
| Example 76 | 0.002 | 1.5 | $Ce_2Ni_7$ type + $PuNi_3$ type | 9 | 92 | $PuNi_3$ type + $A_5B_{19}$ type |
| Example 77 | 0 | 0.8 | $Ce_2Ni_7$ type | 6 | 92 | $PuNi_3$ type + $A_5B_{19}$ type |
| Example 78 | 0.004 | 0.4 | $Ce_2Ni_7$ type | 7 | 93 | $CeNi_3$ type + $A_5B_{19}$ type |
| Example 79 | 0.009 | 0.7 | $Ce_2Ni_7$ type | 7 | 91 | $PuNi_3$ type + $A_5B_{19}$ type |

TABLE 14-continued

|  | Intensity ratio ($I_1/I_2$) | Content of $AB_2$ type phase (% by volume) | Crystal structure of principal phase | Parallel growth content of crystal grain (% by volume) | Crystal grain ratio (%) | Crystal structure of parallel growth |
|---|---|---|---|---|---|---|
| Example 80 | 0.013 | 0.9 | $Ce_2Ni_7$ type + $PuNi_3$ type | 8 | 95 | $CeNi_3$ type + $A_5B_{19}$ type |

As apparent from Tables 13 and 14, the secondary battery for each of Examples 73 to 80 has a large capacity and a long charge-discharge cycle life.

Table 15 shows the compositions of mish metals Lm and Mm referred to herein later in Tables 16, 18 and 20:

TABLE 15

(Lm, Mm shown in Tables 16, 18, 20 . . . unit: wt %)

|  | La | Ce | Pr | Nd | Sm |
|---|---|---|---|---|---|
| Lm(9)  | 97 | 0.1 | 0.8  | 2.1  | — |
| Lm(10) | 84 | 1.1 | 2.1  | 12.8 | — |
| Lm(11) | 73 | 2.3 | 5.8  | 18.9 | — |
| Lm(12) | 52 | 2.9 | 14.1 | 31   | — |
| Mm(4)  | 42 | 49  | 2.1  | 6.8  | 0.1 |

EXAMPLES 81 TO 96 AND COMPARATIVE EXAMPLES 21 TO 25

Hydrogen absorbing alloys were prepared by the high frequency induction melting method, the rapid solidification process or the mechanical alloying method as described in the following.

(High Frequency Induction Melting Method)

Each of the elements constituting the composition shown in Table 16 was weighed, followed by melting the composition in a high frequency induction furnace under an argon gas atmosphere so as to obtain an alloy ingot. Then, a heat treatment was applied to the alloy ingot thus obtained under an argon gas atmosphere and under the conditions shown in Table 16 so as to obtain hydrogen absorbing alloys for Examples 81 to 88, 93 to 96 and Comparative Examples 22, 24, 25.

(Rapid Solidification Process)

Each of the elements constituting the composition shown in Table 16 was weighed, followed by melting the composition in a high frequency induction furnace under an argon gas atmosphere so as to obtain an alloy ingot. The alloy ingot thus obtained was melted, followed by dripping the resultant melt onto the surface of a single roll made of copper and rotating at a peripheral velocity of 12 m/sec under an argon gas atmosphere so as to rapidly cool the melt and, thus, to obtain a flake-like hydrogen absorbing alloy. Further, a heat treatment was applied to the resultant hydrogen absorbing alloy flakes under an argon gas atmosphere and under the conditions shown in Table 16 so as to obtain hydrogen absorbing alloys for Examples 89 to 92 and Comparative Example 21.

(Mechanical Alloying Method)

A raw material metal mixture prepared by mixing Lm(10) and Ni at an atomic ratio Lm(10):Ni of 1:3 was melted in an arc furnace, followed by cooling the melt so as to obtain an alloy (a) consisting of a $Lm(10)Ni_3$ phase. Also, another raw material metal mixture prepared by mixing Lm(10) and Ni at an atomic ratio Lm(10):Ni of 1:4 was melted in an arc furnace, followed by cooling the melt so as to obtain an alloy (b) consisting of a $Lm(10)Ni_4$ phase. The alloy (a) in an amount of 100 g and the alloy (b) in an amount of 100 g were put in a planetary ball mill having steel balls put therein so as to be subjected to a mechanical alloying for 10 hours at room temperature under an argon gas atmosphere, thereby obtaining an alloy (c) consisting of a $Lm(10)Ni_3$ phase, a $Lm(10)Ni_4$ phase and a $Lm(10)_5Ni_{19}$ phase.

On the other hand, a raw material metal mixture prepared by mixing Lm(10), Mg and Ni at an atomic ratio Lm(10):Mg:Ni of 0.9:0.1:5 was melted in an arc furnace, followed by cooling the melt so as to obtain an alloy (d) consisting of a $Lm(10)_{0.9}Mg_{0.1}Ni_5$ phase. The alloy (d) in an amount of 30 g and the alloy (c) in an amount of 300 g were put in a planetary ball mill having steel balls put therein so as to be subjected to a mechanical alloying for 10 hours at room temperature under an argon gas atmosphere, thereby obtaining an alloy for Comparative Example 23 consisting of a $Lm(10)Ni_3$ phase, a $Lm(10)Ni_4$ phase, a $Lm(10)_5Ni_{19}$ phase and a $Lm(10)_{0.9}Mg_{0.1}Ni_5$ phase.

Each of the hydrogen absorbing alloys thus prepared was pulverized under an inert gas atmosphere so as to permit the pulverized powder to have an average particle diameter of 60 µm. Then, 0.5 parts by weight of a nickel powder available on the market, which had been prepared by the carbonyl method, and 0.5 parts by weight of a Ketchen black powder were added to and mixed with 100 parts by weight of the alloy powder thus prepared. Further, a paste was prepared by adding 1 parts by weight of styrene butadiene rubber (SBR), 0.2 parts by weight of sodium polyacrylate, 0.2 parts by weight of carboxymethyl cellulose, and 50 parts by weight of water to 100 parts by weight of the mixed powder, followed by stirring the mixture. Still further, a punched thin iron plate having a nickel plating applied to the surface was coated with the paste thus obtained, followed by drying the paste so as to obtain a coated plate. The thickness of the coated plate thus obtained was adjusted by applying a roll press to the coated plate, followed by cutting the coated plate into pieces each having a desired size so as to prepare a negative electrode.

On the other hand, prepared as a separator was a polyolefin based unwoven fabric having acrylic acid introduced therein by a graft copolymerization.

An electrode group was prepared by alternately laminating the negative electrode prepared as described above and a paste type nickel positive electrode prepared by the known method, with the separator described above interposed between the positive electrode and the negative electrode. The electrode group thus prepared contained 4.2 g of the hydrogen absorbing alloy. Also, the nominal capacity of the paste type nickel positive electrode included in the electrode group was 830 mAh.

The electrode group thus prepared was put in a cylindrical case together with 1.3 ml of an alkaline electrolyte containing 7 mol of KOH, 0.5 mol of NaOH, and 0.5 mol of LiOH, followed by sealing the case so as to assemble a rectangular nickel hydrogen secondary battery of size F6 having a nominal capacity of 830 mAh.

Each of the secondary batteries prepared in Examples 81 to 96 and Comparative Examples 21 to 25 was left to stand at room temperature for 72 hours. Then, a charge-discharge cycle, in which the secondary battery was charged under a current of 83 mA for 15 hours, followed by discharging the secondary battery under a current of 166 mA until the battery voltage was lowered to 0.7V, was carried out two times. Further, the charge-discharge cycle was repeated under an environment of 45° C. so as to measure the number of cycles reached at the time when the discharge capacity of the secondary battery was lowered to 80% of the discharge capacity of the first cycle. Table 17 shows the number of cycles and the discharge capacity of the first cycle. Incidentally, the charging process of the charge-discharge cycle was performed by employing a $-\Delta V$ method in which the secondary battery was charged with the charging current of 1660 mA until the charged capacity was reached to 40% of the nominal capacity, followed by charging under the current of 830 mA, and the charging was finished at the time when the voltage was lowered by 4 mV from the maximum voltage in the charging process. On the other hand, the discharge process was performed under a current of 1,660 mA until the battery voltage was lowered to 1.0V.

Also, characteristics (A) to (D) given below were measured in respect of the hydrogen absorbing alloy used in the secondary battery for each of Examples 81 to 96 and Comparative Examples 21 to 25:

(A) A rechargeable hydrogen storage capacity (which is a term for a hydrogen absorbing alloy specified in JIS H7003) was obtained as a hydrogen absorption characteristic for each of the hydrogen absorbing alloys by measuring the iso-thermal line of pressure-composition at 45° C. and under a hydrogen pressure lower than 10 atm. by the Sievert's method (JIS H7201). Table 17 shows the results.

(B) The crystal structure of each of the hydrogen absorbing alloys was observed from the X-ray diffraction pattern by using a Cu-Kα ray as the X-ray source so as to determine the crystal structure of the principal phase. Table 17 shows the results.

In the hydrogen absorbing alloy for Example 93, the peak having the highest intensity appeared at the value of 2θ falling within a range of 42.1°±1° in the X-ray diffraction pattern, and a peak appeared at the value of 2θ falling within a range of from 31° to 34° was found as being split into two. The intensity of the two-split peak was lower than that of peak P1 in diffraction pattern (a) of the normal structure referred to previously. On the other hand, in the hydrogen absorbing alloy for Example 94, the peak having the highest intensity appeared at the value of 2θ falling within a range of 42.1°±1° in the X-ray diffraction pattern, and a peak having an intensity lower than that of peak P1 referred previously appeared at the the value of 2θ falling within a range of from 31° to 34°. Incidentally, the intensity ratio calculated by formula (I) referred to previously on the basis of the diffraction pattern of the hydrogen absorbing alloy for Example 94 was found to be 22%.

Further, the electron diffraction analysis pattern for the hydrogen absorbing alloy for each of Examples 93 and 94 was photographed by a transmission electron microscope (TEM). It has been found that there were four supper lattice reflection spots between the primitive lattice reflection points (00L) and the origin (000) in the hydrogen absorbing alloy for each of Examples 93 and 94. It has also been found that the supper lattice reflection spots were present in four points at which the distance $|G_{00L}|$ between the primitive lattice reflection spot (00L) and the origin (000) was equally divided into five sections.

Also, the peak having the highest intensity appeared at the value of 2θ falling within a range of 42.1°±1° in the X-ray diffraction pattern of the hydrogen absorbing alloy for Example 95. Further, a peak appeared at the value of 2θ falling within a range of from 31° to 34° was found as being split into three. The intensity of the three-split peak was found to be lower than that of the peak appearing in the diffraction pattern of the normal structure referred to previously. On the other hand, the peak having the highest intensity appeared at the value of 2θ falling within a range of 42.1°±1° in the X-ray diffraction pattern of the hydrogen absorbing alloy for Example 96. Also, a peak having an intensity lower than that of peak of the normal structure referred to previously appeared at the value of 2θ falling within a range of from 31° to 34°. Incidentally, the intensity ratio calculated by formula (I) referred to previously on the basis of the diffraction pattern of the hydrogen absorbing alloy for Example 96 was found to be 25%.

(C) A secondary electron image and a reflected electron image of each of the hydrogen absorbing alloys was photographed by using a scanning electron microscope (SEM) so as to detect a phase differing from the principal phase. The composition of the phase differing from the principal phase was analyzed by an energy dispersive X-ray spectroscopy (EDX) of the scanning electron microscope. It has been found from the result of the composition analysis and the X-ray diffraction pattern by using a Cu-Kα ray as the X-ray source that the phase differing from the principal phase was a phase having a $MgCu_2$ type crystal structure.

(D) The content of the $MgCu_2$ type phase was measured as follows for each of the hydrogen absorbing alloys so as to obtain the results as shown in Table 17.

Optional five view fields of the hydrogen absorbing alloy for each of Examples 81 to 88, 93 to 96 and Comparative Examples 22, 24, 25 were photographed by a scanning electron microscope. The area ratio of the target phase based on the alloy area within the view field was obtained for each of the micrographs. The average value of the area ratios thus obtained was calculated and given in Table 17 as the volume ratio of the target phase in the hydrogen absorbing alloy.

On the other hand, optional five view fields of the hydrogen absorbing alloy for each of Examples 89 to 92 and Comparative Examples 21, 23 were photographed by a transmission electron microscope. The area ratio of the target phase based on the alloy area within the view field was obtained for each of the micrographs. The average value of the area ratios thus obtained was calculated and given in Table 17 as the volume ratio of the target phase in the hydrogen absorbing alloy.

TABLE 16

| | Composition | Heat treatment conditions Temperature (° C.) | Time (h) |
|---|---|---|---|
| Example 81 | $Lm(11)_{0.77}Mg_{0.23}Ni_{3.34}Al_{0.08}$ | 935 | 9 |
| Example 82 | $Lm(9)_{0.61}Nd_{0.12}Mg_{0.27}Ni_{3.2}Mn_{0.02}Si_{0.01}Al_{0.07}$ | 940 | 10 |
| Example 83 | $La_{0.76}Ce_{0.02}Mg_{0.22}Ni_{3.43}Zn_{0.02}Al_{0.12}Li_{0.003}$ | 930 | 6 |
| Example 84 | $Lm(10)_{0.76}Mg_{0.24}Ni_{3.34}Al_{0.11}Mo_{0.005}$ | 940 | 5 |
| Example 85 | $Lm(11)_{0.8}Mg_{0.2}Ni_{3.34}Co_{0.05}Mn_{0.02}Al_{0.11}Ta_{0.003}$ | 915 | 7 |
| Example 86 | $Lm(9)_{0.53}Pr_{0.2}Mg_{0.27}Ni_{3.1}Co_{0.1}Fe_{0.01}Al_{0.1}$ | 945 | 6 |
| Example 87 | $Lm(9)_{0.76}Y_{0.05}Mg_{0.19}Ni_{3.25}Co_{0.05}Sn_{0.01}Al_{0.09}$ | 925 | 9 |
| Example 88 | $Lm(11)_{0.7}Mg_{0.3}Ni_{3.22}Cu_{0.03}Al_{0.08}$ | 945 | 7 |
| Example 89 | $Lm(10)_{0.76}Mg_{0.24}Ni_{3.3}Co_{0.02}W_{0.002}B_{0.01}Al_{0.09}$ | 945 | 3 |
| Example 90 | $Lm(9)_{0.68}Mm(4)_{0.1}Mg_{0.22}Ni_{3.19}Co_{0.11}Al_{0.12}Ga_{0.03}$ | 930 | 2 |
| Example 91 | $Lm(9)_{0.67}Mm(4)_{0.1}Mg_{0.23}Ni_{3.3}Co_{0.07}Mn_{0.03}V_{0.002}Al_{0.08}$ | 935 | 1 |
| Example 92 | $Lm(12)_{0.76}Ca_{0.01}Mg_{0.23}Ni_{3.28}Cr_{0.002}Al_{0.12}$ | 980 | 4 |
| Example 93 | $Lm(10)_{0.766}Zr_{0.004}Mg_{0.23}Ni_{3.31}P_{0.002}Al_{0.12}$ | 950 | 7 |
| Example 94 | $Lm(11)_{0.77}Mg_{0.23}Ni_{3.16}Co_{0.11}Al_{0.12}$ | 960 | 5 |
| Example 95 | $Lm(9)_{0.72}Mm(4)_{0.06}Mg_{0.22}Ni_{3.13}Co_{0.02}Mn_{0.03}Sn_{0.02}Al_{0.09}$ | 945 | 8 |
| Example 96 | $Lm(11)_{0.775}Ti_{0.005}Mg_{0.22}Ni_{3.31}Al_{0.13}S_{0.002}$ | 960 | 5 |
| Comparative Example 21 | $Mm(4)_{0.65}Mg_{0.35}Ni_{2.27}Co_{0.3}Mn_{0.3}Fe_{0.02}Al_{0.14}$ | 850 | 4 |
| Comparative Example 22 | $Mm(4)_{0.975}Mg_{0.025}Ni_{2.925}Mn_{0.35}Cu_{0.1}Nb_{0.075}$ | 900 | 12 |
| Comparative Example 23 | $Lm(10)_{0.917}Mg_{0.083}Ni_{4.75}$ | — | — |
| Comparative Example 24 | $Lm(10)_{0.34}Mg_{0.66}Ni_{3.2}$ | 1000 | 6 |
| Comparative Example 25 | $Lm(11)_{0.5}Mg_{0.5}Ni_{2.2}$ | 800 | 5 |

Note:
The alloys for Examples 89 to 92 and Comparative Example 21 were prepared by a rapid solidification process, and the alloy for Comparative Example 23 was prepared by a mechanical alloying method.

TABLE 17

| | Capacity (mAh) | Cycle life | Rechargeable hydrogen storage capacity (H/M) | Crystal structure of principal phase | Content of $AB_2$ type phase (% by volume) |
|---|---|---|---|---|---|
| Example 81 | 750 | 310 | 1.06 | $Ce_2Ni_7$ type | 0.4 |
| Example 82 | 735 | 305 | 1.04 | $Ce_2Ni_7$ type + $CeNi_3$ type | 0.5 |
| Example 83 | 740 | 290 | 1.07 | $Ce_2Ni_7$ type | 0.8 |
| Example 84 | 728 | 295 | 1.05 | $Ce_2Ni_7$ type + $PuNi_3$ type | 1.5 |
| Example 85 | 753 | 280 | 1.06 | $Ce_2Ni_7$ type | 0 |
| Example 86 | 745 | 285 | 1.06 | $Ce_2Ni_7$ type + $CeNi_3$ type | 2.4 |
| Example 87 | 738 | 275 | 0.93 | $Ce_2Ni_7$ type | 2.2 |
| Example 88 | 730 | 280 | 1.06 | $Ce_2Ni_7$ type + $PuNi_3$ type | 2.5 |
| Example 89 | 755 | 265 | 0.98 | $Ce_2Ni_7$ type | 3.2 |
| Example 90 | 740 | 270 | 0.97 | $Ce_2Ni_7$ type + $Gd_2Co_7$ type | 4.5 |
| Example 91 | 732 | 305 | 0.92 | $Ce_2Ni_7$ type | 1.2 |
| Example 92 | 739 | 250 | 0.87 | $Ce_2Ni_7$ type | 1.3 |
| Example 93 | 743 | 270 | 0.86 | Similar to $Ce_2Ni_7$ type | 1.5 |
| Example 94 | 740 | 275 | 0.88 | Similar to $Ce_2Ni_7$ type | 3.5 |
| Example 95 | 736 | 250 | 0.89 | Similar to $PuNi_3$ type | 4.3 |
| Example 96 | 742 | 220 | 0.85 | Similar to $PuNi_3$ type | 5.5 |
| Comparative Example 21 | 680 | 80 | 0.66 | $CaCu_5$ type | 13 |
| Comparative Example 22 | 550 | 30 | 0.54 | $Ce_2Ni_7$ type | 17 |
| Comparative Example 23 | 640 | 10 | 0.43 | $CaCu_5$ type | 0 |
| Comparative Example 24 | 480 | 15 | 0.21 | $PuNi_3$ type | 21 |
| Comparative Example 25 | 450 | 10 | 0.35 | $MgCu_2$ type | 75 |

To reiterate, the hydrogen absorbing alloy for each of Examples 81 to 96 had a composition represented by formula (4) given previously and contained the $AB_2$ type phase such as the $MgCu_2$ type phase in an amount not larger than 10% by volume. As apparent from Tables 16 and 17, the rechargeable hydrogen storage capacity of the hydrogen absorbing alloy for each of Examples 81 to 96 was larger than that of the hydrogen absorbing alloy for each of Comparative Examples 21 to 25. Incidentally, the hydrogen absorbing alloy for Comparative Example 21 had a composition equal to that of the hydrogen absorbing alloy disclosed in U.S. Pat. No. 5,840,166 and contained the $AB_2$ type phase in an amount exceeding 10% by volume. Also, the hydrogen absorbing alloy for Comparative Example 22 had a composition equal to that of the hydrogen absorbing alloy disclosed in Japanese Patent Disclosure No. 11-29832 and contained the $AB_2$ type phase in an amount exceeding 10% by volume. On the other hand, the hydrogen absorbing alloy for Comparative Example 23 had a composition equal to that of the hydrogen absorbing alloy disclosed in Japanese Patent Disclosure No. 10-1731.

It is also seen that the secondary battery for each of Examples 81 to 96 was found to be superior to the secondary battery for each of Comparative Examples 21 to 25 in each of the discharge capacity and the charge-discharge cycle life.

EXAMPLES 97 TO 112 AND COMPARATIVE EXAMPLES 26 TO 30

Hydrogen absorbing alloys were prepared by the high frequency induction melting method, the rapid solidification process or the mechanical alloying method as described in the following.

(High Frequency Induction Melting Method)

Each of the elements constituting the composition shown in Table 18 was weighed, followed by melting the composition in a high frequency induction furnace under an argon gas atmosphere so as to obtain an alloy ingot. Then, a heat treatment was applied to the alloy ingot thus obtained under an argon gas atmosphere and under the conditions shown in Table 18 so as to obtain hydrogen absorbing alloys for Examples 97 to 105, 109 to 112 and Comparative Examples 27, 29, 30.

(Rapid Solidification Process)

Each of the elements constituting the composition shown in Table 18 was weighed, followed by melting the composition in a high frequency induction furnace under an argon gas atmosphere so as to obtain an alloy ingot. The alloy ingot thus obtained was melted, followed by dripping the resultant melt onto the surface of a single roll made of copper and rotating at a peripheral velocity of 7 m/sec under an argon gas atmosphere so as to rapidly cool the melt and, thus, to obtain a flake-like hydrogen absorbing alloy. Further, a heat treatment was applied to the resultant hydrogen absorbing alloy flakes under an argon gas atmosphere and under the conditions shown in Table 18 so as to obtain hydrogen absorbing alloys for Examples 106 to 108 and Comparative Example 26.

(Mechanical Alloying Method)

A raw material metal mixture prepared by mixing Lm(11) and Ni at an atomic ratio Lm(11):Ni of 1:3 was melted in an arc furnace, followed by cooling the melt so as to obtain an alloy (a) consisting of a $Lm(11)Ni_3$ phase. Also, another raw material metal mixture prepared by mixing Lm(11) and Ni at an atomic ratio Lm(11):Ni of 1:4 was melted in an arc furnace, followed by cooling the melt so as to obtain an alloy (b) consisting of a $Lm(11)Ni_4$ phase. The alloy (a) in an amount of 100 g and the alloy (b) in an amount of 100 g were put in a planetary ball mill having steel balls put therein so as to be subjected to a mechanical alloying for 10 hours at room temperature under an argon gas atmosphere, thereby obtaining an alloy (c) consisting of a $Lm(11)Ni_3$ phase, a $Lm(11)Ni_4$ phase and a $Lm(11)_5Ni_{19}$ phase.

On the other hand, a raw material metal mixture prepared by mixing Lm(11), Mg and Ni at an atomic ratio Lm(11):Mg:Ni of 0.9:0.1:5 was melted in an arc furnace, followed by cooling the melt so as to obtain an alloy (d) consisting of a $Lm(11)_{0.9}Mg_{0.1}Ni_5$ phase. The alloy (d) in an amount of 30 g and the alloy (c) in an amount of 300 g were put in a planetary ball mill having steel balls put therein so as to be subjected to a mechanical alloying for 10 hours at room temperature under an argon gas atmosphere, thereby obtaining an alloy for Comparative Example 28 consisting of a $Lm(11)Ni_3$ phase, a $Lm(11)Ni_4$ phase, a $Lm(11)_5Ni_{19}$ phase and a $Lm(11)_{0.9}Mg_{0.1}Ni_5$ phase.

A rectangular nickel hydrogen secondary battery was assembled as in Example 81 by using each of the hydrogen absorbing alloys thus prepared.

The secondary battery prepared in each of Examples 97 to 112 and Comparative Examples 26 to 30 was left to stand at room temperature for 72 hours. Then, the discharge capacity and the charge-discharge cycle life were measured as in Example 81 for each of the secondary batteries. Table 19 shows the results.

Also, characteristics (A) to (F) given below were measured in respect of the hydrogen absorbing alloy used in the secondary battery for each of Examples 97 to 112 and Comparative Examples 26 to 30:

(A) A rechargeable hydrogen storage capacity was obtained as in Example 81 for each of the hydrogen absorbing alloys. Table 19 shows the results.

(B) The crystal structure of each of the hydrogen absorbing alloys was observed from the X-ray diffraction pattern by using a Cu-Kα ray as the X-ray source so as to determine the crystal structure of the principal phase. Table 19 shows the results.

In the hydrogen absorbing alloy for Example 109, the peak having the highest intensity appeared at the value of 2θ falling within a range of 42.1°±1° in the X-ray diffraction pattern, and a peak appeared at the value of 2θ falling within a range of from 31° to 34° was found as being split into two. The intensity of the two-split peak was lower than that of peak P1 in diffraction pattern (a) of the normal structure referred to previously. On the other hand, in the hydrogen absorbing alloy for Example 110, the peak having the highest intensity appeared at the value of 2θ falling within a range of 42.1°±1° in the X-ray diffraction pattern, and a peak having an intensity lower than that of peak P1 referred previously appeared at the value of 2θ falling within a range of from 31° to 34°. Incidentally, the intensity ratio calculated by formula (I) referred to previously on the basis of the diffraction pattern of the hydrogen absorbing alloy for Example 110 was found to be 20%.

Further, the electron diffraction analysis pattern for the hydrogen absorbing alloy for each of Examples 109 and 110 was photographed by a transmission electron microscope (TEM). It has been found that there were four supper lattice reflection spots between the primitive lattice reflection points (00L) and the origin (000) in the hydrogen absorbing alloy for each of Examples 109 and 110. It has also been found that the supper lattice reflection spots were present in four points at which the distance $|G_{00L}|$ between the primitive lattice reflection spot (00L) and the origin (000) was equally divided into five sections.

Also, the peak having the highest intensity appeared at the value of 2θ falling within a range of 42.1°±1° in the X-ray diffraction pattern of the hydrogen absorbing alloy for Example 111. Further, a peak appeared at the value of 2θ falling within a range of from 31° to 34° was found as being split into four. The intensity of the four-divided peaks was found to be lower than that of the peak appearing in the diffraction pattern of the normal structure referred to previously. On the other hand, the peak having the highest intensity appeared at the value of 2θ falling within a range of 42.1°±1° in the X-ray diffraction pattern of the hydrogen absorbing alloy for Example 112. Also, a peak having an intensity lower than that of peak of the normal structure referred to previously appeared at the value of 2θ falling within a range of from 31° to 34°. Incidentally, the intensity ratio calculated by formula (I) referred to previously on the basis of the diffraction pattern of the hydrogen absorbing alloy for Example 112 was found to be 19%.

(C) The content of the principal phase was measured as follows for each of the hydrogen absorbing alloys so as to obtain the results as shown in Table 19.

Optional five view fields of the hydrogen absorbing alloy for each of Examples 97 to 105, 109 to 112 and Comparative Examples 27, 29, 30 were photographed by a scanning electron microscope. The area ratio of the target phase based on the alloy area within the view field was obtained for each of the micrographs. The average value of the area ratios thus obtained was calculated and given in Table 19 as the volume ratio of the target phase in the hydrogen absorbing alloy.

On the other hand, optional five view fields of the hydrogen absorbing alloy for each of Examples 106 to 108 and Comparative Examples 26, 28 were photographed by a transmission electron microscope. The area ratio of the target phase based on the alloy area within the view field was obtained for each of the micrographs. The average value of the area ratios thus obtained was calculated and given in Table 19 as the volume ratio of the target phase in the hydrogen absorbing alloy.

(D) The volume ratio of the parallel growth region in the crystal grain was measured as in Example 17 for each of the hydrogen absorbing alloys. Table 19 shows the results.

(E) A ratio of the number of crystal grains, in which the volume ratio of the parallel growth region was not higher than 40%, to the total number of crystal grains was calculated as in Example 17 and given in Table 19, said ratio being hereinafter referred to as a "crystal grain ratio".

(F) The composition of the parallel growth region excluding the principal phase of each of the hydrogen absorbing alloys was analyzed by an energy dispersive X-ray spectroscopy (EDX) of the scanning electron microscope. The crystal structure of the parallel growth was specified from the result of the composition analysis and the X-ray diffraction pattern obtained in item (B) described previously. The results are shown in Table 19.

TABLE 18

| | Composition | Heat treatment conditions Temperature (° C.) | Time (h) |
|---|---|---|---|
| Example 97 | $Lm(10)_{0.77}Mg_{0.23}Ni_{3.28}Mn_{0.04}Al_{0.11}$ | 930 | 5 |
| Example 98 | $La_{0.62}Pr_{0.14}Mg_{0.24}Ni_{3.24}Mn_{0.02}Fe_{0.01}Al_{0.8}$ | 955 | 9 |
| Example 99 | $La_{0.59}Nd_{0.16}Mg_{0.25}Ni_{3.1}Co_{0.1}Si_{0.01}Al_{0.09}$ | 975 | 11 |
| Example 100 | $Lm(11)_{0.77}Mg_{0.23}Ni_{3.32}Al_{0.11}Ta_{0.002}$ | 945 | 6 |
| Example 101 | $Lm(10)_{0.8}Mg_{0.2}Ni_{3.34}Co_{0.05}Mn_{0.04}Al_{0.11}Mo_{0.005}$ | 930 | 7 |
| Example 102 | $La_{0.73}Ce_{0.05}Mg_{0.22}Ni_{3.33}Zn_{0.03}Al_{0.12}Li_{0.002}$ | 920 | 8 |
| Example 103 | $Lm(10)_{0.78}Y_{0.03}Mg_{0.19}Ni_{3.25}Co_{0.1}Sn_{0.01}Al_{0.08}$ | 925 | 5 |
| Example 104 | $Lm(9)_{0.71}Mg_{0.29}Ni_{3.23}Cu_{0.02}Al_{0.1}$ | 910 | 7 |
| Example 105 | $Lm(11)_{0.76}Mg_{0.24}Ni_{3.31}Co_{0.03}W_{0.002}B_{0.004}Al_{0.08}$ | 965 | 9 |
| Example 106 | $Lm(10)_{0.7}Mm(4)_{0.09}Mg_{0.21}Ni_{3.31}Al_{0.13}Ga_{0.02}$ | 955 | 2 |
| Example 107 | $Lm(9)_{0.72}Mm(4)_{0.04}Mg_{0.24}Ni_{3.24}Co_{0.06}Mn_{0.04}V_{0.002}Al_{0.1}$ | 950 | 1.5 |
| Example 108 | $Lm(12)_{0.76}Ca_{0.01}Mg_{0.23}Ni_{3.3}Cr_{0.003}Mn_{0.05}Al_{0.12}$ | 985 | 3 |
| Example 109 | $Lm(9)_{0.767}Zr_{0.003}Mg_{0.23}Ni_{3.28}Co_{0.04}P_{0.002}Al_{0.1}$ | 960 | 10 |
| Example 110 | $Lm(10)_{0.785}Ti_{0.005}Mg_{0.21}Ni_{3.29}Al_{0.05}S_{0.002}$ | 970 | 8 |
| Example 111 | $Lm(10)_{0.76}Mg_{0.24}Ni_{3.18}Co_{0.1}Mn_{0.05}Al_{0.12}$ | 960 | 7 |
| Example 112 | $Lm(9)_{0.75}Mm(4)_{0.03}Mg_{0.22}Ni_{3.02}Co_{0.15}Mn_{0.01}Sn_{0.02}Al_{0.1}$ | 955 | 6 |
| Comparative Example 26 | $Mm(4)_{0.72}Mg_{0.28}Ni_{2.66}Co_{0.4}Mn_{0.4}Fe_{0.02}Al_{0.15}$ | 900 | 4 |
| Comparative Example 27 | $Mm(4)_{0.975}Mg_{0.025}Ni_3Mn_{0.35}Cu_{0.1}Ga_{0.05}$ | 900 | 12 |
| Comparative Example 28 | $Lm(11)_{0.917}Mg_{0.083}Ni_{4.75}$ | — | — |
| Comparative Example 29 | $Lm(12)_{0.34}Mg_{0.66}Ni_{3.2}$ | 1000 | 5 |
| Comparative Example 30 | $Lm(10)_{0.5}Mg_{0.5}Ni_{2.3}$ | 800 | 7 |

Note:
The alloys for Examples 106 to 108 and Comparative Example 26 were prepared by a rapid solidification process, and the alloy for Comparative Example 28 was prepared by a mechanical alloying method.

TABLE 19

|  | Capacity (mAh) | Cycle life | Rechargeable hydrogen storage capacity (H/M) | Crystal structure of principal phase | Principal phase content (% by volume) | Parallel growth content of crystal grain (% by volume) | Crystal grain ratio (%) | Crystal structure of parallel growth |
|---|---|---|---|---|---|---|---|---|
| Example 97 | 745 | 305 | 1.03 | $Ce_2Ni_7$ type | 96 | 4 | 95 | $PuNi_3$ type + $A_5B_{19}$ type |
| Example 98 | 730 | 300 | 1.02 | $Ce_2Ni_7$ type + $PuNi_3$ type | 92 | 8 | 92 | $PuNi_3$ type + $A_5B_{19}$ type |
| Example 99 | 738 | 295 | 1.06 | $Ce_2Ni_7$ type | 95 | 10 | 88 | $CeNi_3$ type + $A_5B_{19}$ type |
| Example 100 | 726 | 290 | 1.05 | $Ce_2Ni_7$ type + $CeNi_3$ type | 96 | 14 | 85 | $PuNi_3$ type |
| Example 101 | 752 | 285 | 0.98 | $Ce_2Ni_7$ type | 92 | 8 | 90 | $PuNi_3$ type + $A_5B_{19}$ type |
| Example 102 | 746 | 280 | 1.03 | $Ce_2Ni_7$ type + $PuNi_3$ type | 96 | 17 | 82 | $CeNi_3$ type + $A_5B_{19}$ type |
| Example 103 | 734 | 270 | 0.92 | $Ce_2Ni_7$ type | 92 | 18 | 83 | $PuNi_3$ type + $A_5B_{19}$ type |
| Example 104 | 732 | 275 | 1.01 | $Ce_2Ni_7$ type + $PuNi_3$ type | 90 | 24 | 85 | $A_5B_{19}$ type |
| Example 105 | 752 | 270 | 0.98 | $Ce_2Ni_7$ type | 92 | 20 | 72 | $PuNi_3$ type + $A_5B_{19}$ type |
| Example 106 | 738 | 285 | 1.03 | $Ce_2Ni_7$ type + $Gd_2Co_7$ type | 95 | 31 | 70 | $CeNi_3$ type + $A_5B_{19}$ type |
| Example 107 | 742 | 305 | 0.96 | $Ce_2Ni_7$ type | 94 | 5 | 90 | $PuNi_3$ type + $A_5B_{19}$ type |
| Example 108 | 736 | 255 | 0.92 | $Ce_2Ni_7$ type | 90 | 11 | 88 | $PuNi_3$ type |
| Example 109 | 748 | 280 | 0.9 | Similar to $Ce_2Ni_7$ type | 91 | 8 | 75 | $PuNi_3$ type + $A_5B_{19}$ type |
| Example 110 | 742 | 285 | 0.86 | Similar to $Ce_2Ni_7$ type | 85 | 16 | 80 | $PuNi_3$ type + $A_5B_{19}$ type |
| Example 111 | 738 | 260 | 0.88 | Similar to $PuNi_3$ type | 82 | 40 | 65 | $Ce_2Ni_7$ type + $A_5B_{19}$ type |
| Example 112 | 740 | 240 | 0.84 | Similar to $PuNi_3$ type | 80 | 28 | 60 | $Ce_2Ni_7$ type + $A_5B_{19}$ type |
| Comparative Example 26 | 674 | 75 | 0.62 | $CaCu_5$ type | 82 | 65 | 55 | $Ce_2Ni_7$ type |
| Comparative Example 27 | 540 | 20 | 0.52 | $Ce_2Ni_7$ type | 70 | 45 | 50 | $CaCu_5$ type + $PuNi_3$ type |
| Comparative Example 28 | 636 | 15 | 0.41 | $CaCu_5$ type | 90 | 5 | 88 | $Ce_2Ni_7$ type + $A_5B_{19}$ type |
| Comparative Example 29 | 430 | 20 | 0.22 | $PuNi_3$ type | 88 | 15 | 78 | $Ce_2Ni_7$ type + $A_5B_{19}$ type |
| Comparative Example 30 | 426 | 15 | 0.3 | $MgCu_2$ type | 75 | 30 | 45 | $PuNi_3$ type |

To reiterate, the hydrogen absorbing alloy for each of Examples 97 to 112 had a composition represented by formula (4) given previously. Also, the parallel growth region that has a crystal structure differing from the crystal structure of the principal phase precipitates in at least one crystal grain of the principal phase. As apparent from Tables 18 and 19, the rechargeable hydrogen storage capacity of the hydrogen absorbing alloy for each of Examples 97 to 112 was larger than that of the hydrogen absorbing alloy for each of Comparative Examples 26 to 30. Incidentally, the hydrogen absorbing alloy for Comparative Example 26 had a composition equal to that of the hydrogen absorbing alloy disclosed in U.S. Pat. No. 5,840,166 and contained the $CaCu_5$ type phase as the principal phase. Also, the hydrogen absorbing alloy for Comparative Example 27 had a composition equal to that of the hydrogen absorbing alloy disclosed in Japanese Patent Disclosure No. 11-29832 and contained the $Ce_2Ni_7$ type phase as the principal phase. On the other hand, the hydrogen absorbing alloy for Comparative Example 28 had a composition equal to that of the hydrogen absorbing alloy disclosed in Japanese Patent Disclosure No. 10-1731.

It is also seen that the secondary battery for each of Examples 97 to 112 was found to be superior to the secondary battery for each of Comparative Examples 26 to 30 in each of the discharge capacity and the charge-discharge cycle life.

EXAMPLES 113 TO 120

Hydrogen absorbing alloys were prepared by the high frequency induction melting method as described in the following.

(High Frequency Induction Melting Method)

Each of the elements constituting the composition shown in Table 20 was weighed, followed by melting the composition in a high frequency induction furnace under an argon gas atmosphere so as to obtain an alloy ingot. Then, a heat treatment was applied to the alloy ingot thus obtained under an argon gas atmosphere and under the conditions shown in Table 20 so as to obtain hydrogen absorbing alloys for Examples 113 to 120.

A nickel rectangular hydrogen secondary battery was assembled as in Example 81 by using each of the hydrogen absorbing alloys thus prepared.

The secondary battery prepared in each of Examples 113 to 120 was left to stand under room temperature for 72 hours. Then, each of the discharge capacity and the charge-discharge cycle life of the secondary battery were measured as in Example 81 so as to obtain the results shown in Table 20.

The rechargeable hydrogen storage capacity, the crystal structure and content of the principal phase, the content of the $AB_2$ type phase, the content of the parallel growth region in the crystal grain, the crystal grain ratio, and the crystal structure of the parallel growth region were measured as in Examples 81 and 97 in respect of the hydrogen absorbing alloy used in the secondary battery for each of Examples 113 to 120. Tables 20 and 21 show the results.

Further, the present invention provides a hybrid car and an electric automobile excellent in the running performance such as a fuel cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hydrogen absorbing alloy containing as a principal phase at least one phase selected from the group consisting

TABLE 20

| | Composition | Heat treatment conditions Temperature (° C.) | Time (h) | Capacity (mAh) | Cycle life | Rechargeable hydrogen storage capacity (H/M) |
|---|---|---|---|---|---|---|
| Example 113 | $Lm(9)_{0.76}Mg_{0.24}Ni_{3.28}Al_{0.12}$ | 910 | 7 | 752 | 330 | 1.05 |
| Example 114 | $Lm(10)_{0.77}Mg_{0.23}Ni_{3.24}Co_{0.05}Mn_{0.04}Al_{0.1}$ | 925 | 6 | 738 | 340 | 1.04 |
| Example 115 | $Lm(11)_{0.77}Mg_{0.23}Ni_{3.24}Mn_{0.04}Al_{0.11}$ | 950 | 10 | 742 | 335 | 1.03 |
| Example 116 | $Lm(11)_{0.79}Mg_{0.21}Ni_{3.3}Mn_{0.06}Al_{0.1}$ | 955 | 6 | 736 | 325 | 1.04 |
| Example 117 | $Lm(12)_{0.78}Mg_{0.22}Ni_{3.15}Co_{0.11}Mn_{0.03}Al_{0.11}$ | 975 | 12 | 748 | 305 | 1.03 |
| Example 118 | $Lm(11)_{0.77}Mg_{0.23}Ni_{3.24}Cu_{0.02}Al_{0.09}$ | 950 | 8 | 742 | 320 | 1.06 |
| Example 119 | $Lm(10)_{0.77}Mg_{0.23}Ni_{3.28}Al_{0.12}$ | 935 | 6 | 752 | 335 | 1.05 |
| Example 120 | $Lm(11)_{0.76}Mg_{0.24}Ni_{3.31}Al_{0.11}$ | 950 | 5 | 746 | 340 | 1.04 |

TABLE 21

| | Crystal structure of principal phase | Principal phase content (% by volume) | Content of $AB_2$ type phase (% by volume) | Parallel growth content of crystal grain (% by volume) | Crystal grain ratio (%) | Crystal structure of parallel growth |
|---|---|---|---|---|---|---|
| Example 113 | $Ce_2Ni_7$ type | 92 | 0.9 | 6 | 92 | $PuNi_3$ type + $A_5B_{19}$ type |
| Example 114 | $Ce_2Ni_7$ type | 95 | 0.4 | 7 | 90 | $CeNi_3$ type + $A_5B_{19}$ type |
| Example 115 | $Ce_2Ni_7$ type + $PuNi_3$ type | 96 | 0.7 | 11 | 90 | $PuNi_3$ type + $A_5B_{19}$ type |
| Example 116 | $Ce_2Ni_7$ type | 98 | 1.5 | 8 | 92 | $PuNi_3$ type + $A_5B_{19}$ type |
| Example 117 | $Ce_2Ni_7$ type | 94 | 0.8 | 7 | 88 | $CeNi_3$ type + $A_5B_{19}$ type |
| Example 118 | $Ce_2Ni_7$ type + $PuNi_3$ type | 97 | 0.5 | 12 | 93 | $PuNi_3$ type + $A_5B_{19}$ type |
| Example 119 | $Ce_2Ni_7$ type | 93 | 1.1 | 8 | 95 | $PuNi_3$ type + $A_5B_{19}$ type |
| Example 120 | $Ce_2Ni_7$ type | 96 | 0 | 5 | 95 | $CeNi_3$ type + $A_5B_{19}$ type |

As apparent from Tables 20 and 21, the secondary battery for each of Examples 113 to 120 has a large capacity and a long charge-discharge cycle life.

As described above in detail, the present invention provides a hydrogen absorbing alloy which permits increasing the hydrogen absorption-desorption amount and also permits maintaining the increased hydrogen absorption-desorption amount over a long period of time.

The present invention also provides a secondary battery having a large capacity and a long cycle life.

of a second phase having a rhombohedral crystal structure and a first phase having a crystal structure of a hexagonal system excluding a phase having a $CaCu_5$ type structure, wherein a content of a phase having a crystal structure of $AB_2$ type is not higher than 10% by volume including 0% by volume in the hydrogen absorbing alloy, a parallel growth region precipitates in at least one crystal grain of the principal phase and has a crystal structure differing from a crystal structure of the principal phase, and the hydrogen absorbing alloy has a composition represented by general formula (1) given below:

$$R_{1-a-b}Mg_aT_bNi_{Z-X-Y-\alpha}M1_XM2_YMn_\alpha \quad (1)$$

where R is at least one element selected from rare earth elements, said rare earth elements including Y, T is at least one element selected from the group consisting of Ca, Ti, Zr and Hf, M1 is at least one element selected from the group consisting of Co and Fe, M2 is at least one element selected from the group consisting of Al, Ga, Zn, Sn, Cu, Si, B, Nb, W, Mo, V, Cr, Ta, Li, P and S, the atomic ratios of a, b, X, Y, α and z are respectively satisfy conditions of: $0.15 \leq a \leq 0.37$, $0 \leq b \leq 0.1$, $0.53 \leq (1-a-b) \leq 0.85$, $0 \leq X \leq 1.3$, $0 \leq Y \leq 0.5$, $0 \leq \alpha < 0.135$ and $3 \leq Z \leq 4.2$.

2. A hydrogen absorbing alloy containing as a principal phase at least one phase selected from the group consisting of a second phase having a rhombohedral crystal structure and a first phase having a crystal structure of a hexagonal system excluding a phase having a CaCu$_5$ type structure, wherein a parallel growth region precipitates in at least one crystal grain of said principal phase, the parallel growth region having a crystal structure differing from a crystal structure of said principal phase, and the hydrogen absorbing alloy has a composition represented by general formula (1) given below:

$$R_{1-a-b}Mg_aT_bNi_{Z-X-Y-\alpha}M1_XM2_YMn_\alpha \qquad (1)$$

where R is at least one element selected from rare earth elements, said rare earth elements including Y, T is at least one element selected from the group consisting of Ca, Ti, Zr and Hf, M1 is at least one element selected from the group consisting of Co and Fe, M2 is at least one element selected from the group consisting of Al, Ga, Zn, Sn, Cu, Si, B, Nb, W, Mo, V, Cr, Ta, Li, P and S, the atomic ratios of a, b, X, Y, α and z are respectively satisfy conditions of: $0.15 \leq a \leq 0.37$, $0 \leq b \leq 0.1$, $0.53 \leq (1-a-b) \leq 0.85$, $0 \leq X \leq 1.3$, $0 \leq Y \leq 0.5$, $0 \leq \alpha < 0.135$ and $3 \leq Z \leq 4.2$.

3. The hydrogen absorbing alloy according to claim 2, wherein a volume ratio of the parallel growth region of said at least one crystal grain is not higher than 40% by volume.

4. The hydrogen absorbing alloy according to claim 3, wherein a ratio of the number of crystal grains, in which the volume ratio of the parallel growth region is not higher than 40% by volume, to the total number of crystal grains is not lower than 60%.

5. A secondary battery comprising a positive electrode, a negative electrode containing a hydrogen absorbing alloy, and an alkaline electrolyte, wherein said hydrogen absorbing alloy contains as a principal phase at least one phase selected from the group consisting of a second phase having a rhombohedral crystal structure and a first phase having a crystal structure of a hexagonal system excluding a phase having a CaCu$_5$ type structure, and wherein a parallel growth region precipitates in at least one crystal grain of said principal phase, the parallel growth region having a crystal structure differing from a crystal structure of said principal phase, and the hydrogen absorbing alloy has a composition represented by general formula (1) given below:

$$R_{1-a-b}Mg_aT_bNi_{Z-X-Y-\alpha}M1_XM2_YMn_\alpha \qquad (1)$$

where R is at least one element selected from rare earth elements, said rare earth elements including Y, T is at least one element selected from the group consisting of Ca, Ti, Zr and Hf, M1 is at least one element selected from the group consisting of Co and Fe, M2 is at least one element selected from the group consisting of Al, Ga, Zn, Sn, Cu, Si, B, Nb, W, Mo, V, Cr, Ta, Li, P and S, the atomic ratios of a, b, X, Y, α and z are respectively satisfy conditions of: $0.15 \leq a \leq 0.37$, $0 \leq b \leq 0.1$, $0.53 \leq (1-a-b) \leq 0.85$, $0 \leq X \leq 1.3$, $0 \leq Y \leq 0.5$, $0 \leq \alpha < 0.135$ and $3 \leq Z \leq 4.2$.

6. The hydrogen absorbing alloy according to claim 2, wherein a volume ratio of the parallel growth region of said at least one crystal grain is not higher than 35% by volume.

7. The hydrogen absorbing alloy according to claim 2, wherein a volume ratio of the parallel growth region of said at least one crystal grain is not higher than 30% by volume.

8. The hydrogen absorbing alloy according to claim 3, wherein a ratio of the number of crystal grains, in which the volume ratio of the parallel growth region is not higher than 40% by volume, to the total number of crystal grains is not lower than 65%.

9. The hydrogen absorbing alloy according to claim 3, wherein a ratio of the number of crystal grains, in which the volume ratio of the parallel growth region is not higher than 40% by volume, to the total number of crystal grains is not lower than 70%.

10. The hydrogen absorbing alloy according to claim 2, wherein a content of said principal phase is not lower than 50% by volume.

11. The hydrogen absorbing alloy according to claim 2, wherein said parallel growth region has at least one crystal structure selected from the group consisting of an AB$_3$ type crystal structure, an A$_2$B$_7$ crystal structure, and an A$_5$B$_{19}$ type crystal structure.

12. The hydrogen absorbing alloy according to claim 11, wherein said AB$_3$ type crystal structure is either PuNi$_3$ type crystal structure and/or CeNi$_3$ type crystal structure.

13. The hydrogen absorbing alloy according to claim 11, wherein said A$_2$B$_7$ type crystal structure is Ce$_2$Ni$_7$ type crystal structure.

14. The hydrogen absorbing alloy according to claim 1, wherein a content of a phase having a crystal structure of AB$_2$ type is not higher than 5% by volume.

* * * * *